United States Patent
Hwang et al.

(10) Patent No.: US 11,540,177 B2
(45) Date of Patent: Dec. 27, 2022

(54) METHOD AND APPARATUS FOR CONFIGURING AN ASSISTANCE INFORMATION BIT FOR LOCAL CACHE BIT

(71) Applicant: Samsung Electronics Co., Ltd., Suwon-si (KR)

(72) Inventors: June Hwang, Suwon-si (KR); Byounghoon Jung, Suwon-si (KR); Soenghun Kim, Suwon-si (KR); Sangyeob Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/282,162

(22) PCT Filed: Oct. 4, 2019

(86) PCT No.: PCT/KR2019/013003
§ 371 (c)(1),
(2) Date: Apr. 1, 2021

(87) PCT Pub. No.: WO2020/071835
PCT Pub. Date: Apr. 9, 2020

(65) Prior Publication Data
US 2021/0360477 A1    Nov. 18, 2021

(30) Foreign Application Priority Data

Oct. 5, 2018  (KR) .................. 10-2018-0119325
Oct. 26, 2018  (KR) .................. 10-2018-0129355

(51) Int. Cl.
*H04W 28/14*   (2009.01)
*H04W 48/20*   (2009.01)
*H04W 80/02*   (2009.01)

(52) U.S. Cl.
CPC ........... *H04W 28/14* (2013.01); *H04W 48/20* (2013.01); *H04W 80/02* (2013.01)

(58) Field of Classification Search
CPC ..... H04W 28/14; H04W 48/20; H04W 80/02; H04W 48/12; H04W 48/16; H04W 76/15;
(Continued)

(56) References Cited

U.S. PATENT DOCUMENTS

2015/0043492 A1*  2/2015  Baek ................ H04W 56/0005
                                                                 370/329
2015/0124748 A1*  5/2015  Park ................. H04W 28/0278
                                                                 370/329
(Continued)

OTHER PUBLICATIONS

"3GPP; Technical Specification Group Radio Access Network; Evolved Universal Terrestrial Radio Access (E-UTRA) Packet Data Convergence Protocol (PDCP) specification (Release 15)", 3GPP TS 36.323, V15.1.0 (Sep. 2018), Oct. 1, 2018.
(Continued)

*Primary Examiner* — Afshawn M Towfighi
(74) *Attorney, Agent, or Firm* — Jefferson IP Law, LLP

(57) ABSTRACT

The present disclosure relates to a method and apparatus for transmitting and receiving data in a wireless communication system. A method, performed by a terminal dual-connected to a master base station and a secondary base station in a wireless communication system, of configuring an assistance information bit for local cache (AILC) bit includes receiving, from the master base station, a radio resource control (RRC) reconfiguration message including AILC bit configuration information (ailc-BitConfig), configuring an AILC bit of a packet data convergence protocol (PDCP) data packet data unit (PDU) based on at least one of a terminating base station of a data radio bearer (DRB) through which the PDCP data PDU is transmitted, whether the PDCP data PDU includes a service data unit (SDU) to be transmitted to a
(Continued)

local cache, whether the DRB is configured with evolved universal terrestrial radio access (E-UTRA) PDCP or New Radio (NR) PDCP, or a PDCP sequence number (SN) of the PDCP data PDU, and transmitting, to the terminating base station, the PDCP data PDU in which the AILC bit is configured.

11 Claims, 33 Drawing Sheets

(58) Field of Classification Search
CPC . H04W 28/0205; H04W 28/10; H04W 28/02; H04L 67/2842
See application file for complete search history.

(56) References Cited

U.S. PATENT DOCUMENTS

| 2017/0201917 | A1* | 7/2017 | Han | H04W 76/36 |
| 2018/0176819 | A1 | 6/2018 | Papa et al. | |
| 2018/0324624 | A1* | 11/2018 | Gu | H04W 36/0088 |
| 2021/0360477 | A1* | 11/2021 | Hwang | H04W 80/02 |

OTHER PUBLICATIONS

"3GPP; Technical Specification Group Radio Access Network; Evolved Universal Terrestrial Radio Access (E-UTRA) Radio Resource Control (RRC) (Release 15)", 3GPP TS 36.331 V15.3.0 (Sep. 2018), Sep. 27, 2018.
LG Electronics Inc., "Assistance information for local cache", R2-1808547, 3GPP TSG RAN WG2 #102, Busan, Korea, May 11, 2018.
Cmcc et al., "Introduction of assistance information bit for local cache", R2-1805559, 3GPP TSG RAN WG2 #101bis, Sanya, China, Apr. 6, 2018.
Samsung, "Corrections concerning IDC failure", R2-1814752, 3GPP TSG RAN WG2 #103bis, Chengdu, China, Sep. 28, 2018.
International Search Report dated Jan. 15, 2020, issued in International Patent Application No. PCT/KR2019/013003.

* cited by examiner

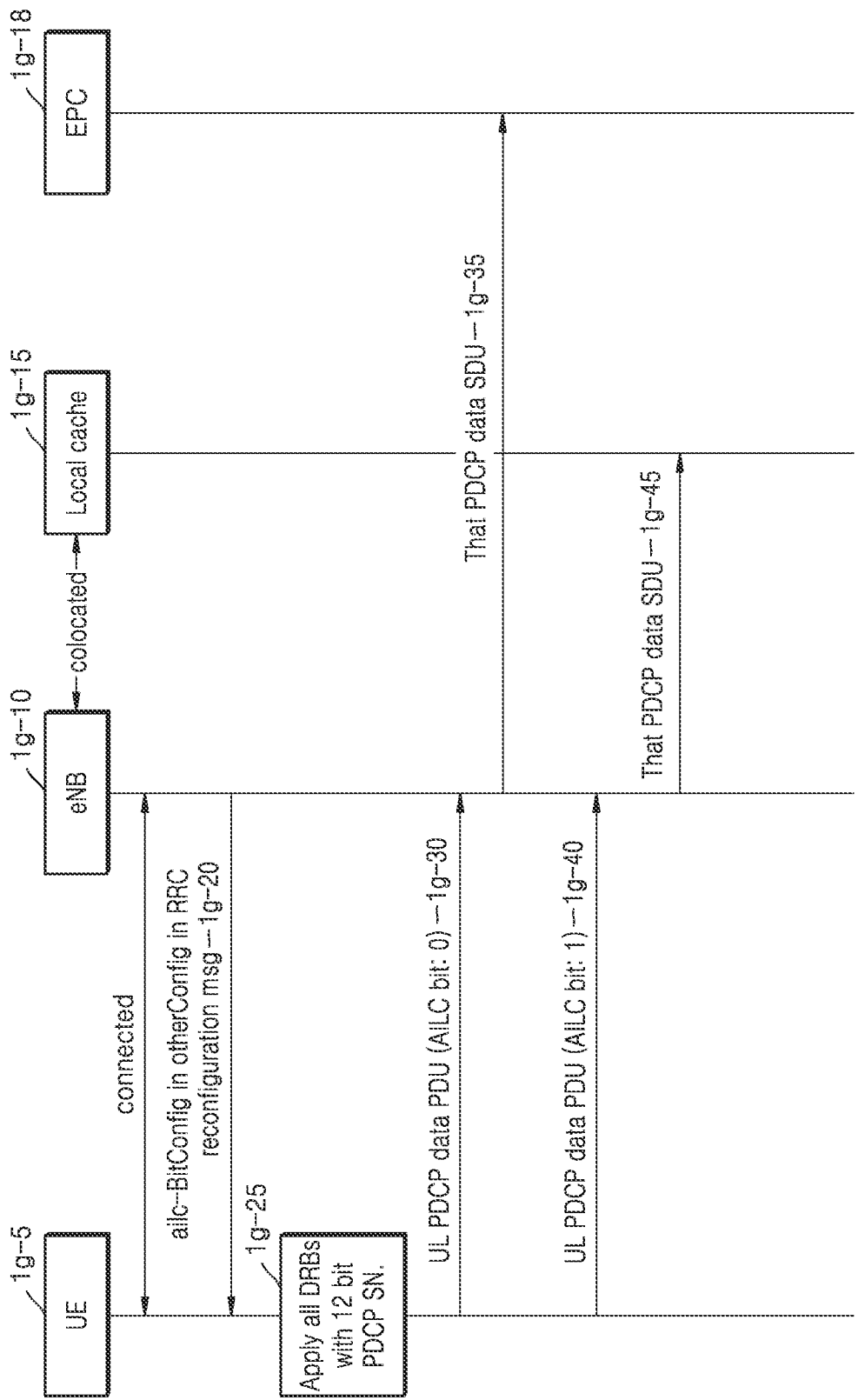

FIG. 1H

| D/C | AILC | R | R | PDCP SN | Oct 1 |
| PDCP SN (cont.) | Oct 2 |
| Data | Oct 3 |

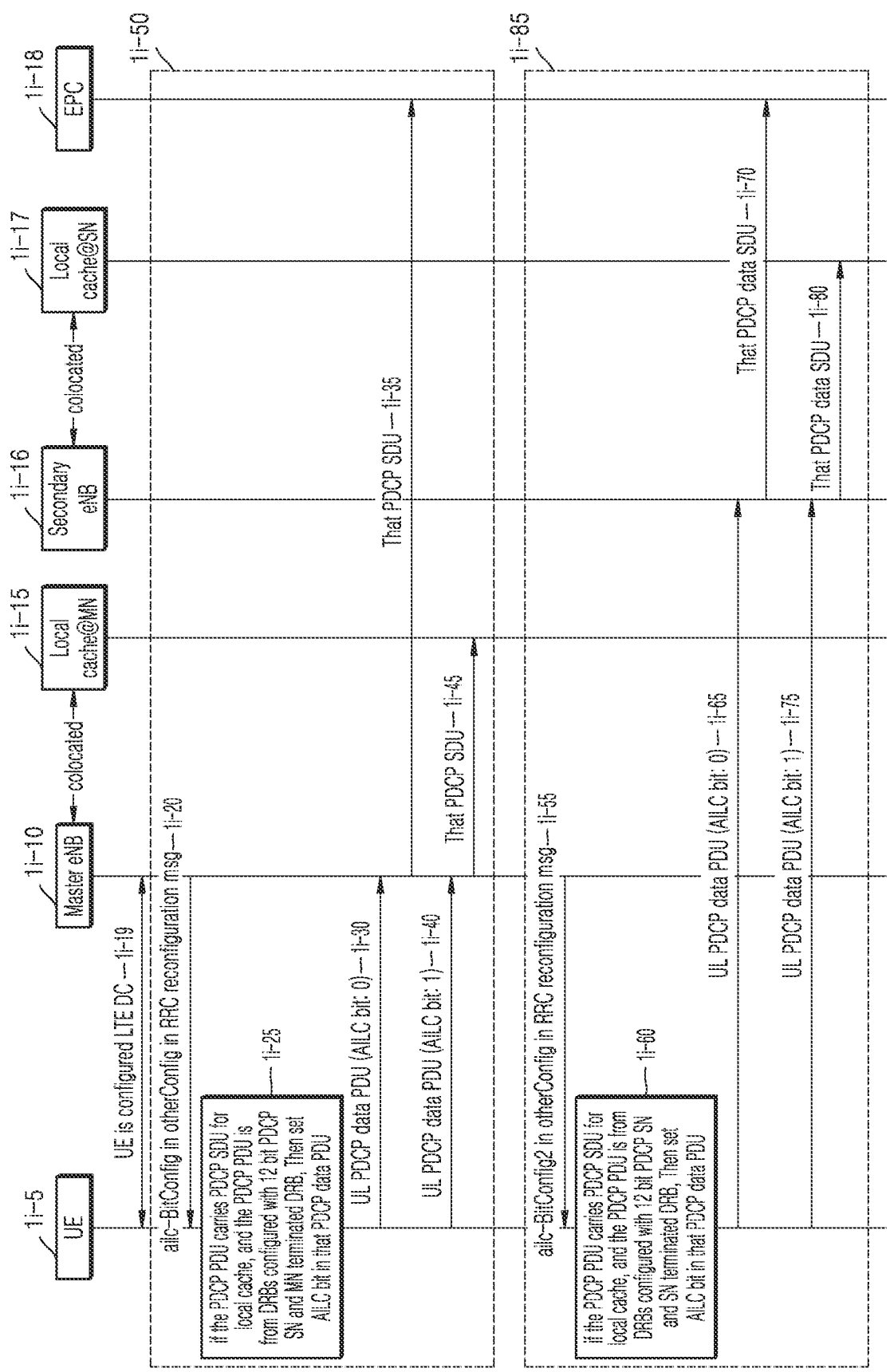

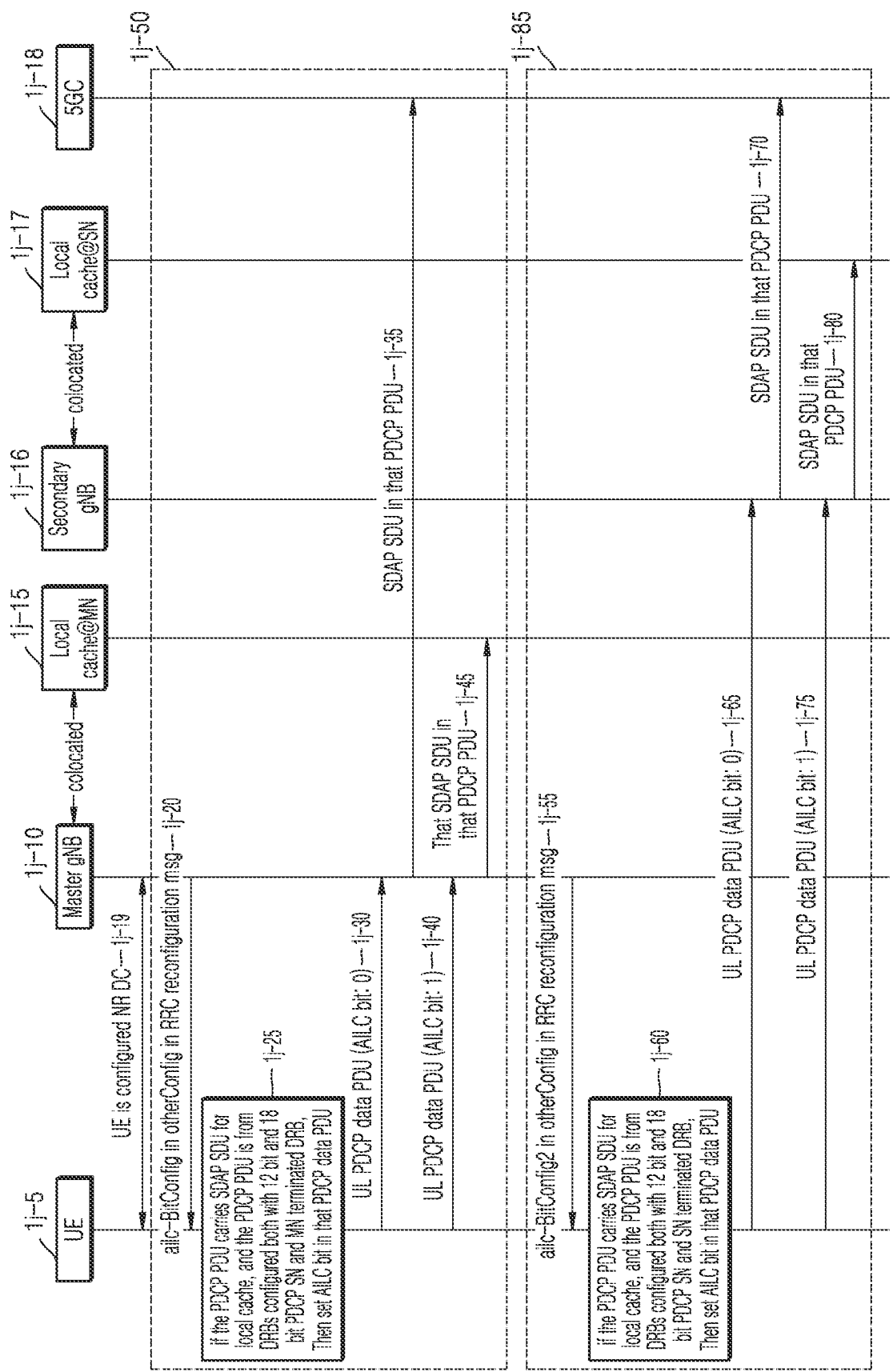

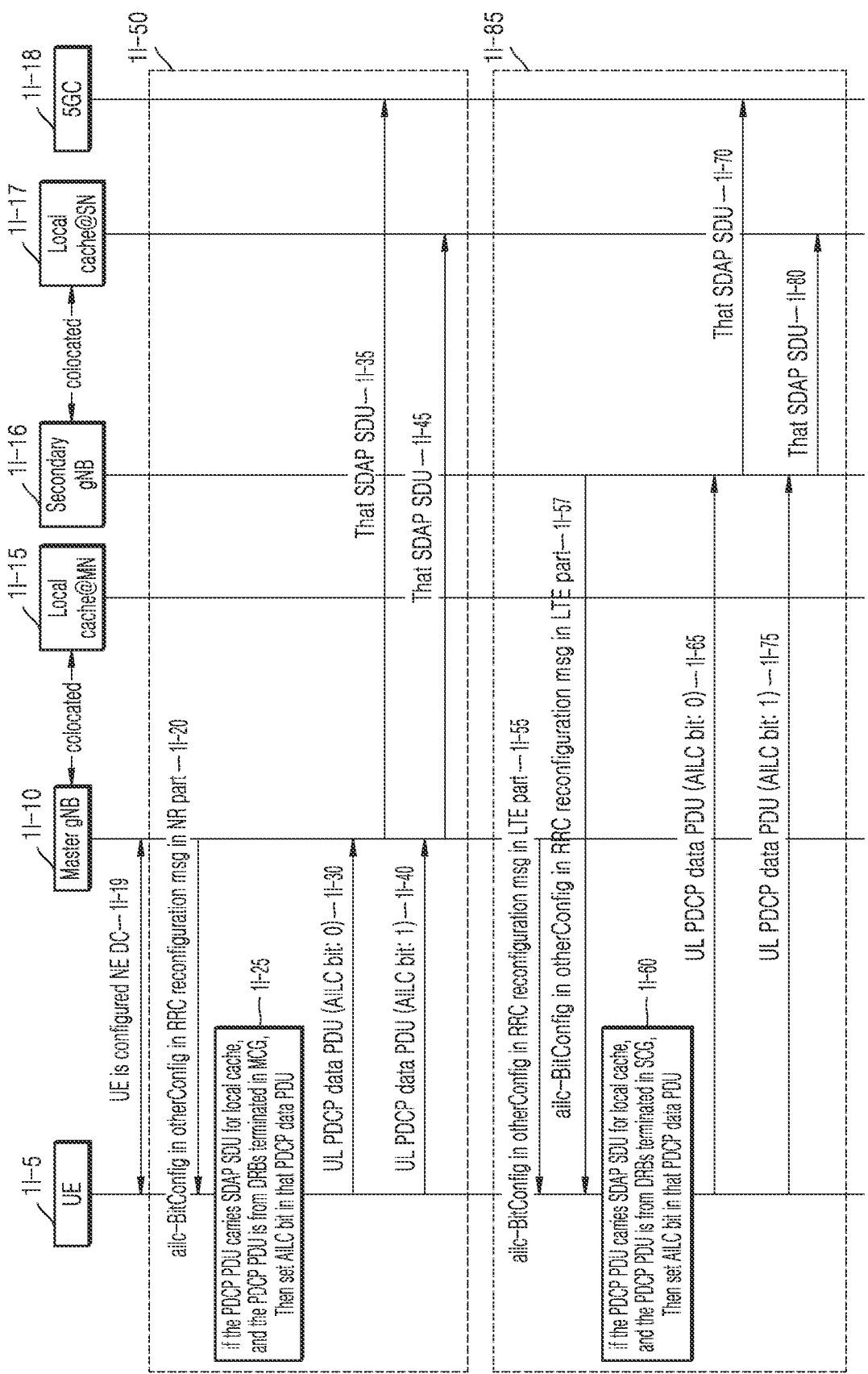

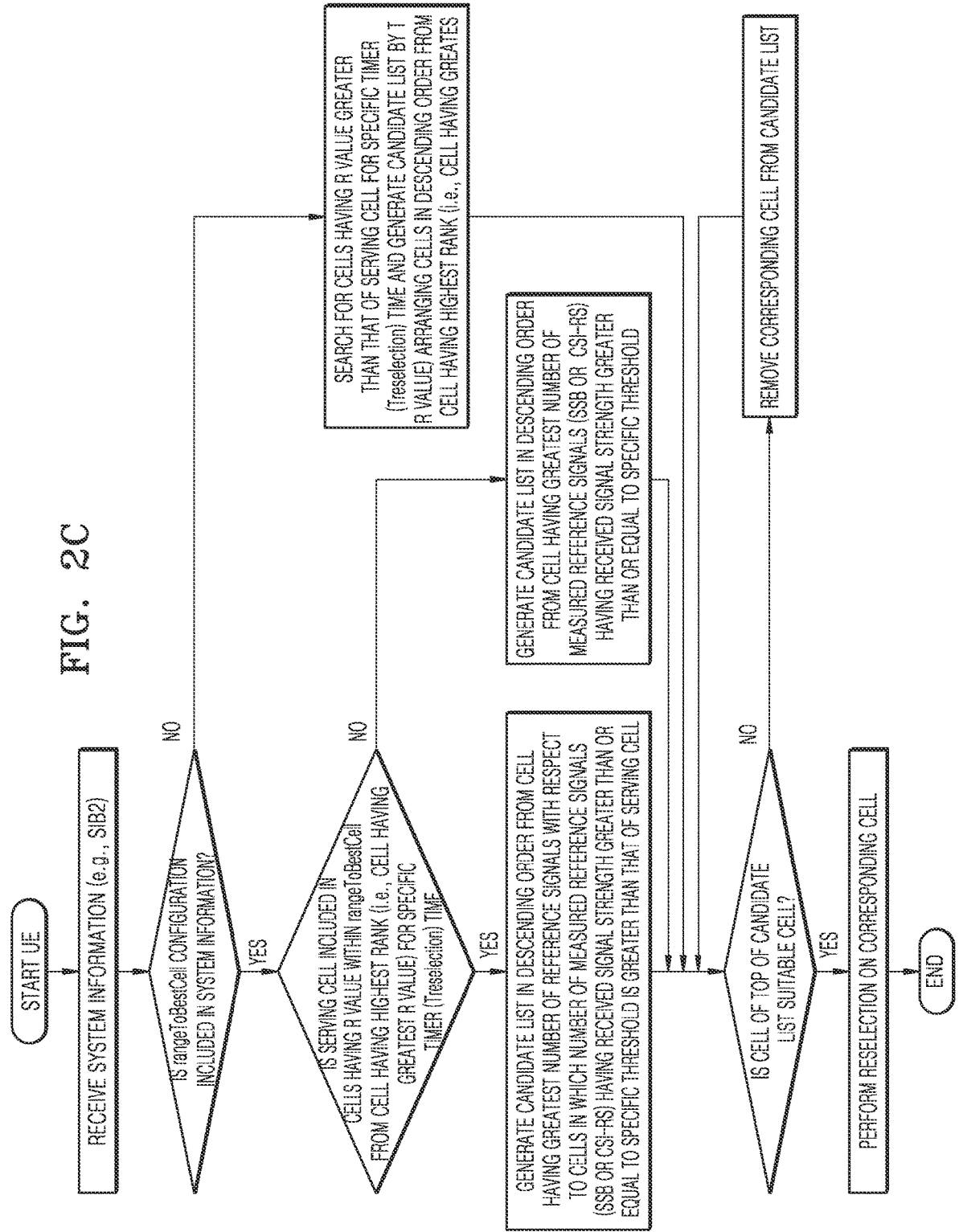

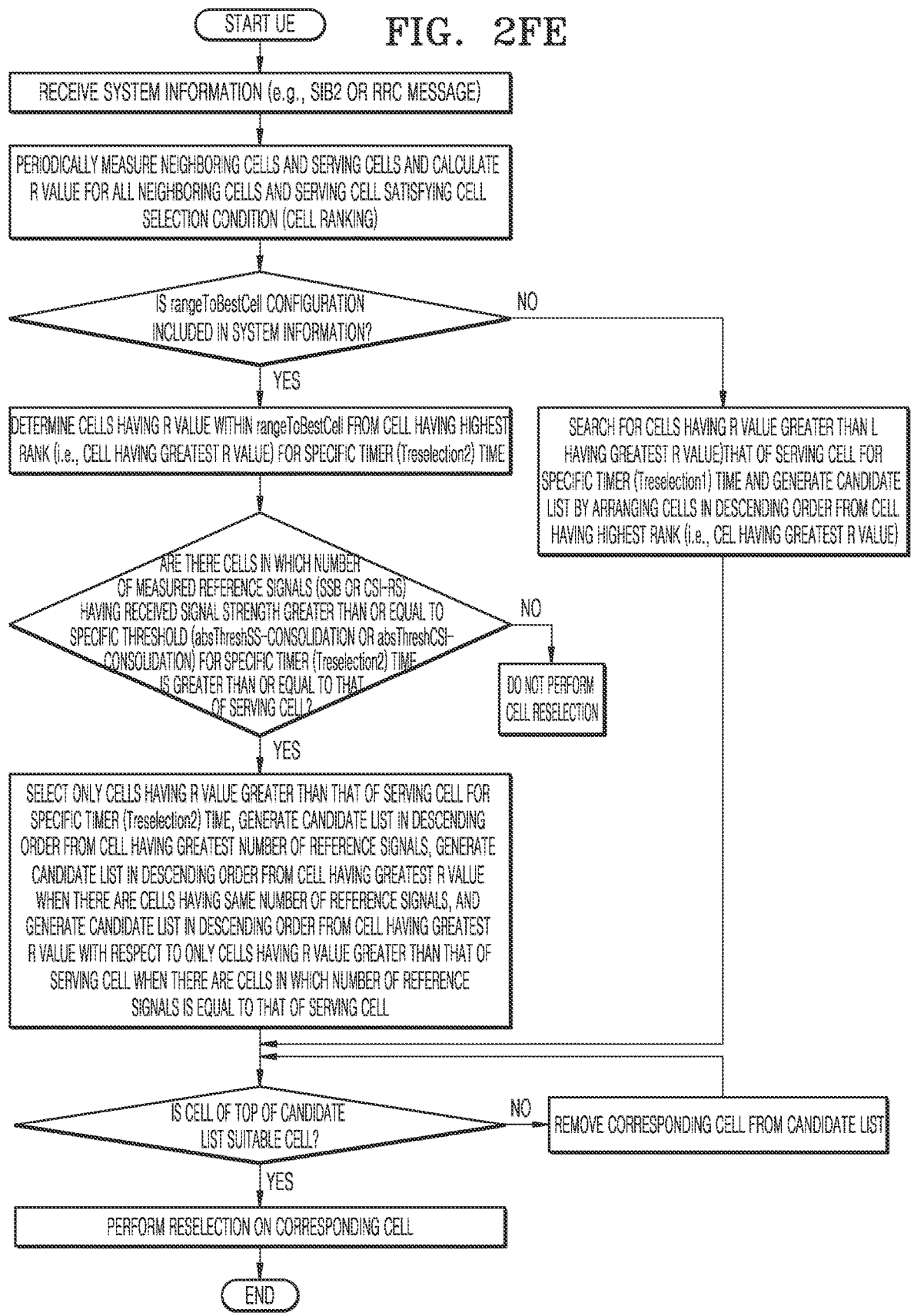

METHOD AND APPARATUS FOR CONFIGURING AN ASSISTANCE INFORMATION BIT FOR LOCAL CACHE BIT

TECHNICAL FIELD

The present disclosure relates to a method and apparatus for transmitting and receiving data by using a local cache in a wireless communication system. Also, the present disclosure relates to a system, method, and apparatus in which a user equipment selects a new cell from among neighboring cells in a wireless communication system.

BACKGROUND ART

To meet the increase in demand with respect to wireless data traffic after the commercialization of 4th generation (4G) communication systems, considerable efforts have been made to develop improved 5th generation (5G) communication systems or pre-5G communication systems. For this reason, 5G communication systems or pre-5G communication systems are called beyond 4G network communication systems or post long term evolution (LTE) systems. To achieve a high data rate, the implementation of 5G communication systems in an ultra-high frequency band (millimeter wave (mmWave)) (e.g., a 60 GHz band) is under consideration. To alleviate propagation path loss of radio waves and increase propagation distances of radio waves in a millimeter wave band, technologies for 5G communication systems, such as beamforming, massive multi-input multi-output (MIMO), full dimensional MIMO (FD-MIMO), array antenna, analog beamforming, and large-scale antenna system are being discussed. Also, in order to improve a system network for 5G communication systems, technologies, such as evolved small cell, advanced small cell, cloud radio access network (cloud RAN), ultra-dense network, device-to-device (D2D) communication, wireless backhaul, moving network, cooperative communication, coordinated multi-points (CoMP), and reception interference cancellation, are being developed. In addition, for 5G communication systems, hybrid frequency shift keying (FSK) and quadrature amplitude modulation (QAM) (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced access technologies, have been developed.

The Internet has evolved from a human-centered connection network, through which humans generate and consume information, to an Internet of things (IoT) network that exchanges and processes information between distributed elements such as objects. An Internet of everything (IoE) technology is emerging, in which a technology related to the IoT is combined with, for example, a technology for processing big data through connection with a cloud server. In order to implement the IoT, various technical components are required, such as, a sensing technology, wired/wireless communication and network infrastructures, a service interfacing technology, a security technology, etc. In recent years, technologies including a sensor network for connecting objects, machine-to-machine (M2M) communication, machine type communication (MTC), etc., have been studied. In the IoT environment, intelligent Internet technology (IT) services may be provided to collect and interpret data obtained from objects connected to each other, and to create new value in human life. As existing information technology (IT) and various industries converge and combine with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to IoT networks. For example, technologies related to sensor networks, M2M communication, MTC, etc., are implemented by using 5G communication technologies including beamforming, MIMO, array antenna, etc. The application of cloud RAN as the big data processing technology described above may be an example of convergence of 5G communication technology and IoT technology.

As it is possible to provide various services according to the development of wireless communication systems, there is a need for a method of efficiently providing these services.

DESCRIPTION OF EMBODIMENTS

Technical Problem

For a mobile communication system using a local cache, the disclosure provides a method and apparatus for transmitting, to the local cache, uplink connection packets requested by a user equipment in a specific case and processing the uplink connection packets in the local cache.

The disclosure also provides a system in which a user equipment selects a new cell from among neighboring cells in a wireless communication system, and a method and apparatus therefor.

Solution to Problem

Provided are a method and apparatus for transmitting and receiving data in a wireless communication system. According to an embodiment, a method, performed by a terminal dual-connected to a master base station and a secondary base station in a wireless communication system, of configuring an assistance information bit for local cache (AILC) bit includes: receiving, from the master base station, a radio resource control (RRC) reconfiguration message including AILC bit configuration information (ailc-BitConfig); configuring an AILC of PDCP data packet data unit (PDU) based on at least one of a terminating base station of a data radio bearer (DRB) through which the PDCP data PDU is transmitted, whether the PDCP data PDU includes a service data unit (SDU) to be transmitted to a local cache, whether the DRB is configured with evolved universal terrestrial radio access (E-UTRA) PDCP or New Radio (NR) PDCP, or a PDCP sequence number (SN) of the PDCP data PDU; and transmitting, to the terminating base station, the PDCP data PDU in which the AILC bit is configured.

BRIEF DESCRIPTION OF DRAWINGS

FIG. 1G is a diagram illustrating an example in which an assistance information bit for local cache (AILC) configuration is performed in the case of single connectivity of LTE, according to some embodiments of the present disclosure.

FIG. 1H is a diagram illustrating an uplink packet data convergence protocol (PDCP) data packet data unit (PDU) format using a 12-bit sequence number (SN) in LTE, according to some embodiments of the present disclosure.

FIG. 1I is a diagram illustrating an example of applying AILC configuration to a UE in evolved universal terrestrial radio access (E-UTRAN) New Radio dual connectivity (EN DC), according to some embodiments of the present disclosure.

FIG. 1J is a diagram illustrating an embodiment of AILC bit configuration in NR-NR dual connectivity (NR DC), according to some embodiments of the present disclosure.

FIG. 1L is a diagram illustrating an embodiment in which an AILC bit is applied to an NR E-UTRA dual connectivity (NE DC) situation, according to some embodiments of the present disclosure.

FIG. 1O is a flowchart illustrating an embodiment of an operation of a UE for AILC configuration in an EN DC situation, according to some embodiments of the present disclosure.

FIG. 2C is a flowchart illustrating a procedure, performed by a UE, of performing cell reselection according to rangeToBestCell configuration, according to some embodiments of the present disclosure.

FIG. 2EB is a flowchart illustrating a procedure, performed by a UE, of performing cell reselection according to rangeToBestCell configuration, according to some embodiments of the present disclosure.

FIG. 2EC is a flowchart illustrating a procedure, performed by a UE, of performing cell reselection according to rangeToBestCell configuration, according to some embodiments of the present disclosure.

FIG. 2FB is a flowchart illustrating a procedure, performed by a UE, of performing cell reselection according to rangeToBestCell configuration, according to some embodiments of the present disclosure.

FIG. 2FC is a flowchart illustrating a procedure, performed by a UE, of performing cell reselection according to rangeToBestCell configuration, according to some embodiments of the present disclosure.

FIG. 2FD is a flowchart illustrating a procedure, performed by a UE, of performing cell reselection according to rangeToBestCell configuration, according to some embodiments of the present disclosure.

FIG. 2FE is a flowchart illustrating a procedure, performed by a UE, of performing cell reselection according to rangeToBestCell configuration, according to some embodiments of the present disclosure.

FIG. 2FF is a flowchart illustrating a procedure, performed by a UE, of performing cell reselection according to rangeToBestCell configuration, according to some embodiments of the present disclosure.

MODE OF DISCLOSURE

Figure 1A:
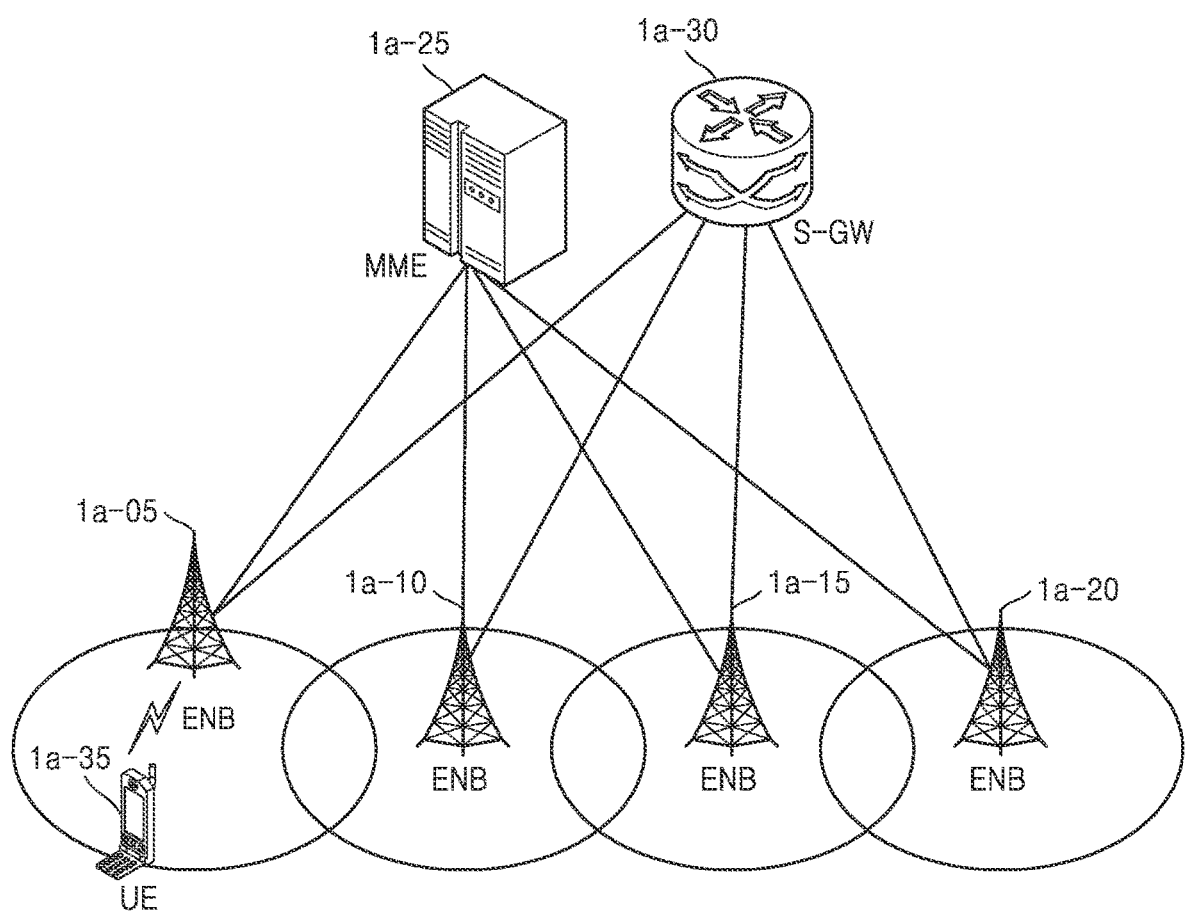
FIG. 1A is a diagram illustrating an architecture of a long term evolution (LTE) system, according to some embodiments of the present disclosure.

Hereinafter, an operation principle of the present disclosure will be described in detail with reference to the accompanying drawings. In describing the present disclosure, when the detailed description of the relevant known functions or configurations is determined to unnecessarily obscure the gist of the present disclosure, the detailed description thereof may be omitted. The terms as used herein are those defined by taking into account functions in the present disclosure, but the terms may vary depending on the intention of users or those of ordinary skill in the art, precedents, or the like. Therefore, the definitions should be made based on the contents throughout the specification.

The term for identifying an access node, the term referring to network entities, the term referring to messages, the term referring to an interface between network entities, the terms referring to a variety of identification information, and the like are exemplified for convenience of description. Therefore, the present disclosure is not limited to the terms to be described later, and other terms referring to entities having an equivalent technical meaning may be used.

For convenience of description, the terms and names defined in the 3rd Generation Partnership Project Long Term Evolution (3GPP LTE) standard are used herein. However, the present disclosure is not limited by the terms and names and may be equally applied to systems conforming to other standards.

Effects and features of the present disclosure, and methods of achieving them will be clarified with reference to embodiments described below in detail with reference to the drawings. In this regard, the embodiments of the present disclosure may have different forms and should not be construed as being limited to the descriptions set forth herein. Rather, these embodiments are provided so that the present disclosure will be thorough and complete and will fully convey the concept of the embodiments of the present disclosure to those of ordinary skill in the art. The same reference numerals refer to the same elements throughout the specification.

It will be understood that the respective blocks of flowcharts and combinations of the flowcharts may be performed by computer program instructions. Because these computer program instructions may be embedded in a processor of a general-purpose computer, a special-purpose computer, or other programmable data processing apparatuses, the instructions executed through the processor of the computer or other programmable data processing apparatus generates modules for performing the functions described in the flowchart block(s). Because these computer program instructions may also be stored in a computer-usable or computer-readable memory that may direct the computer or other programmable data processing apparatus so as to implement functions in a particular manner, the instructions stored in the computer-usable or computer-readable memory are also capable of producing an article of manufacture containing instruction modules for performing the functions described in the flowchart block(s). Because the computer program instructions may also be embedded into the computer or other programmable data processing apparatus, the instructions for executing the computer or other programmable data processing apparatuses by generating a computer-implemented process by performing a series of operations on the computer or other programmable data processing apparatuses may provide operations for executing the functions described in the flowchart block(s).

Also, each block may represent part of a module, segment, or code that includes one or more executable instructions for executing a specified logical function(s). It should also be noted that, in some alternative implementations, the functions described in the blocks may occur out of the order noted in the drawings. For example, two blocks illustrated in succession may in fact be executed substantially concurrently, or the blocks may sometimes be executed in a reverse order, depending on the functions involved therein.

The term "module" or "-er/or" as used herein refers to a software element or a hardware element such as field programmable gate array (FPGA) or application specific integrated circuit (ASIC), and the "module" or "-er/or" performs certain functions. However, the term "module" or "-er/or" is not limited to software or hardware. The term "module" or "-er/or" may be configured in an addressable storage medium or may be configured to reproduce one or more processors. Therefore, for example, the term "module" includes elements, such as software elements, object-oriented software elements, class elements, and task elements, processes, functions, attributes, procedures, subroutines, segments of program code, drivers, firmware, microcodes, circuits, data, databases, data structures, tables, arrays, and variables. Functions provided in the elements and the "modules" or "-ers/ors" may be combined with fewer elements and "modules" or "-ers/ors", or may be separated from additional elements and "modules" or "-ers/ors." Furthermore, the elements and the "modules" or "-ers/ors" may be implemented to reproduce one or more central processing units (CPUs) in the device or secure multimedia card. Also, in embodiments of the present disclosure, the "module" or "-er/or" may include one or more processors.

In describing the present disclosure, when the detailed description of the relevant known functions or configurations is determined to unnecessarily obscure the gist of the present disclosure, the detailed description thereof may be omitted. Hereinafter, embodiments of the present disclosure will be described in detail with reference to the accompanying drawings.

The term for identifying an access node, the term referring to network entities, the term referring to messages, the term referring to an interface between network entities, the terms referring to a variety of identification information, and the like are exemplified for convenience of description. Therefore, the present disclosure is not limited to the terms to be described later, and other terms referring to entities having an equivalent technical meaning may be used. For example, in the following description, a terminal may refer to a MAC entity in a terminal that exists for each master cell group (MCG) and secondary cell group (SCG) to be described later.

For convenience of description, the terms and names defined in the 3rd Generation Partnership Project Long Term Evolution (3GPP LTE) standard are used herein. However, the present disclosure is not limited by the terms and names and may be equally applied to systems conforming to other standards.

Hereinafter, a base station assigns resources to a terminal, and may include at least one of gNode B, eNode B, Node B, BS, radio access unit, base station controller, or node on a network. Examples of a terminal may include a user equipment (UE), a mobile station (MS), a cellular phone, a smartphone, a computer, a multimedia system capable of performing a communication function, or the like. Of course, the present disclosure is not limited to the above examples.

In particular, the present disclosure may be applied to 3GPP New Radio (NR) ($5^{th}$ Generation (5G) mobile communication standard). Also, the present disclosure may be applied to intelligent services (e.g., smart homes, smart buildings, smart cities, smart cars or connected cars, health care, digital education, retail, security and safety related services, etc.) based on 5G communication technologies and IoT related technologies. The term "eNB" as used herein may be used interchangeably with the term "gNB" for convenience of description. That is, a base station described as eNB may represent gNB. Also, the term "terminal" may refer to not only mobile phones, NB-IoT devices, and sensors, but also other wireless communication devices.

A wireless communication system has evolved from a system providing voice-oriented services to a broadband wireless communication system providing high speed high quality packet data services of communication standards such as High Speed Packet Access (HSPA) of 3GPP, LTE or Evolved Universal Terrestrial Radio Access (E-UTRA), LTE-A, LTE-Pro, High Rate Packet Data (HRPD) of 3GPP2, Ultra Mobile Broadband (UMB), and IEEE 802.16e.

In an LTE system as a representative example of a broadband wireless communication system, an Orthogonal Frequency Division Multiplexing (OFDM) scheme is employed in a downlink (DL), and a Single Carrier Frequency Division Multiple Access (SC-FDMA) scheme is employed in an uplink (UL). The UL refers to a radio link through which a terminal (UE or MS) transmits data or a control signal to a base station (eNode B or BS), and the DL refers to a radio link through which a base station transmits data or a control signal to a terminal. In the multiple access scheme as described above, data or control information of each user may be distinguished by performing assignment and operation so that time-frequency resources for carrying data or control information for each user do not overlap each other, that is, orthogonality is established.

Future communication systems after LTE, that is, 5G communication systems have to be able to freely reflect various requirements of users and service providers. Therefore, services that satisfy various requirements at the same time have to be supported. Services considered for 5G communication systems include Enhanced Mobile Broadband (eMBB), Massive Machine Type Communication (mMTC), and Ultra Reliability Low Latency Communication (URLLC).

According to some embodiments, eMBB aims to provide a data rate that is higher than that supported by LTE, LTE-A, or LTE-Pro. For example, in 5G communication systems, eMBB has to be able to provide a peak data rate of 20 Gbps in a DL and a peak data rate of 10 Gbps in an UL in terms of a single base station. Also, the 5G communication systems have to provide a peak data rate and simultaneously provide an increased user perceived data rate of the UE. In order to satisfy such requirements, there is a need to improve various transmission and reception technologies including an improved multi-input multi-output (MIMO) transmission technology. Also, in a 2 GHz band used by current LTE, signals are transmitted using up to 20 MHz transmission bandwidth. However, 5G communication systems use a frequency bandwidth wider than 20 MHz in 3-6 GHz frequency bands or 6 GHz or higher frequency bands. Therefore, the data rate required by 5G communication systems may be satisfied.

At the same time, mMTC is under consideration so as to support application services such as Internet of Thing (IoT) in 5G communication systems. In order to efficiently provide IoT, mMTC needs to support access of a massive terminal in a cell, improve coverage of the terminal, improve battery time, and reduce costs of the UE. Because IoT is attached to various sensors and various devices to provide a communication function, IoT has to be able to support a large number of terminals (e.g., 1,000,000 terminals/km$^2$) in a cell. Also, due to the nature of the service, the terminal supporting mMTC is likely to be located in a shaded area that is not covered by the cell, such as the basement of a building. Therefore, wider coverage than other services provided by the 5G communication systems may be required. The UE supporting mMTC has to be configured as an inexpensive UE, and it is difficult to frequently replace a battery of the UE. Therefore, a very long battery life time such as 10 to 15 years may be required.

Finally, URLLC is a cellular-based wireless communication service used for a specific purpose (mission-critical). URLLC may be used for services used in remote control for robots or machinery, industrial automation, unmanned aerial vehicles, remote health care, emergency alerts, or the like. Therefore, communication provided by URLLC has to provide very low latency and very high reliability. For example, a service supporting URLLC has to satisfy air interface latency of less than 0.5 milliseconds and simultaneously has a packet error rate of $10^{-5}$ or less. Therefore, for services supporting URLLC, the 5G systems have to provide a smaller transmit time interval (TTI) than other services and simultaneously require a design matter that has to allocate a wide resource in a frequency band so as to ensure reliability of a communication link.

The above-described three services considered in 5G communication systems, that is, eMBB, URLLC, and mMTC, may be multiplexed and transmitted in a single system. In this case, different transmission and reception technologies and transmission and reception parameters may be used between services so as to satisfy different requirements of the respective services. However, mMTC, URLLC, and eMBB are only examples of different service types, and the service types to which the present disclosure is applied are not limited to the above-described examples.

Also, although LTE, LTE-A, LTE Pro, or 5G (or NR, next-generation mobile communication) systems will be described below as an example, embodiments of the present disclosure may also be applicable to other communication systems having a similar technical background or channel form. Also, the present disclosure may be applicable to other communication systems through some modifications without departing from the scope of the present disclosure.

FIG. 1A is a diagram illustrating an architecture of an LTE system, according to some embodiments of the present disclosure.

Referring to FIG. 1A, a radio access network of an LTE system may include next-generation base stations (Evolved Node B, hereinafter referred to as ENB, Node B, or BS) 1a-05, 1a-10, 1a-15, and 1a-20, a mobility management entity (MME) 1a-25, and a serving-gateway (S-GW) 1a-30. A UE 1a-35 may access an external network through the ENBs 1a-05 to 1a-20 and the S-GW 1a-30.

In FIG. 1A, the ENBs 1a-05 to 1a-20 may correspond to an existing Node B of a Universal Mobile Telecommunications Service (UMTS) system. The ENB may be connected to the UE 1a-35 through a radio channel, and may perform a more complex role than the existing Node B. In the LTE system, all user traffics including real-time services such as Voice over IP (VoIP) through an Internet protocol may be serviced through a shared channel. Therefore, a device for collecting and scheduling status information such as buffer status, available transmission power status, and channel status of UEs may be required. This may be handled by the ENBs 1a-05 to 1a-20. One ENB may typically control a plurality of cells. For example, in order to implement a transmission rate of 100 Mbps, the LTE system may use, for example, an OFDM scheme in a 20-MHz bandwidth as a radio access technology. Also, the ENB may apply a modulation scheme and an adaptive modulation and coding (AMC) scheme that determines a channel coding rate according to the channel status of the UE. The S-GW 1a-30 is a device that provides data bearers, and may generate or remove data bearers under the control of the MME 1a-25. The MME is a device that is responsible for various control functions as well as mobility management functions for the UE, and may be connected to a plurality of base stations.

Figure 1B:
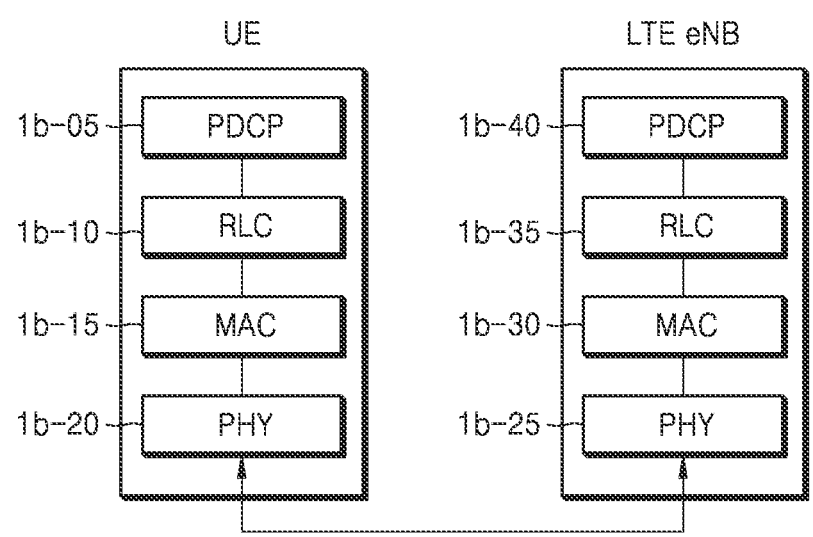
FIG. 1B is a diagram illustrating a radio protocol architecture of the LTE system, according to some embodiments of the present disclosure.

FIG. 1B is a diagram illustrating a radio protocol architecture of the LTE system, according to some embodiments of the present disclosure.

Referring to FIG. 1B, in the radio protocol of the LTE system, the UE and the ENB may respectively include packet data convergence protocols (PDCPs) 1b-05 and 1b-40, radio link controls (RLCs) 1b-10 and 1b-35, medium access controls (MACs) 1b-15 and 1b-30. The PDCP may be responsible for operations such as IP header compression/decompression. The main functions of the PDCP may be summarized as follows. Of course, the present disclosure is not limited to the following examples.

Header compression and decompression function (Header compression and decompression: ROHC only)

User data transfer function (Transfer of user data)

In-sequence delivery function (In-sequence delivery of upper layer PDUs at PDCP re-establishment procedure for RLC AM)

Reordering function (For split bearers in DC (only support for RLC AM): PDCP PDU routing for transmission and PDCP PDU reordering for reception)

Duplicate detection function (Duplicate detection of lower layer SDUs at PDCP re-establishment procedure for RLC AM)

Retransmission function (Retransmission of PDCP SDUs at handover and, for split bearers in DC, of PDCP PDUs at PDCP data-recovery procedure, for RLC AM)

Ciphering and deciphering function (Ciphering and deciphering)

Timer-based SDU discard function (Timer-based SDU discard in uplink.)

According to some embodiments, the RLCs 1b-10 and 1b-35 may perform an automatic repeat request (ARQ) operation by reconfiguring a PDCP packet data unit (PDU) to an appropriate size. The main functions of the RLC may be summarized as follows. Of course, the present disclosure is not limited to the following examples.

Data transfer function (Transfer of upper layer PDUs)

ARQ function (Error Correction through ARQ (only for AM data transfer))

Concatenation, segmentation, and reassembly function (Concatenation, segmentation and reassembly of RLC SDUs (only for UM and AM data transfer))

Re-segmentation function (Re-segmentation of RLC data PDUs (only for AM data transfer))

Reordering function (Reordering of RLC data PDUs (only for UM and AM data transfer))

Duplicate detection function (Duplicate detection (only for UM and AM data transfer))

Error detection function (Protocol error detection (only for AM data transfer))

RLC SDU discard function (RLC SDU discard (only for UM and AM data transfer))

RLC re-establishment function (RLC re-establishment)

According to some embodiments, the MACs 1b-15 and 1b-30 may be connected to RLC layer entities configured in one UE, and perform an operation of multiplexing RLC PDUs to MAC PDUs and demultiplexing RLC PDUs from MAC PDUs. The main functions of the MAC may be summarized as follows. Of course, the present disclosure is not limited to the following examples.

Mapping function (Mapping between logical channels and transport channels)

Multiplexing/demultiplexing function (Multiplexing/demultiplexing of MAC SDUs belonging to one or different logical channels into/from transport blocks (TB) delivered to/from the physical layer on transport channels)

Scheduling information reporting function (Scheduling information reporting)

HARQ function (Error correction through HARQ)

Function of handling priority between logical channels (Priority handling between logical channels of one UE)

Function of handling priority between UEs (Priority handling between UEs by means of dynamic scheduling)

MBMS service identifying function (MBMS service identification)

Transport format selecting function (Transport format selection)

Padding function (Padding)

According to some embodiments, physical (PHY) layers 1b-20 and 1b-25 may perform an operation of channel-coding and modulating upper layer data, making the channel-coded and modulated upper layer data into OFDM symbols, and transmitting the OFDM symbols over a radio channel, or demodulating OFDM symbols received through a radio channel, channel-decoding the demodulated OFDM symbols, and transmitting the decoded OFDM symbols to the upper layer. Of course, the present disclosure is not limited to the following examples.

Figure 1C:
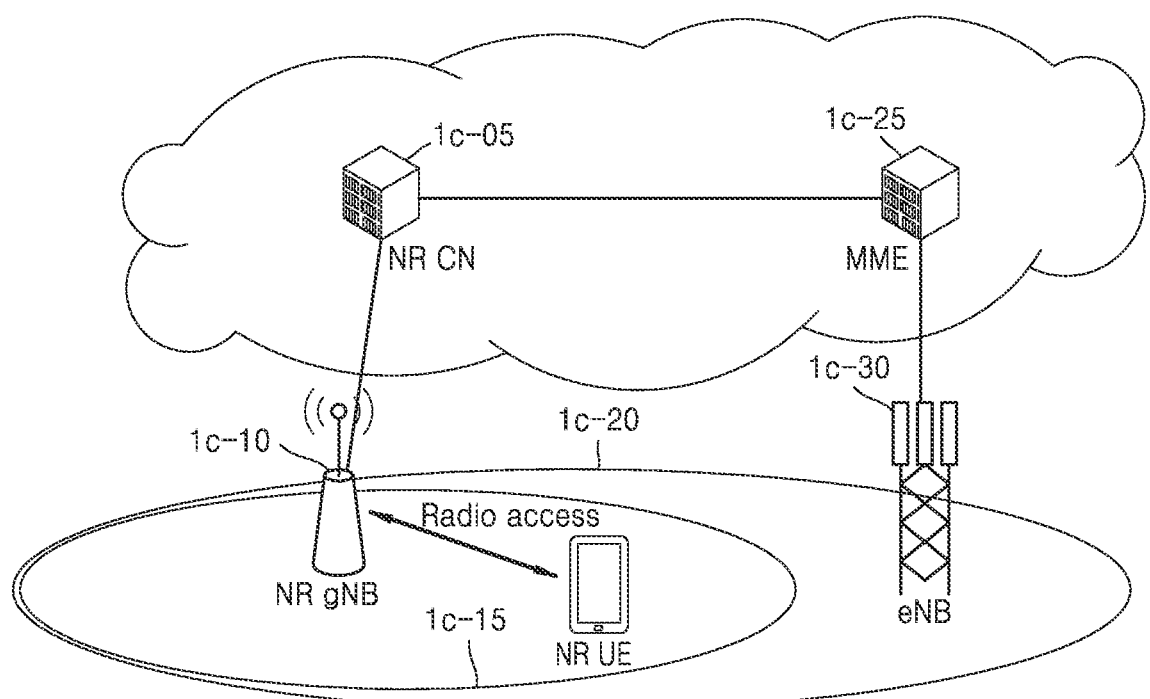
FIG. 1C is a diagram illustrating an architecture of a next-generation mobile communication system, according to some embodiments of the present disclosure.

FIG. 1C is a diagram illustrating an architecture of a next-generation mobile communication system, according to some embodiments of the present disclosure.

Referring to FIG. 1C, a radio access network of a next-generation mobile communication system (hereinafter referred to as an NR or 2g) includes a next-generation base station (New Radio Node B, hereinafter referred to as an NR gNB or an NR BS) 1c-10 and a New Radio core network (an NR CN) 1c-05. A next-generation radio UE (New Radio user equipment, hereinafter referred to as an NR UE or a UE) 1c-15 may access an external network through the NR gNB 1c-10 and the NR CN 1c-05.

In FIG. 1C, the NR gNB 1c-10 may correspond to an eNB of an existing LTE system. The NR gNB 1c-10 may be connected to the NR UE 1c-15 through a radio channel and may provide a service superior to that of the existing Node B. In the next-generation mobile communication system, all user traffics may be serviced through a shared channel. Therefore, a device for collecting and scheduling status information such as buffer status, available transmission power status, and channel status of UEs may be required. This may be handled by the NR NB 1c-10 One NR gNB 1c-10 may typically control a plurality of cells. In the next-generation mobile communication system, more than the existing maximum bandwidth may be applied so as to implement ultra-high-speed data transmission compared to the current LTE. Also, a beamforming technology may be additionally employed by using OFDM as a radio access technology.

Also, according to some embodiments, the NR gNB may apply a modulation scheme and an AMC scheme that determines a channel coding rate according to the channel status of the UE. The NR CN 1c-05 may perform functions such as mobility support, bearer configuration, and quality of service (QoS) configuration. The NR CN 1c-05 is a device that is responsible for various control functions as well as a mobility management function for the UE, and may be connected to a plurality of base stations. Also, the next-generation mobile communication system may interoperate with the existing LTE system, and the NR CN 1c-05 may be connected to the MME 1c-25 through a network interface. The MME 1c-25 may be connected to the eNB 1c-30, which is the existing base station.

Figure 1D:
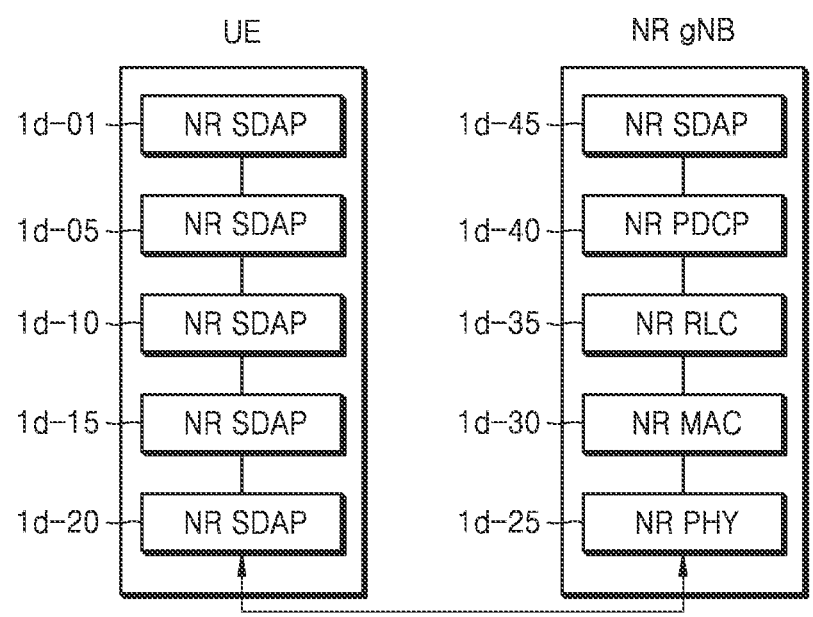
FIG. 1D is a diagram illustrating a radio protocol architecture of the next-generation mobile communication system, according to some embodiments of the present disclosure.

FIG. 1D is a diagram illustrating a radio protocol architecture of the next-generation mobile communication system, according to some embodiments of the present disclosure.

Referring to FIG. 1D, in the radio protocol of the next-generation mobile communication system, a UE and an NR gNB may respectively include NR service data adaptation protocols (SDAPs) 1d-01 and 1d-45, NR PDCPs 1d-05 and 1d-40, NR RLCs 1d-10 and 1d-35, and NR MACs 1d-15 and 1d-30.

According to some embodiments, the main functions of the NR SDAPs 1d-01 and 1d-45 may include some of the following functions. However, the present disclosure is not limited to the following examples.

User data transfer function (transfer of user plane data)

Function of mapping between QoS flow and data bearer for UL and DL (mapping between a QoS flow and a DRB for both DL and UL)

Function of marking QoS flow ID in UL and DL (marking QoS flow ID in both DL and UL packets)

Function of mapping reflective QoS flow to data bearer for UL SDAP PDUs (reflective QoS flow to DRB mapping for the UL SDAP PDUs)

In regard to the SDAP layer entity, the UE may receive an RRC message to configure whether to use the header of the SDAP layer entity or whether to use the function of the SDAP layer entity for each PDCP layer entity, for each bearer, or for each logical channel. Also, when the SDAP header is configured, a 1-bit non-access stratum (NAS) reflective QoS (NAS reflective QoS) configuration indicator and a 1-bit access-stratum (AS) reflective QoS (AS reflective QoS) configuration indicator of the SDAP header may indicate the UE to update or reconfigure mapping information between a QoS flow and a data bearer for UL and DL. According to some embodiments, the SDAP header may include QoS flow ID information indicating QoS. According to some embodiments, QoS information may be used as data processing priority, scheduling information, etc. for supporting efficient services.

According to some embodiments, the main functions of the NR PDCPs 1*d*-05 and 1*d*-40 may include some of the following functions. However, the present disclosure is not limited to the following examples.

Header compression and decompression function (Header compression and decompression: ROHC only)

User data transfer function (Transfer of user data)

In-sequence delivery function (In-sequence delivery of upper layer PDUs)

Out-of-sequence delivery function (Out-of-sequence delivery of upper layer PDUs)

Reordering function (PDCP PDU reordering for reception)

Duplicate detection function (Duplicate detection of lower layer SDUs)

Retransmission function (Retransmission of PDCP SDUs)

Ciphering and deciphering function (Ciphering and deciphering)

Timer-based SDU discard function (Timer-based SDU discard in uplink.)

In the above description, the reordering function of the NR PDCP entity may refer to a function of reordering PDCP PDUs received from the lower layer in sequence based on a PDCP SN. The reordering function of the NR PDCP entity may include a function of transmitting data to the upper layer in reordered order, a function of immediately transmitting data without considering the order, a function of reordering PDCP PDUs and recording lost PDCP PDUs, a function of reporting the status of the lost PDCP PDUs to a sender, and a function of requesting retransmission of the lost PDCP PDUs.

According to some embodiments, the main functions of the NR RLCs 1*d*-10 and 1*d*-35 may include some of the following functions. However, the present disclosure is not limited to the following examples.

Data transfer function (Transfer of upper layer PDUs)

In-sequence delivery function (In-sequence delivery of upper layer PDUs)

Out-of-sequence delivery function (Out-of-sequence delivery of upper layer PDUs)

ARQ function (Error correction through ARQ)

Concatenation, segmentation, and reassembly function (Concatenation, segmentation and reassembly of RLC SDUs)

Re-segmentation function (Re-segmentation of RLC data PDUs)

Reordering function (Reordering of RLC data PDUs)

Duplicate detection function (Duplicate detection)

Error detection function (Protocol error detection)

RLC SDU discard function (RLC SDU discard)

RLC re-establishment function (RLC re-establishment)

In the above description, the in-sequence delivery function of the NR RLC entity may refer to a function of transmitting RLC SDUs received from the lower layer to the upper layer in sequence. The in-sequence delivery function of the NR RLC entity may include a function of, when one RLC SDU is received after being divided into a plurality of RLC SDUs, of reassembling and transmitting the RLC SDUs.

The in-sequence delivery function of the NR RLC entity may include a function of reordering the received RLC PDUs based on an RLC SN or a PDCP SN, a function of reordering the RLC PDUs and recording the lost RLC PDUs, a function of reporting the status of the lost RLC PDUs to the sender, and a function of requesting retransmission of the lost RLC PDUs.

The in-sequence delivery function of the NR RLC entity may include a function of, when there is the lost RLC SDU, transmitting only RLC SDUs up to before the lost RLC SDU to the upper layer in sequence.

The in-sequence delivery function of the NR RLC entity may include a function of, when there is the lost RLC SDU but a certain timer has expired, transmitting all RLC SDUs received before the start of the timer to the upper layer in sequence.

The in-sequence delivery function of the NR RLC entity may include a function of, when there is the lost RLC SDU and a certain timer has expired, transmitting all RLC SDUs received so far to the upper layer in sequence.

The NR RLC entity may process RLC PDUs in the order of reception and transmit the processed RLC PDUs to the NR PDCP entity regardless of the order of SN (out-of sequence delivery).

When the NR RLC entity receives a segment, segments stored in a buffer or to be received in the future may be received, reconfigured into one complete RLC PDU, and transmitted to the NR PDCP entity.

The NR RLC layer may not include the concatenation function, and the concatenation function may be performed by the NR MAC layer, or may be replaced with the multiplexing function of the NR MAC layer.

In the above description, the out-of-sequence delivery function of the NR RLC entity may refer to a function of transmitting RLC SDUs received from the lower layer directly to the upper layer regardless of the order. The out-of-sequence delivery function of the NR RLC entity may include a function of, when one RLC SDU is received after being divided into a plurality of RLC SDUs, reassembling and transmitting the RLC SDUs. The out-of-sequence delivery function of the NR RLC entity may include a function of storing the RLC SN or PDCP SN of received RLC PDUs, reordering the RLC PDUs, and recording lost RLC PDUs.

According to some embodiments, the NR MACs 1*d*-15 and 1*d*-30 may be connected to a plurality of NR RLC layer entities configured in one UE, and the main functions of the NR MAC may include some of the following functions. However, the present disclosure is not limited to the following examples.

Mapping function (Mapping between logical channels and transport channels)

Multiplexing and demultiplexing function (Multiplexing/demultiplexing of MAC SDUs)

Scheduling information reporting function (Scheduling information reporting)

HARQ function (Error correction through HARQ)

Function of handling priority between logical channels (Priority handling between logical channels of one UE)

Function of handling priority between UEs (Priority handling between UEs by means of dynamic scheduling)

MBMS service identifying function (MBMS service identification)

Transport format selecting function (Transport format selection)

Padding function (Padding)

NR PHY layers 1*d*-20 and 1*d*-25 may perform an operation of channel-coding and modulating upper layer data, making the channel-coded and modulated upper layer data into OFDM symbols, and transmitting the OFDM symbols over a radio channel, or demodulating OFDM symbols received through a radio channel, channel-decoding the demodulated OFDM symbols, and transmitting the decoded OFDM symbols to the upper layer.

Figure 1E:
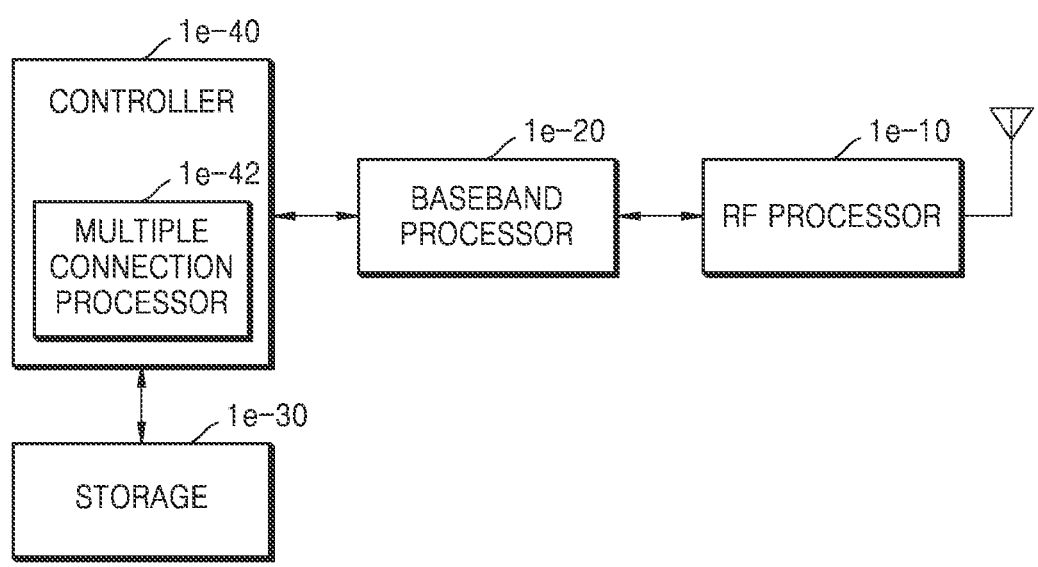
FIG. 1E is a block diagram illustrating an internal architecture of a user equipment (UE), according to some embodiments of the present disclosure.

FIG. 1E is a block diagram illustrating an internal architecture of a UE, to which the present disclosure is applied.

Referring to FIG. 1E, the UE may include a radio frequency (RF) processor 1*e*-10, a baseband processor 1*e*-20, a storage 1*e*-30, and a controller 1*e*-40. Of course, the present disclosure is not limited to the above example, and the UE may include fewer elements or more elements than the elements illustrated in FIG. 1E.

The RF processor 1*e*-10 may perform functions for transmitting and receiving signals through a radio channel, such as signal band conversion, amplification, etc. That is, the RF processor 1*e*-10 may up-convert a baseband signal provided from the baseband processor 1*e*-20 into an RF band signal and transmit the RF band signal through an antenna, and may down-convert an RF band signal received through an antenna into a baseband signal. For example, the RF processor 1*e*-10 may include a transmission filter, a reception filter, an amplifier, a mixer, an oscillator, a digital-to-analog converter (DAC), an analog-to-digital converter (ADC), and the like. Of course, the present disclosure is not limited to the following examples. Although only one antenna is illustrated in FIG. 1E, the UE may include a plurality of antennas. Also, the RF processor 1*e*-10 may include a plurality of RF chains. Also, the RF processor 1*e*-10 may perform beamforming. For beamforming, the RF processor 1*e*-10 may adjust the phases and magnitudes of signals transmitted and received through a plurality of antennas or antenna elements. Also, the RF processor 1*e*-10 may perform MIMO and may receive a plurality of layers when performing the MIMO.

The baseband processor 1*e*-20 may perform a conversion function between a baseband signal and a bit string according to a physical layer standard of a system. For example, upon transmission of data, the baseband processor 1*e*-20 may encode and modulate a transmission bit string to generate complex symbols. Also, upon reception of data, the baseband processor 1*e*-20 may reconstruct the reception bit string by demodulating and decoding the baseband signal provided from the RF processor 1*e*-10. For example, in the case of conforming to an OFDM scheme, upon transmission of data, the baseband processor 1*e*-20 may encode and modulate the transmission bit string to generate complex symbols, map the complex symbols to sub-carriers, and configure OFDM symbols through an inverse fast Fourier transform (IFFT) operation and cyclic prefix (CP) insertion. Also, upon reception of data, the baseband processor 1*e*-20 may segment the baseband signal provided from the RF processor 1*e*-10 in units of OFDM symbols, reconstruct signals mapped to sub-carriers through a fast Fourier transform (FFT) operation, and reconstruct a reception bit string through demodulation and decoding.

The baseband processor 1*e*-20 and the RF processor 1*e*-10 may transmit and receive signals as described above. Therefore, the baseband processor 1*e*-20 and the RF processor 1*e*-10 may be referred to as a transmitter, a receiver, a transceiver, or a communicator. Furthermore, at least one of the baseband processor 1*e*-20 and the RF processor 1*e*-10 may include a plurality of communication modules so as to support a plurality of different radio access technologies. Also, at least one of the baseband processor 1*e*-20 and the RF processor 1*e*-10 may include different communication modules so as to process signals of different frequency bands. For example, the different radio access technologies may include a wireless LAN (e.g., IEEE 802.11), a cellular network (e.g., LTE), etc. Also, the different frequency bands may include a super high frequency (SHF) (e.g., 2.NRHz, NRhz) band and a millimeter wave (e.g., 60 GHz) band. The UE may transmit and receive signals to and from the base station using the baseband processor 1*e*-20 and the RF processor 1*e*-10, and the signals may include control information and data.

The storage 1*e*-30 may store data such as basic programs, application programs, and configuration information for the operations of the UE. In particular, the storage 1*e*-30 may store information related to a second access node that performs wireless communication using a second radio access technology. The storage 1*e*-30 may provide stored data in response to the request of the controller 1*e*-40. The storage 1*e*-30 may include a storage medium such as read-only memory (ROM), random access memory (RAM), hard disk, compact disc read-only memory (CD-ROM), and digital versatile disc (DVD), or any combination thereof. Also, the storage 1*e*-30 may include a plurality of memories.

The controller 1*e*-40 may control overall operations of the UE. For example, the controller 1*e*-40 may transmit and receive signals through the baseband processor 1*e*-20 and the RF processor 1*e*-10. Also, the controller 1*e*-40 may record data in the storage 1*e*-40 and read data from the storage 1*e*-40. To this end, the controller 1*e*-40 may include at least one processor. For example, the controller 1*e*-40 may include a communication processor (CP) that performs control for communication, and an application processor (AP) that controls an upper layer, such as an application program. Also, at least one element in the UE may be implemented as a single chip.

Figure 1F:
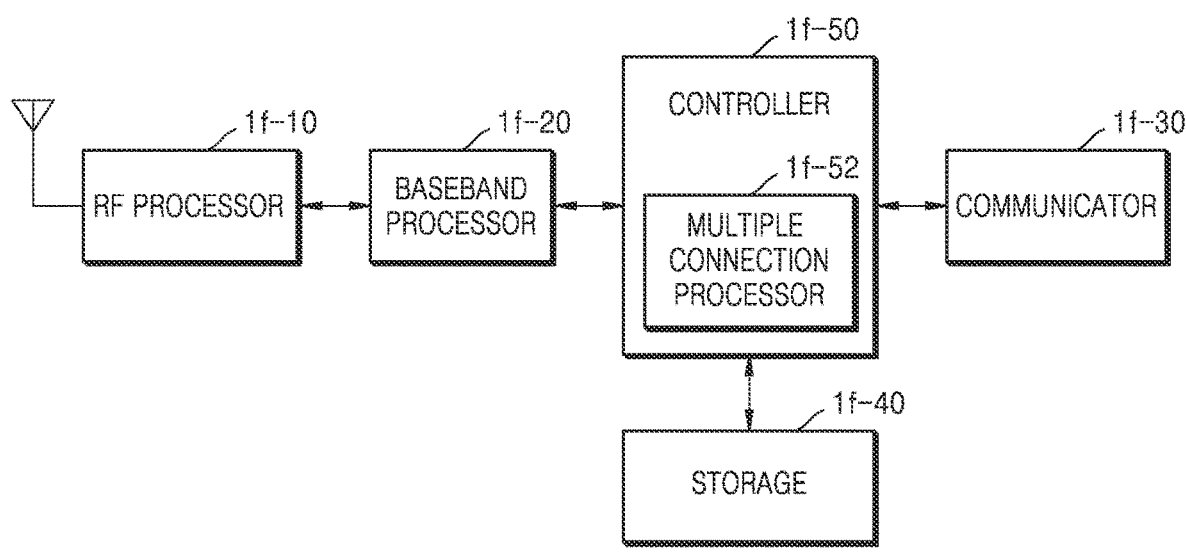
FIG. 1F is a block diagram illustrating an architecture of a New Radio (NR) base station, according to some embodiments of the present disclosure.

FIG. 1F is a block diagram illustrating an architecture of an NR base station, according to some embodiments of the present disclosure.

Referring to FIG. 1F, the base station may include an RF processor 1*f*-10, a baseband processor 1*f*-20, a backhaul communicator 1*f*-30, a storage 1*f*-40, and a controller 1*f*-50. Of course, the present disclosure is not limited to the above example, and the base station may include fewer elements or more elements than the elements illustrated in FIG. 1F.

The RF processor 1*f*-10 may perform functions for transmitting and receiving signals through a radio channel, such as signal band conversion, amplification, etc. That is, the RF processor 1*f*-10 may up-convert a baseband signal provided from the baseband processor 1*f*-20 into an RF band signal and transmit the RF band signal through an antenna, and may down-convert an RF band signal received through an antenna into a baseband signal. For example, the RF processor 1*f*-10 may include a transmission filter, a reception filter, an amplifier, a mixer, an oscillator, a DAC, an ADC, and the like. Although only one antenna is illustrated in FIG. 1F, the RF processor 1*f*-10 may include a plurality of antennas. Also, the RF processor 1*f*-10 may include a plurality of RF chains. Also, the RF processor 1*f*-10 may perform beamforming. For beamforming, the RF processor 1*f*-10 may adjust the phases and magnitudes of signals transmitted and received through a plurality of antennas or antenna elements. The RF processor 1*f*-10 may perform a DL MIMO operation by transmitting one or more layers.

The baseband processor 1*f*-20 may perform a conversion function between a baseband signal and a bit string according to a physical layer standard of a first radio access technology. For example, upon transmission of data, the baseband processor 1*f*-20 may encode and modulate a transmission bit string to generate complex symbols. Also, upon reception of data, the baseband processor 1*f*-20 may reconstruct the reception bit string by demodulating and decoding the baseband signal provided from the RF processor 1*f*-10. For example, in the case of conforming to an OFDM scheme, upon transmission of data, the baseband processor 1*f*-20 may encode and modulate the transmission bit string to generate complex symbols, map the complex symbols to sub-carriers, and configure OFDM symbols through an IFFT operation and CP insertion. Also, upon reception of data, the baseband processor 1*f*-20 may segment the baseband signal provided from the RF processor 1*f*-10 in units of OFDM symbols, reconstruct signals mapped to sub-carriers through a FFT operation, and reconstruct a reception bit string through demodulation and decoding. The baseband processor 1*f*-20 and the RF processor 1*f*-10 may transmit and receive signals as described above. Therefore, the baseband processor 1*f*-20 and the RF processor 1*f*-10 may be referred to as a transmitter, a receiver, a transceiver, a communicator, or a wireless communicator. The base station may transmit and receive signals to and from the UE using the baseband processor 1*f*-20 and the RF processor 1*f*-10, and the signals may include control information and data.

The backhaul communicator 1*f*-30 may provide an interface for performing communication with other nodes in the network. That is, the backhaul communicator 1*f*-30 may convert a bit string transmitted from the main station to another node, for example, an auxiliary base station, a core network, etc., into a physical signal, and convert a physical signal received from another node into a bit string. The backhaul communicator 1*f*-30 may be included in the communicator.

The storage 1*f*-40 may store data such as basic programs, application programs, and configuration information for the operations of the base station. The storage 1*f*-40 may store information about bearers allocated to the connected UE, measurement results reported from the connected UE, etc. Also, the storage 1*f*-40 may store information that is the criterion for determining whether to provide multiple connections to the UE or to stop multiple connections. The storage 1*f*-40 may provide stored data in response to the request of the controller 1*f*-50. The storage 1*f*-40 may include a storage medium such as ROM, RAM, hard disk, CD-ROM, and DVD, or any combination thereof. Also, the storage 1*f*-40 may include a plurality of memories. According to some embodiments, the storage 1*f*-40 may store a program for performing a buffer status reporting method according to the present disclosure.

The controller 1*f*-50 may control overall operations of the base station. For example, the controller 1*f*-50 may transmit and receive signals through the baseband processor 1*f*-20 and the RF processor 1*f*-10 or through the backhaul communicator 1*f*-30. Also, the controller 1*f*-50 may record data in the storage 1*f*-40 and read data from the storage 1*f*-40. To this end, the controller 1*f*-50 may include at least one processor. Also, at least one element of the base station may be implemented as one chip.

FIG. 1G is a diagram illustrating an example in which assistance information bit for local cache (AILC) configuration operates in the case of single connectivity of LTE, according to some embodiments of the present disclosure.

The example of FIG. 1G is an existing technology and is an example in which AILC configuration operates when a local cache is used in a single connectivity situation of LTE. Referring to FIG. 1G, a serving eNB 1*g*-10 and a local cache 1*g*-15 are collocated. Also, a UE 1*g*-5 maintains a state of being connected with the serving eNB 1*g*-10, and the serving eNB 1*g*-10 may include an ailc-BitConfig configuration indication in an otherConfig information element (IE) of an RRC message and transmit the RRC message to the UE 1*g*-5 (1*g*-20). Upon receiving the ailc-BitConfig configuration, the UE 1*g*-5 may establish an AILC bit in a UL PDCP data PDU transmitted on each data radio bearer (DRB) with respect to all DRBs configured with a 12-bit PDCP SN (1*g*-25). For a PDCP data PDU carrying a PDCP SDU to be transmitted to the local cache among the PDCP data PDUs, the UE 1*g*-5 may set the AILC bit to 1. For the other PDCP data PDUs, the UE 1*g*-5 may set the AILC bit to 0. When the serving eNB 1*g*-10 receives the PDCP data PDU in which the AILC bit is set to 0 (1*g*-30), the serving eNB 1*g*-10 may transmit the PDCP data SDU directly to the core network (1*g*-35) instead of transmitting the PDCP data SDU to the local cache 1*g*-15 (1*g*-35). When the serving eNB 1*g*-10 receives the PDCP data PDU in which the AILC bit is set to 1 (1*g*-40), the serving eNB 1*g*-10 may transmit the PDCP data SDU to the local cache 1*g*-15 (1*g*-45).

FIG. 1H is a diagram illustrating a UL PDCP data PDU format using a 12-bit SN in LTE, according to some embodiments of the present disclosure.

In FIG. 1H, in an LTE PDCP data PDU format, because a spare bit capable of indicating AILC exists only in the case of a format using a 12-bit SN among multiple formats, an AILC feature may be applied only to a PDCP data PDU using a 12-bit SN.

A PDCP PDU in which all AILC bits described below are established may be a UL PDCP data PDU. Also, MN terminated DRB or SN terminated DRB may be used interchangeably with MCG anchored DRB or SCG anchored DRB.

FIG. 1I is a diagram illustrating an example of applying AILC configuration to a UE in evolved universal terrestrial radio access (E-UTRAN) New Radio dual connectivity (EN DC), according to some embodiments of the present disclosure.

FIG. 1I illustrates an embodiment of AILC bit configuration in LTE DC. Referring to FIG. 1I, a serving eNB includes a master eNB 1*i*-10 and a secondary eNB 1*i*-16. The master eNB 1*i*-10 and a local cache 1*i*-15 are collocated. The secondary eNB 1*i*-16 and another local cache 1*i*-17 are also collocated. A UE 1*i*-5 may be first configured as LTE DC from the master eNB 1*i*-10 (1*i*-19). The UE 1*i*-5 may receive ailc-BitConfig from the master eNB 1*i*-10 (1*i*-20). In this case, the ailc-BitConfig configuration may be included and transmitted in otherConfig 1E of an RRC reconfiguration message. The UE 1*i*-5 that has received the ailc-BitConfig configuration may establish an AILC bit in a PDCP data PDU transmitted from a DRB configured with a 12-bit PDCP SN among MN terminated DRBs (1*i*-25). In the case of a PDCP PDU in which the PDCP SDU in the PDCP PDU needs to be transmitted to the local cache, the UE 1*i*-5 may set the AILC bit to 1 for the corresponding PDCP data PDU and transmit the corresponding PDCP data PDU to the master eNB 1*i*-10 (1*i*-40). The UE 1*i*-5 may set the AILC bit to 0 for the other PDCP PDUs and transmit the other PDCP PDUs to the master eNB 1*i*-10 (1*i*-30). The master eNB 1*i*-10 that has received the PDCP PDU in which the AILC bit is 0 transmits the corresponding PDCP SDU to the EPC 1*i*-18 (1*i*-35). The master eNB 1*i*-10 that has received the PDCP PDU in which the AILC bit is 1 may transmit, to the collocated local cache 1*i*-15, the PDCP SDU included and transmitted in the corresponding PDCP PDU (1*i*-45). Operation 1*i*-50 may be an operation when ailc-BitConfig is configured, and operation 1*i*-85 may be an operation when ailc-BitConfig2 is configured. The two operations may be independent operations.

Referring to FIG. 1I, in operation 1*i*-85, the UE 1*i*-5 may receive ailc-BitConfig2 from the master eNB 1*i*-10 (1*i*-55). In this case, the ailc-BitConfig2 configuration may be included and transmitted in otherConfig 1E of an RRC reconfiguration message. The UE 1*i*-5 that has received the ailc-BitConfig2 configuration may establish an AILC bit in a PDCP data PDU transmitted from a DRB configured with a 12-bit PDCP SN among SN terminated DRBs (1*i*-60). In the case of a PDCP PDU in which the PDCP SDU in the PDCP PDU needs to be transmitted to the local cache, the UE 1*i*-5 may set the AILC bit to 1 for the corresponding PDCP data PDU and transmit the corresponding PDCP data PDU to the secondary eNB 1*i*-16 (1*i*-75). The UE 1*i*-5 may set the AILC bit to 0 for the other PDCP PDUs and transmit the other PDCP PDUs to the secondary eNB 1*i*-16 (1*i*-65). The secondary eNB 1*i*-16 that has received the PDCP PDU in which the AILC bit is 0 may transmit the corresponding PDCP SDU to the EPC 1*i*-18 (1*i*-70). The secondary eNB 1*i*-16 that has received the PDCP PDU in which the AILC bit is 1 may transmit, to the collocated local cache 1*i*-17, the PDCP SDU included and transmitted in the corresponding PDCP PDU (1*i*-80).

According to another embodiment, when the UE receives ailc-BitConfig from the master eNB without distinction between MN/SN terminated DRBs, the UE may establish an AILC bit for all DRBs configured with the 12-bit PDCP SN. That is, when the PDCP SDU is to be transmitted to the local cache among the DRBs, the UE may set the AILC bit of the PDCP data PDU including the PDCP SDU to 1; otherwise, the UE may set the AILC bit to 0. The serving eNB that has received the corresponding PDCP data PDU may transmit, to the local cache, the PDCP SDU included in the PDCP PDU in which the AILC bit is set to 1, and may transmit, to the EPC, the PDCP SDU included in the PDCP PDU in which the AILC bit is set to 0. The serving eNB may be a master eNB in the case of an MCG DRB or a split DRB, and may be a secondary eNB in the case of an SCG DRB. Also, the local cache may refer to a local cache collocated to each eNB.

FIG. 1J is a diagram illustrating an embodiment of AILC bit configuration in NR-NR dual connectivity (NR DC), according to some embodiments of the present disclosure.

Referring to FIG. 1J, a serving gNB includes a master gNB 1*j*-10 and a secondary gNB 1*j*-16. The master gNB 1*j*-10 and a local cache 1*j*-15 are collocated. The secondary gNB 1*j*-16 and another local cache 1*j*-17 are also collocated. A UE 1*j*-5 may be first configured as NR DC from the master gNB 1*j*-10 (1*j*-19). The UE 1*j*-5 may receive ailc-BitConfig from the master gNB 1*j*-10 (1*j*-20). In this case, the ailc-BitConfig configuration may be included and transmitted in otherConfig 1E of an RRC reconfiguration message. The UE 1*j*-5 that has received the ailc-BitConfig configuration may establish an AILC bit in a PDCP data PDU transmitted from an MN terminated DRB, regardless of an SN bit (1*j*-25). In the case of a PDCP PDU in which an SDAP SDU in the PDCP PDU needs to be transmitted to the local cache, the UE 1*j*-5 may set the AILC bit to 1 for the corresponding PDCP data PDU and transmit the corresponding PDCP data PDU to the master gNB 1*j*-10 (1*j*-40). The UE 1*j*-5 may set the AILC bit to 0 for the other PDCP PDUs and transmit the other PDCP PDUs to the master gNB 1*j*-10 (1*j*-30). The master gNB 1*j*-10 that has received the PDCP PDU in which the AILC bit is 0 may transmit, to a 5GC 1*j*-18, the SDAP SDU transmitted through the received PDCP data PDU (1*i*-35). The master gNB 1*j*-10 that has received the PDCP PDU in which the AILC bit is 1 may transmit, to the collocated local cache 1*j*-15, the SDAP SDU included and transmitted in the corresponding PDCP PDU (1*j*-45). Operation 1*j*-50 may be an operation when ailc-BitConfig is configured, and operation 1*j*-85 may be an operation when ailc-BitConfig2 is configured. The two operations may be independent operations.

Referring to FIG. 1J, in operation 1*j*-85, the UE 1*j*-5 may receive ailc-BitConfig2 from the master gNB 1*j*-10 (1*j*-55). Also, when SRB3 is configured, the UE 1*j*-5 may receive ailc-BitConfig2 the secondary gNB 1*j*-16. In this case, the ailc-BitConfig2 configuration may be included and transmitted in otherConfig 1E of an RRC reconfiguration message. The UE 1*j*-5 that has received the ailc-BitConfig2 configuration may establish an AILC bit in a PDCP data PDU transmitted from an SN terminated DRB, regardless of an SN bit (1*j*-60). In the case of a PDCP PDU in which an SDAP PDU in the PDCP PDU needs to be transmitted to the local cache, the UE 1*j*-5 may set the AILC bit to 1 for the corresponding PDCP data PDU and transmit the corresponding PDCP data PDU to the secondary gNB 1*j*-16 (1*j*-75). The UE 1*j*-5 may set the AILC bit to 0 for the other PDCP PDUs and transmit the other PDCP PDUs to the secondary gNB 1*j*-16 (1*j*-65). The secondary gNB 1*j*-16 that has received the PDCP PDU in which the AILC bit is 0 may transmit the corresponding SDAP SDU to the 5GC 1*j*-18 (1*j*-70). The secondary gNB 1*j*-16 that has received the PDCP PDU in which the AILC bit is 1 may transmit, to the collocated local cache 1*j*-17, the SDAP SDU included and transmitted in the corresponding PDCP PDU (1*j*-80).

According to another embodiment, when the UE receives ailc-BitConfig from the master gNB without distinction between MN/SN terminated DRBs, the UE may establish an AILC bit for all DRBs. That is, when the SDAP SDU included and transmitted in the PDCP PDU transmitted from the DRB is to be transmitted to the local cache, the UE may set the AILC bit of the PDCP data PDU including the SDAP SDU to 1; otherwise, the UE may set the AILC bit to 0. The serving gNB that has received the corresponding PDCP data PDU may transmit, to the local cache, the SDAP SDU included in the PDCP PDU in which the AILC bit is set to 1, and may transmit, to the 5GC, the SDAP SDU included in the PDCP PDU in which the AILC bit is set to 0. The serving gNB may be a master gNB in the case of an MN terminated DRB, and may be a secondary gNB in the case of an SN terminated DRB. Therefore, the local cache may also refer to a local cache collocated with the master gNB or a local cache collocated with the secondary gNB.

Figure 1K:
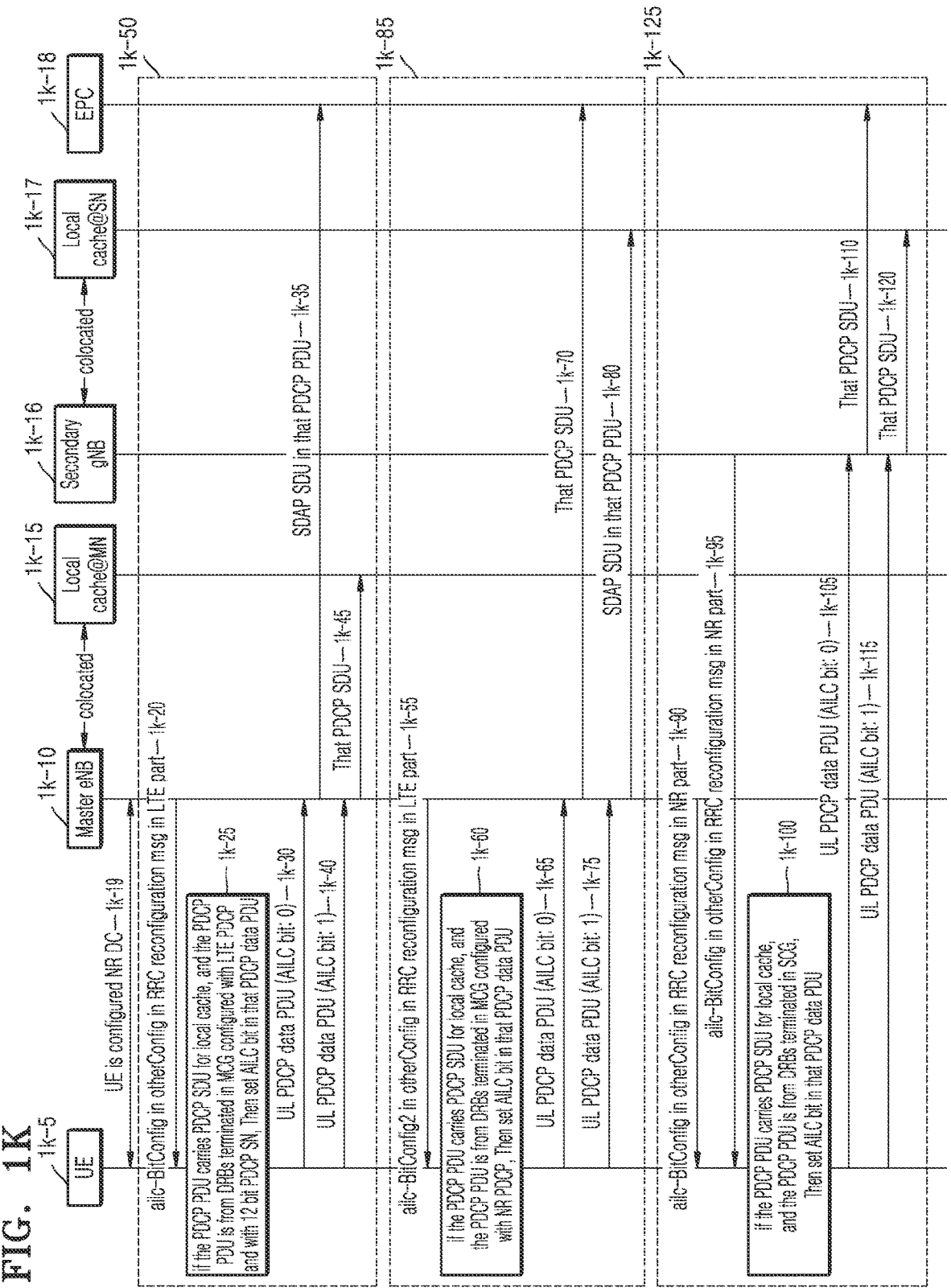
FIG. 1K is a diagram illustrating an embodiment of AILC bit configuration in EN DC, according to some embodiments of the present disclosure.

FIG. 1K is a diagram illustrating an embodiment of AILC bit configuration in EN DC, according to some embodiments of the present disclosure.

Referring to FIG. 1K, operation 1k-50 may be an operation when ailc-BitConfig is transmitted to LTE part RRC and configured, and operation 1k-85 may be an operation when ailc-BitConfig2 is transmitted to LTE part RRC and configured. Also, operation 1k-125 may be an operation when ailc-BitConfig is transmitted to NR part RRC and configured. The three operations may be independent operations.

Referring to FIG. 1K, a serving base station includes a master eNB 1k-10 and a secondary gNB 1k-16. The master eNB 1k-10 and a local cache 1k-15 are collocated. The secondary gNB 1k-16 and another local cache 1k-17 are also collocated. A UE 1k-5 may be first configured with EN DC from the master gNB 1k-10 (1k-19).

Referring to FIG. 1K, in operation 1k-50, the UE 1k-5 may receive ailc-BitConfig from the master eNB 1k-10 (1k-20). In this case, the ailc-BitConfig configuration may be included and transmitted in otherConfig 1E of an RRC reconfiguration message of an LTE part of an RRC message transmitted to the UE 1k-5. The UE 1k-5 that has received the ailc-BitConfig configuration may establish an AILC bit in a PDCP data PDU transmitted from a DRB configured with LTE PDCP among MN terminated DRBs and configured with a 12-bit PDCP SN (1k-25). In the case of a PDCP PDU in which a PDCP SDU in the PDCP PDU needs to be transmitted to the local cache, the UE 1k-5 may set the AILC bit to 1 for the corresponding PDCP data PDU and transmit the corresponding PDCP data PDU to the master eNB 1k-10 (1k-40). The UE 1k-5 may set the AILC bit to 0 for the other PDCP PDUs and transmit the other PDCP PDUs to the master eNB 1k-10 (1k-30). The master eNB 1k-10 that has received the PDCP PDU in which the AILC bit is 0 may transmit, to an EPC 1k-18, the PDCP SDU transmitted through the received PDCP data PDU (1k-35). The master eNB 1k-10 that has received the PDCP PDU in which the AILC bit is 1 may transmit, to the collocated local cache 1k-15, the PDCP SDU included and transmitted in the corresponding PDCP PDU (1k-45).

Referring to FIG. 1K, in operation 1k-85, the UE 1k-5 may receive ailc-BitConfig2 from the master eNB 1k-10 (1k-55). In this case, the ailc-BitConfig2 configuration may be included and transmitted in otherConfig 1E of an RRC reconfiguration message. The UE 1k-5 that has received the ailc-BitConfig2 configuration may establish an AILC bit in a PDCP data PDU transmitted from an MN terminated DRB, which is configured with NR PDCP regardless of an SN bit (1k-60). In the case of a PDCP PDU in which a PDCP SDU in the PDCP data PDU needs to be transmitted to the local cache, the UE 1k-5 may set the AILC bit to 1 for the corresponding PDCP data PDU and transmit the corresponding PDCP data PDU to the master eNB 1k-10 (1k-75). The UE 1k-5 may set the AILC bit to 0 for the other PDCP PDUs and transmit the other PDCP PDUs to the master eNB 1k-10 (1k-65). The master eNB 1k-10 that has received the PDCP PDU in which the AILC bit is 0 may transmit, to an EPC 1k-18, the PDCP SDU existing in the received PDCP PDU (1k-70). The master eNB 1k-10 that has received the PDCP PDU in which the AILC bit is 1 may transmit, to the collocated local cache 1k-17, the PDCP SDU included and transmitted in the corresponding PDCP PDU (1k-80).

Referring to FIG. 1K, in operation 1k-125, the UE 1k-5 may receive ailc-BitConfig from the master eNB 1k-10 (1k-90). Alternatively, when SRB3 is configured, the UE 1k-5 may receive ailc-BitConfig from the secondary gNB 1k-16 (1k-95). In this case, the ailc-BitConfig configuration may be included and transmitted in otherConfig 1E of an RRC reconfiguration message of the NR RRC part. The UE 1k-5 that has received the ailc-BitConfig configuration may establish an AILC bit in a PDCP data PDU transmitted from an SN terminated DRB, which is configured with NR PDCP regardless of an SN bit (1k-100). In the case of a PDCP PDU in which a PDCP SDU in the PDCP data PDU needs to be transmitted to the local cache, the UE 1k-5 may set the AILC bit to 1 for the corresponding PDCP data PDU and transmit the corresponding PDCP data PDU to the master eNB 1k-16 (1k-115). The UE 1k-5 may set the AILC bit to 0 for the other PDCP PDUs and transmit the other PDCP PDUs to the secondary gNB 1k-16 (1k-105). The secondary gNB 1k-16 that has received the PDCP PDU in which the AILC bit is 0 may transmit, to the EPC 1k-18, the PDCP SDU existing in the received PDCP PDU (1k-110). The secondary gNB 1k-16 that has received the PDCP PDU in which the AILC bit is 1 may transmit, to the collocated local cache 1k-17, the PDCP SDU included and transmitted in the corresponding PDCP PDU (1k-120).

FIG. 1L is a diagram illustrating an embodiment in which an AILC bit is applied to an NR E-UTRA dual connectivity (NE DC) situation, according to some embodiments of the present disclosure.

Referring to FIG. 1L, operation 1l-50 may be an operation when ailc-BitConfig is transmitted to NR RRC part and configured, and operation 1l-85 may be an operation when ailc-BitConfig is transmitted to LTE RRC part and configured. The two operations may be independent operations.

Referring to FIG. 1L, a serving base station includes a master gNB 1l-10 and a secondary eNB 1l-16. The master gNB 1l-10 and a local cache 1l-15 are collocated. The secondary eNB 1l-16 and another local cache 1l-17 are also collocated (1l-17). A UE 1l-5 may be first configured as NE DC from the master gNB 1l-10 (1l-19).

Referring to FIG. 1L, in operation 1l-50, the UE 1l-5 may receive ailc-BitConfig from the master gNB 1l-10 (1l-20). In this case, the ailc-BitConfig configuration may be included and transmitted in otherConfig 1E of an RRC reconfiguration message of the NR RRC part. The UE 1l-5 that has received the ailc-BitConfig configuration may establish an AILC bit in a PDCP data PDU transmitted from an MN terminated DRB, which is configured with NR PDCP regardless of an SN bit (1l-25). In the case of a PDCP PDU in which an SDAP SDU in the PDCP PDU needs to be transmitted to the local cache, the UE 1l-5 may set the AILC bit to 1 for the corresponding PDCP data PDU and transmit the corresponding PDCP data PDU to the master gNB 1l-10 (1l-40). The UE 1l-5 may set the AILC bit to 0 for the other PDCP PDUs and transmit the other PDCP PDUs to the master gNB 1l-10 (1l-30). The master gNB 1l-10 that has received the PDCP PDU in which the AILC bit is 0 may transmit, to a 5GC 1l-18, the SDAP SDU transmitted through the received PDCP data PDU (1l-35). The master gNB 1l-10 that has received the PDCP PDU in which the AILC bit is 1 may transmit, to the collocated local cache 1l-15, the SDAP SDU included and transmitted in the corresponding PDCP PDU (1l-45).

Referring to FIG. 1L, in operation 1l-85, the UE 1l-5 may receive ailc-BitConfig2 from the master gNB 1l-10 (1l-55). Also, when SRB3 is configured, the UE 1l-5 may receive ailc-BitConfig2 the secondary eNB 1l-16. In this case, the ailc-BitConfig2 configuration may be included and transmitted in otherConfig 1E of an RRC reconfiguration message of the LTE RRC part. The UE 1*l*-5 that has received the ailc-BitConfig2 configuration may establish an AILC bit in a PDCP data PDU transmitted from an SN terminated DRB, regardless of an SN bit (1*l*-60). In the case of a PDCP PDU in which an SDAP SDU in the PDCP PDU needs to be transmitted to the local cache, the UE 1*l*-5 may set the AILC bit to 1 for the corresponding PDCP data PDU and transmit the corresponding PDCP data PDU to the secondary eNB 1*l*-16 (1*l*-75). The UE 1*l*-5 may set the AILC bit to 0 for the other PDCP PDUs and transmit the other PDCP PDUs to the secondary eNB 1*l*-16 (1*l*-65). The secondary eNB 1*l*-16 that has received the PDCP PDU in which the AILC bit is 0 may transmit the corresponding SDAP SDU to the 5GC 1*l*-18 (1*l*-70). The secondary eNB 1*l*-16 that has received the PDCP PDU in which the AILC bit is 1 may transmit, to the collocated local cache 1*l*-17, the SDAP SDU included and transmitted in the corresponding PDCP PDU (1*l*-80).

According to another embodiment, when the UE receives ailc-BitConfig from the master gNB without distinction between MN/SN terminated DRBs, the UE may establish an AILC bit for all DRBs. That is, when the SDAP SDUs included and transmitted in the PDCP PDUs transmitted from all DRBs are to be transmitted to the local cache, the UE may set the AILC bit of the PDCP data PDU including the SDAP SDU to 1; otherwise, the UE may set the AILC to 0. The serving node (master gNB or secondary eNB) that has received the corresponding PDCP data PDU may transmit, to its own local cache, the SDAP SDU included in the PDCP PDU in which the AILC bit of the PDCP data PDU is set to 1, and may transmit, to the 5GC, the SDAP SDU included in the PDCP PDU in which the AILC is set to 0.

Figure 1M:
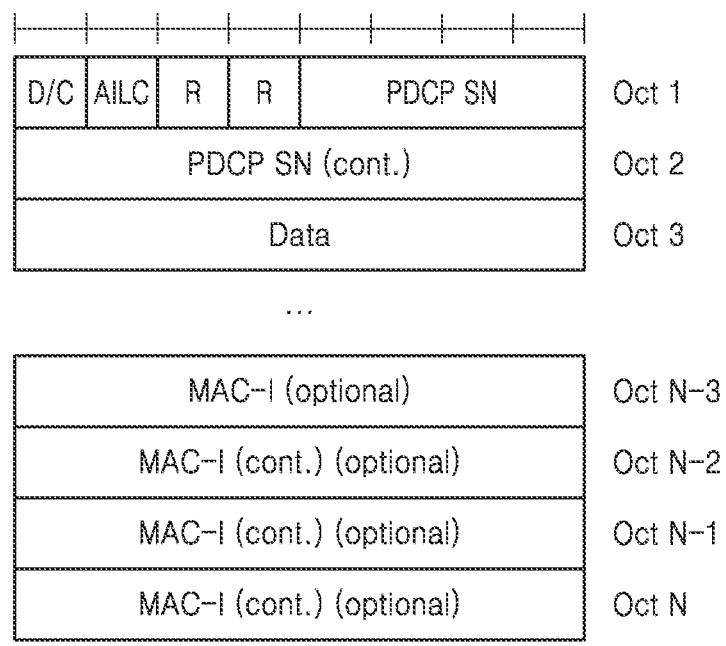
FIG. 1M is a diagram illustrating an embodiment of a PDCP data PDU format in which an AILC is established in the case of an NR PDCP in which a PDCP SN is 12 bits, according to some embodiments of the present disclosure.

FIG. 1M is a diagram illustrating an embodiment of a PDCP data PDU format in which an AILC bit is established in the case of an NR PDCP in which a PDCP SN is 12 bits, according to some embodiments of the present disclosure.

Referring to FIG. 1M, the second most significant bit of the first octet (Oct 1) may be a position to set an AILC bit. Also, according to an implementation method, a format in which AILC bits are set in positions of the third and fourth most significant bits of the first octet (Oct 1) of the remaining R bits may be possible. When AILC is 0, the PDCP SDU or SDAP SDU carried by the corresponding PDCP data PDU may not need to be transmitted to the local cache.

Figure 1N:
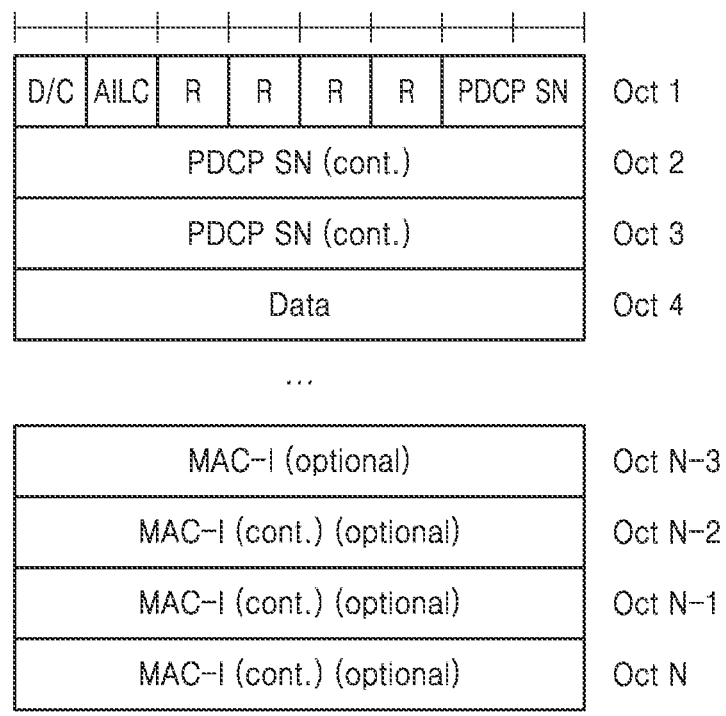
FIG. 1N is a diagram illustrating an embodiment of a PDCP data PDU format in which an AILC bit is established in the case of an NR PDCP in which a PDCP SN is 18 bits, according to some embodiments of the present disclosure.
Figure 10:
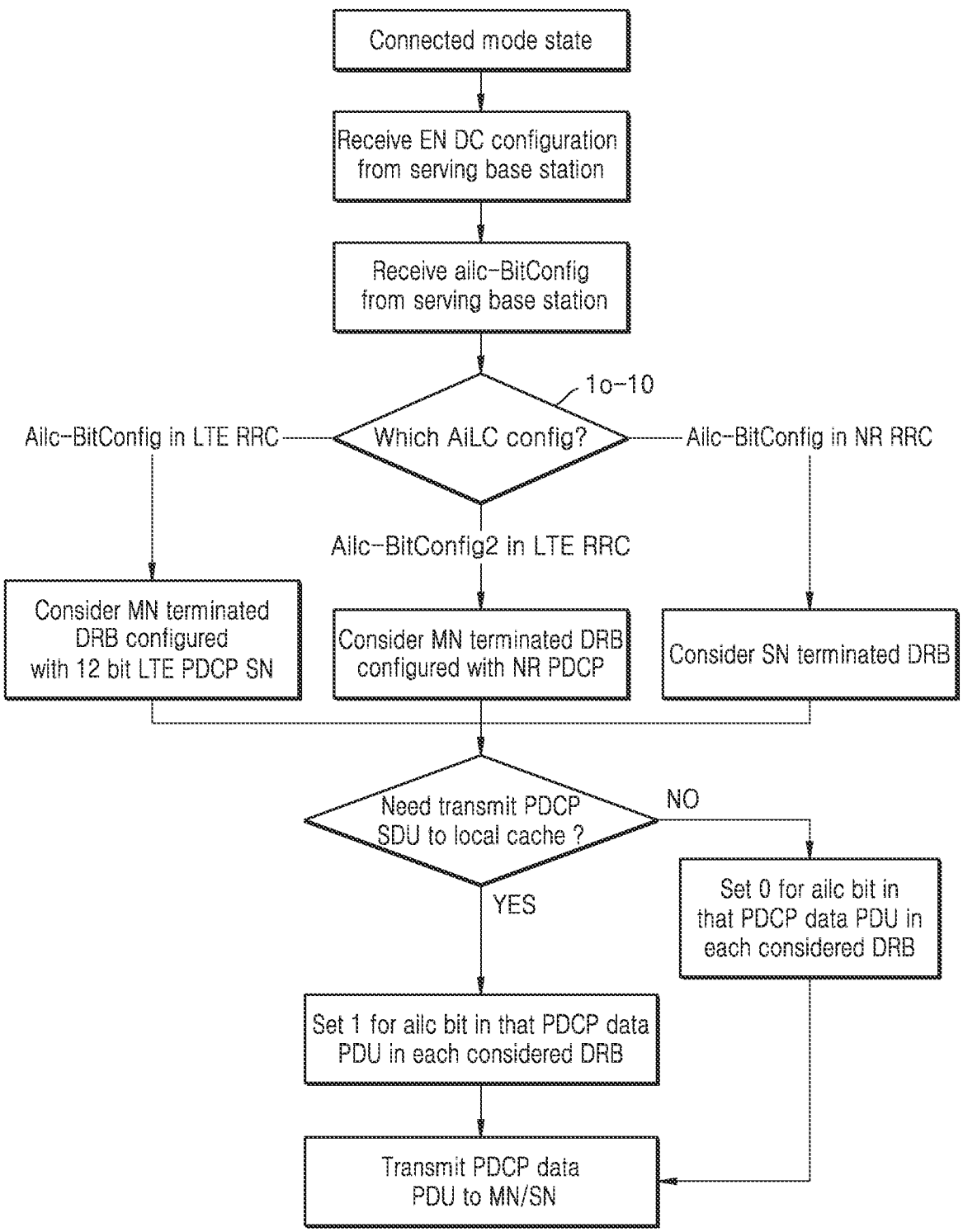

FIG. 1N is a diagram illustrating an embodiment of a PDCP data PDU format in which an AILC bit is established in the case of an NR PDCP in which a PDCP SN is 18 bits, according to some embodiments of the present disclosure.

Referring to FIG. 1N, the second most significant bit of the first octet (Oct 1) may be a position to set an AILC bit. Also, according to an implementation method, a format in which AILC bits are set in positions of the third, fourth, fifth, and sixth most significant bits of the first octet (Oct 1) of the remaining R bits may be possible. When AILC bit is 0, the PDCP SDU or SDAP SDU carried by the corresponding PDCP data PDU may not need to be transmitted to the local cache.

FIG. 1O is a diagram illustrating an embodiment of an operation of a UE for AILC configuration in an EN DC situation, according to some embodiments of the present disclosure.

Referring to FIG. 1O, a UE is connected to a serving base station. Thereafter, the UE may receive EN DC configuration from the serving base station. Thereafter, the UE may receive ailc-BitConfig via an RRC message. In this case, the UE may perform different operations according to the type of the received configuration. However, operations that may be performed by the UE are not exclusive, and may be independently performed according to each configuration.

According to some embodiments, when the UE receives ailc-BitConfig configuration in an LTE RRC part, the UE may consider only a DRB in which an LTE PDCP configured with a 12-bit PDCP SN is configured among MN terminated DRBs. Also, when ailc-BitConfig2 is configured in the LTE RRC part, the UE may consider all DRBs configured with NR PDCP among the MN terminated DRBs. Also, when ailc-BitConfig is configured in an NR RRC part, the UE may consider all SN terminated DRBs.

For the DRB considered in each case, when the UE determines that the corresponding PDCP SDU needs to be transmitted to a local cache, the UE may set the AILC bit of the PDCP data PDU carrying the corresponding PDCP SDU to 1; otherwise, the UE may set the AILC bit to 0. The UE may transmit the configured PDCP PDU to each receiving serving node (MN for MCG bearer, SN for SCG bearer, and MN and SN for split bearer). Thereafter, when necessary, transmission between nodes may be performed according to a terminating node. For example, the MN terminated DRB may be transmitted to the MN, and the SN terminated DRB may be transmitted to the SN. Operation 1*o*-10 is expressed as a branch, but may be independently configured at the same time, and when configured, each sub-operation may be independently performed.

Figure 1P:
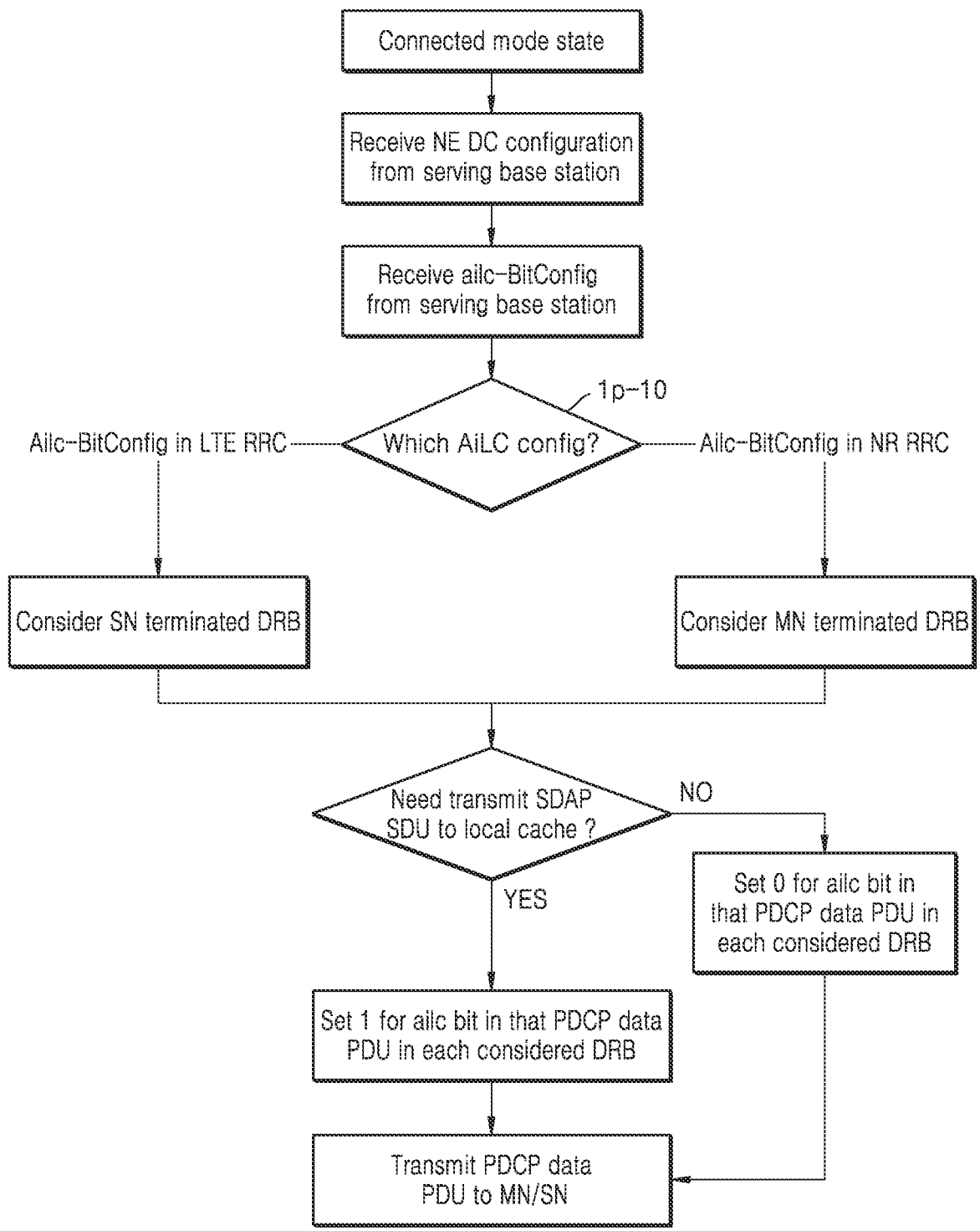
FIG. 1P is a flowchart illustrating an operation of a UE for AILC configuration in an NE DC situation, according to some embodiments of the present disclosure.

FIG. 1P is a flowchart illustrating an operation of a UE for AILC configuration in an NE DC situation, according to some embodiments of the present disclosure.

Referring to FIG. 1P, a UE is connected to a serving base station. Thereafter, the UE may receive NE DC configuration from the serving base station. Thereafter, the UE may receive ailc-BitConfig via an RRC message. In this case, the UE may perform different operations according to the type of the received configuration. However, operations that may be performed by the UE are not exclusive, and may be independently performed according to each configuration.

According to some embodiments, when ailc-BitConfig is configured in an LTE RRC part, the UE may consider all SN terminated DRBs. Also, when ailc-BitConfig is configured in an NR RRC part, the UE may consider all MN terminated DRBs. For the DRB considered in each case, when the UE determines that the corresponding SDAP SDU needs to be transmitted to a local cache, the UE may set the AILC bit of the PDCP data PDU carrying the corresponding SDAP SDU to 1; otherwise, the UE may set the AILC bit to 0. The UE may transmit the configured PDCP PDU to each receiving serving node (MN for MCG bearer, SN for SCG bearer, and MN and SN for split bearer). Thereafter, when necessary, transmission between nodes may be performed according to a terminating node. For example, the MN terminated DRB may be transmitted to the MN, and the SN terminated DRB may be transmitted to the SN. Operation 1*p*-10 is expressed as a branch, but may be independently configured at the same time, and when configured, each sub-operation may be independently performed.

Figure 1Q:
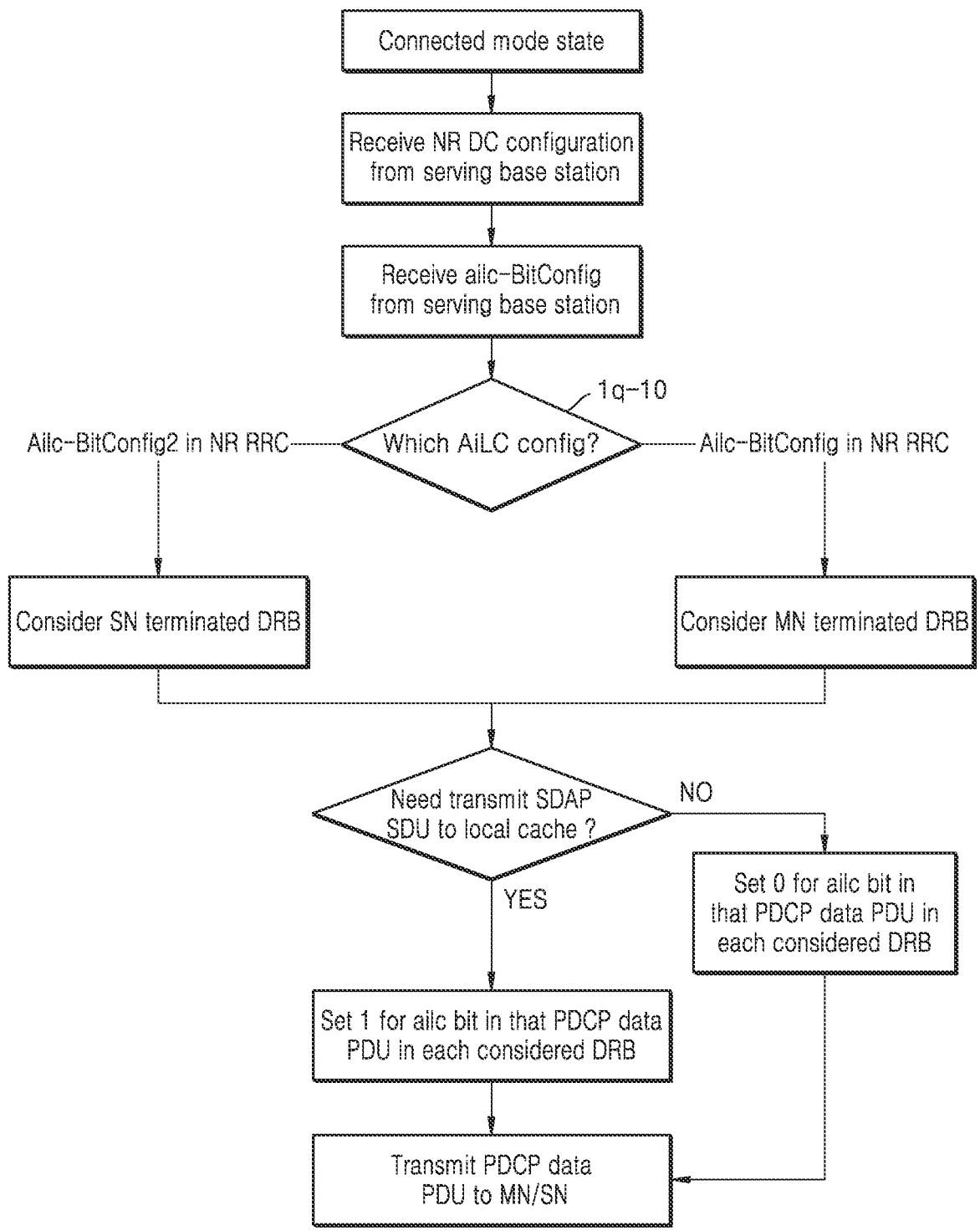
FIG. 1Q is a flowchart illustrating an operation of a UE for AILC configuration in an NR DC situation, according to some embodiments of the present disclosure.

FIG. 1Q is a flowchart illustrating an operation of a UE for AILC configuration in an NR DC situation, according to some embodiments of the present disclosure.

Referring to FIG. 1Q, a UE is connected to a serving base station. Thereafter, the UE may receive NR DC configuration from the serving base station. Thereafter, the UE may receive ailc-BitConfig via an RRC message. In this case, the UE may perform different operations according to the type of the received configuration. However, operations that may be performed by the UE are not exclusive, and may be independently performed according to each configuration.

According to some embodiments, when ailc-BitConfig2 is configured in an NR RRC part, the UE may consider all SN terminated DRBs. Also, when ailc-BitConfig is configured in an NR RRC part, the UE may consider all MN terminated DRBs. For the DRB considered in each case, when the UE determines that the corresponding SDAP SDU needs to be transmitted to a local cache, the UE may set the AILC bit of the PDCP data PDU carrying the corresponding SDAP SDU to 1; otherwise, the UE may set the AILC bit to 0. The UE may transmit the configured PDCP PDU to each receiving serving node (MN for MCG bearer, SN for SCG bearer, and MN and SN for split bearer). Thereafter, when necessary, transmission between nodes may be performed according to a terminating node. For example, the MN terminated DRB may be transmitted to the MN, and the SN terminated DRB may be transmitted to the SN. Operation 1q-10 is expressed as a branch, but may be independently configured at the same time, and when configured, each sub-operation may be independently performed.

According to another embodiment, when the base station configures ailc-BitConfig and transmits the configured ailc-BitConfig to the UE and the UE considers all MN and SN terminated DRBs and determines that an SDAP SDU transmitted from each DRB needs to be transmitted to the local cache, the UE may set the AILC bit of the PDCP data PDU carrying the corresponding SDAP SDU to 1; otherwise, the UE may set the AILC bit to 0. The UE may transmit the configured PDCP PDU to each serving node.

Figure 1R:
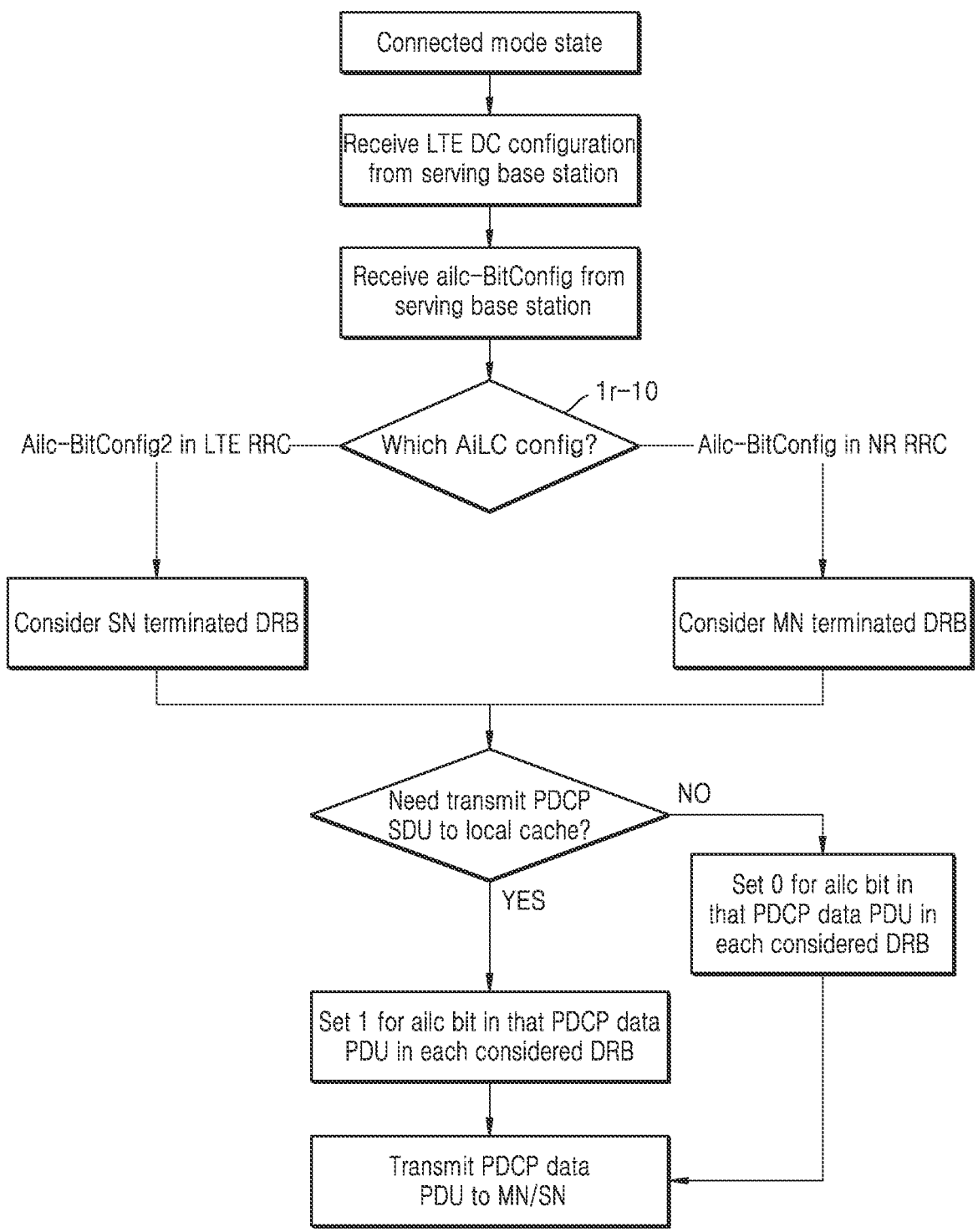
FIG. 1R is a flowchart illustrating an operation of a UE for AILC configuration in an LTE DC situation, according to some embodiments of the present disclosure.

FIG. 1R is a flowchart illustrating an operation of a UE for AILC configuration in an LTE DC situation, according to some embodiments of the present disclosure.

Referring to FIG. 1R, a UE is connected to a serving base station. Thereafter, the UE may receive LTE DC configuration from the serving base station. Thereafter, the UE may receive ailc-BitConfig via an RRC message. In this case, the UE may perform different operations according to the type of the received configuration. However, operations that may be performed by the UE are not exclusive, and may be independently performed according to each configuration.

According to some embodiments, when ailc-BitConfig2 is configured in an LTE RRC part, the UE may consider all SN terminated DRBs. Also, when ailc-BitConfig is configured in an LTE RRC part, the UE may consider all MN terminated DRBs. For the DRB considered in each case, when the UE determines that the corresponding PDCP SDU needs to be transmitted to a local cache, the UE may set the AILC bit of the PDCP data PDU carrying the corresponding PDCP SDU to 1; otherwise, the UE may set the AILC bit to 0. The UE may transmit the configured PDCP PDU to each receiving serving node (MN for MCG bearer, SN for SCG bearer, and MN and SN for split bearer). Thereafter, when necessary, transmission between nodes may be performed according to a terminating node. For example, the MN terminated DRB may be transmitted to the MN, and the SN terminated DRB may be transmitted to the SN. Operation 1r-10 is expressed as a branch, but may be independently configured at the same time, and when configured, each sub-operation may be independently performed.

According to another embodiment, when the base station configures ailc-BitConfig and transmits the configured ailc-BitConfig to the UE and the UE considers all MN and SN terminated DRBs and determines that a PDCP SDU transmitted from each DRB needs to be transmitted to the local cache, the UE may set the AILC bit of the PDCP data PDU carrying the corresponding PDCP SDU to 1; otherwise, the UE may set the AILC bit to 0. The UE may transmit the configured PDCP PDU to each serving node.

According to the embodiments of the present disclosure, the UE may perform indication for each packet requiring the local cache, and upon multiple connections, each base station may request separate packet separation according to whether the local cache is operated.

Figure 2A:
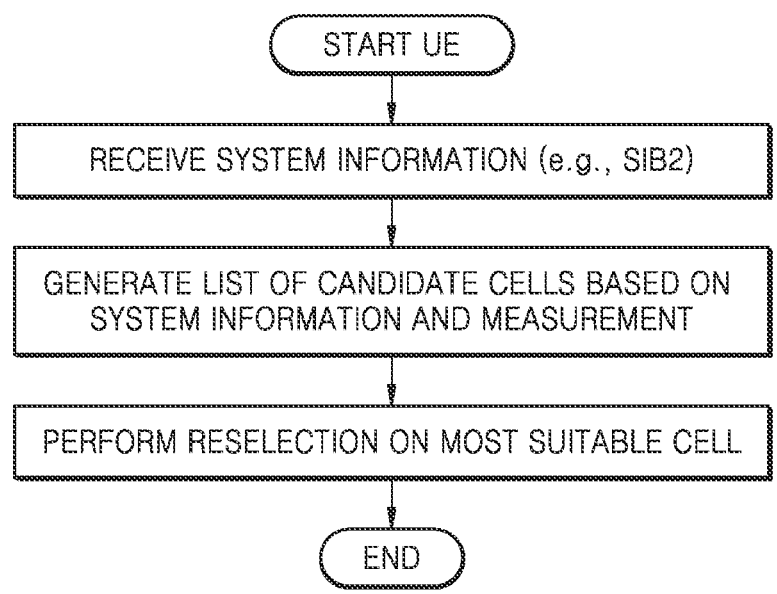
FIG. 2A is a flowchart illustrating a procedure, performed by a UE, of performing cell reselection, according to some embodiments of the present disclosure.

FIG. 2A is a flowchart illustrating a procedure, performed by a UE, of performing cell reselection, according to some embodiments of the present disclosure.

According to some embodiments, the UE may receive system information broadcast from a serving cell or a camped cell, for example, system information block (hereinafter referred to as SIB) 1, SIB2, SIB3, SIB4, ..., SIBN.

According to some embodiments, pieces of system information received by the UE may include SIBs including parameters that the UE may use to perform cell reselection such as intra-frequency, inter-frequency, or inter-RAT. Also, pieces of system information received by the UE may include SIBs including information about neighboring cells that may be measured by the UE.

According to some embodiments, the UE may measure neighboring cells based on the received system information, and may generate a list of candidate cells capable of cell reselection based on measurement values.

According to some embodiments, the UE that generates the list of candidate cells may select the most suitable cell from the list of candidate cells and perform cell reselection when necessary.

Figure 2B:
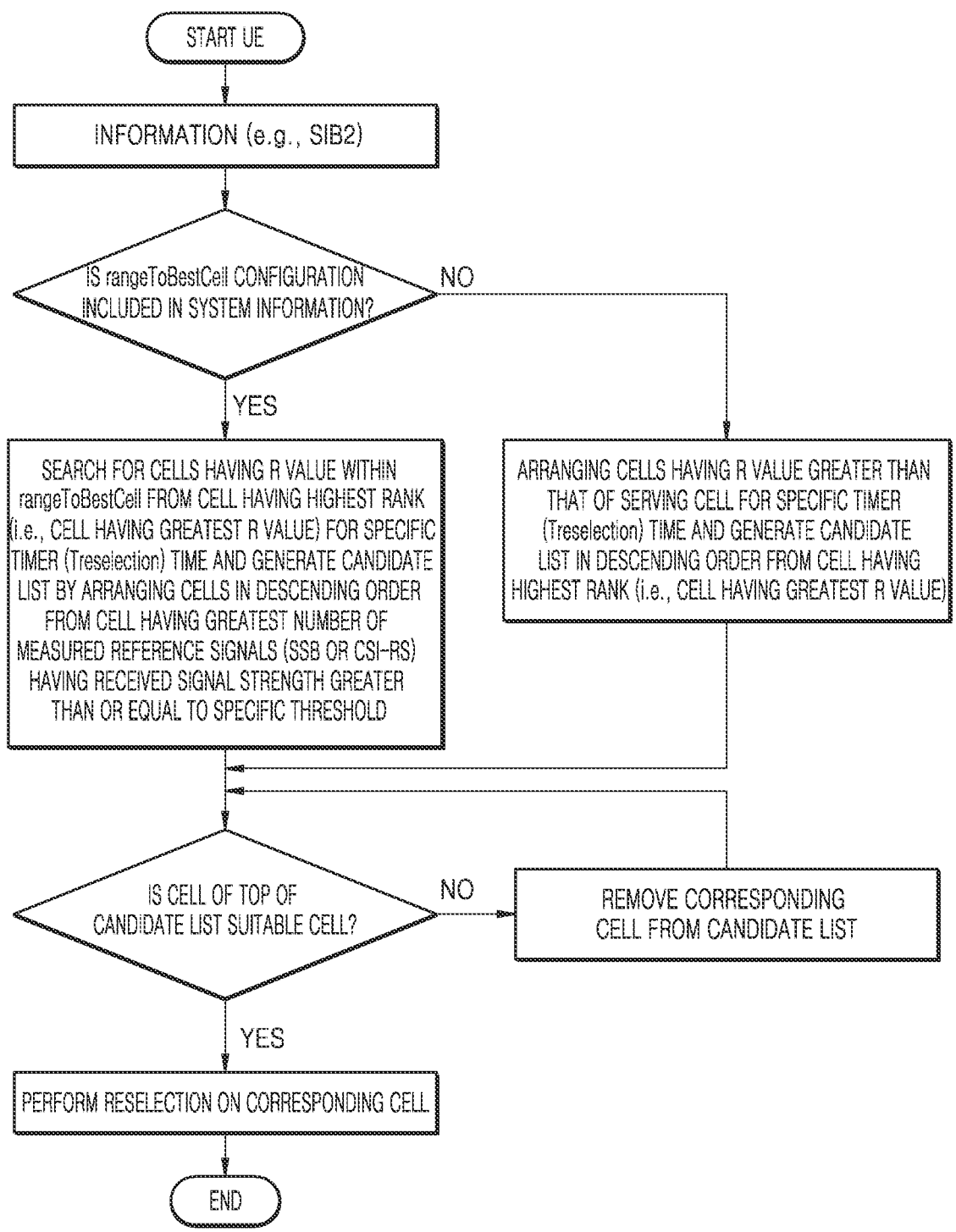
FIG. 2B is a flowchart illustrating a procedure, performed by a UE, of performing cell reselection according to rangeToBestCell configuration, according to some embodiments of the present disclosure.

FIG. 2B is a flowchart illustrating a procedure, performed by a UE, of performing cell reselection according to rangeToBestCell configuration, according to some embodiments of the present disclosure.

According to some embodiments, the UE may receive system information broadcast from a serving cell or a camped cell, for example, SIB 1, SIB2, SIB3, SIB4, ..., SIBN.

According to some embodiments, pieces of system information received by the UE may include SIBs including parameters that the UE may use to perform cell reselection such as intra-frequency, inter-frequency, or inter-RAT. Also, pieces of system information received by the UE may include SIBs including a rangeToBestCell parameter that determines the cell reselection operation of the UE. Also, pieces of system information received by the UE may include SIBs including a specific threshold that may determine whether the quality of beam represented by the corresponding RS is good by performing comparison with a measurement value for a synchronization signal block (hereinafter referred to as SSB) or CSI-RS when the UE performs the cell reselection operation, or thresholds for SSB and CSI-RS.

Also, pieces of system information received by the UE may include SIBs including information about neighboring cells that may be measured by the UE.

According to some embodiments, the UE may measure neighboring cells based on the received system information, and may calculate a cell rank selection value (hereinafter referred to as an R value) for comparing the performances of cells based on the measurement values as follows.

R value calculation formula of serving cell:

$$R_s = Q_{meas,s} + Q_{hyst} - Q\text{offset}_{temp}$$

R value calculation formula of cell other than neighboring serving cell:

$$R_n = Q_{meas,n} - Q\text{offset} - Q\text{offset}_{temp}$$

Here, $Q_{meas}$ is the RSRP measurement value of each cell.

Qoffset is determined as follows:

In the intra-frequency, when the value of Qoffset$_{s,n}$ is valid, the corresponding value is used; otherwise, 0 is substituted.

In the inter-frequency, when the value of Qoffset$_{s,n}$ is valid, the value of "Qoffset$_{s,n}$+Qoffset$_{frequency}$" is substituted; otherwise, the value of Qoffset$_{frequency}$ is substituted.

Qoffset$_{temp}$ is a temporarily applied offset value.

According to some embodiments, the UE in which rangeToBestCell is not configured may search for cells having an R value greater than that of a serving cell for a specific timer (Treselection) time, and may generate the list of candidate cells by arranging these cells in descending order from the cell having the highest rank (the cell having the greatest R value).

According to some embodiments, the UE in which rangeToBestCell is configured may search for cells in which the R value is within the rangeToBestCell range from the cell having the highest rank (i.e., the cell having the greatest R value) for the specific timer (Treselection) time, count the number of measured reference signals (SSB or CSI-RS) having a received signal strength greater than or equal to a specific threshold set from the system information for these cells, and may generate the list of candidate cells by arranging these cells in descending order from the cell having the greatest number of reference signals.

According to some embodiments, the UE may use one of the following various methods to induce the R value for the specific timer (Treselection) time.

- The average value of the measurement values of RSRP (RSRQ, RSSI, or SINR) of the reference signal (SSB or CSI-RS) measured for the specific timer (Treselection) time is taken and the R value is calculated using the average value.
- The R value is calculated using the measurement values of RSRP (RSRQ, RSSI, or SINR) of the reference signal (SSB or CSI-RS) measured before the specific timer (Treselection) time.
- The R value is calculated using the measurement values of RSRP (RSRQ, RSSI, or SINR) of the reference signal (SSB or CSI-RS) measured immediately before or immediately after the end of the specific timer (Treselection) time.
- A representative R value is derived by taking the average value of the R values calculated as the measurement value of RSRP (RSRQ, RSSI, or SINR) of the reference signal (SSB or CSI-RS) measured for the specific timer (Treselection) time.

According to some embodiments, the UE may receive the system information of the corresponding cell, for example, master information block (hereinafter referred to as MIB) and SIB, so as to determine whether the cell selected at the top of the list of candidate cells using the generated list of candidate cells is suitable for performing reselection. When there is a problem in performing access to the cell (for example, when the cell is a cell that is barred or does not provide a service required by the UE), the UE that has received the system information may remove the corresponding cell from the generated list of candidate cells and perform suitability determination again on another cell. In order to perform the cell suitability determination, the UE may determine whether the cell satisfies the following conditions.

1. Whether cell is selected or belongs to equivalent public land mobile network (PLMN) (SIB1)
2. Whether tracking area is not prohibited (SIB1)
3. Whether cell reselection condition is satisfied (SIB1)
4. Whether cell is determined to be barred or not barred (MIB/SIB1)

According to some embodiments, when there is a cell that has passed the above-described cell suitability determination, the UE may perform reselection on the corresponding cell.

FIG. 2C is a flowchart illustrating a procedure, performed by a UE, of performing cell reselection according to rangeToBestCell configuration, according to some embodiments of the present disclosure.

According to some embodiments, the UE may receive system information broadcast from a serving cell or a camped cell, for example, SIB 1, SIB2, SIB3, SIB4, . . . , SIBN.

According to some embodiments, pieces of system information received by the UE may include SIBs including parameters that the UE may use to perform cell reselection such as intra-frequency, inter-frequency, or inter-RAT. Also, pieces of system information received by the UE may include SIBs including a rangeToBestCell parameter that determines the cell reselection operation of the UE. Also, pieces of system information received by the UE may include SIBs including a specific threshold that may determine whether the quality of beam represented by the corresponding RS is good by performing comparison with a measurement value for SSB or CSI-RS when the UE performs the cell reselection operation, or thresholds for SSB and CSI-RS.

Also, pieces of system information received by the UE may include SIBs including information about neighboring cells that may be measured by the UE.

According to some embodiments, the UE may measure neighboring cells based on the received system information, and may calculate a cell rank selection value (hereinafter referred to as an R value) for comparing the performances of cells based on the measurement values as follows.

R value calculation formula of serving cell:

$$R_s = Q_{meas,s} + Q_{hyst} - Q\text{offset}_{temp}$$

R value calculation formula of cell other than neighboring serving cell:

$$R_n = Q_{meas,n} - Q\text{offset} - Q\text{offset}_{temp}$$

Here, $Q_{meas}$ is the RSRP measurement value of each cell.

Qoffset is determined as follows:

In the intra-frequency, when the value of Qoffset$_{s,n}$ is valid, the corresponding value is used; otherwise, 0 is substituted.

In the inter-frequency, when the value of Qoffset$_{s,n}$ is valid, the value of "Qoffset$_{s,n}$+Qoffset$_{frequency}$" is substituted; otherwise, the value of Qoffset$_{frequency}$ is substituted.

Qoffset$_{temp}$ is a temporarily applied offset value.

According to some embodiments, the UE in which rangeToBestCell is not configured may search for cells having an R value greater than that of a serving cell for a specific timer (Treselection) time, and may generate the list of candidate cells by arranging these cells in descending order from the cell having the highest rank (the cell having the greatest R value).

According to some embodiments, the UE in which rangeToBestCell is configured may search for cells having R values within the rangeToBestCell range from the cell having the highest rank (i.e., the cell having the greatest R value) for the specific timer (Treselection) time, and may determine whether the serving cell also corresponds to this.

According to some embodiments, when the R value of the serving cell is not within the rangeToBestCell range from the cell having the highest rank (i.e., the cell having the greatest R value), the UE may count the number of measured reference signals (SSB or CSI-RS) having a received signal strength greater than or equal to a specific threshold value set from the system information with respect to neighboring cells included in the rangeToBestCell range, and may generate the list of candidate cells by arranging these cells in descending order from the cell having the greatest number of corresponding reference signals.

According to some embodiments, when the R value of the serving cell is within the rangeToBestCell range from the cell having the highest rank (i.e., the cell having the greatest R value), the UE may count the number of measured reference signals (SSB or CSI-RS) having a received signal strength greater than or equal to a specific threshold value set from the system information with respect to the serving cell and neighboring cells included in the rangeToBestCell range, may generate the list of candidate cells by selecting only cells having a greater number of corresponding reference signals than the serving cell and arranging these cells in descending order from the cell with the greatest number of corresponding reference signals.

According to some embodiments, the UE may use one of the following various methods to induce the R value for the specific timer (Treselection) time.

The average value of the measurement values of RSRP (RSRQ, RSSI, or SINR) of the reference signal (SSB or CSI-RS) measured for the specific timer (Treselection) time is taken and the R value is calculated using the average value.

The R value is calculated using the measurement values of RSRP (RSRQ, RSSI, or SINR) of the reference signal (SSB or CSI-RS) measured before the specific timer (Treselection) time.

The R value is calculated using the measurement values of RSRP (RSRQ, RSSI, or SINR) of the reference signal (SSB or CSI-RS) measured immediately before or immediately after the end of the specific timer (Treselection) time.

A representative R value is derived by taking the average value of the R values calculated as the measurement value of RSRP (RSRQ, RSSI, or SINR) of the reference signal (SSB or CSI-RS) measured for the specific timer (Treselection) time.

According to some embodiments, the UE may receive the system information of the corresponding cell (e.g., MIB and SIB) so as to determine whether the cell selected at the top of the list of candidate cells using the generated list of candidate cells is suitable for performing reselection. When there is a problem in performing access to the cell (for example, when the cell is a cell that is barred or does not provide a service required by the UE), the UE that has received the system information may remove the corresponding cell from the generated list of candidate cells and perform suitability determination again on another cell. In order to perform cell suitability determination, the UE may determine whether the cell satisfies the following conditions.
  1. Whether cell is selected or belongs to equivalent PLMN (SIB1)
  2. Whether tracking area is not prohibited (SIB1)
  3. Whether cell reselection condition is satisfied (SIB1)
  4. Whether cell is determined to be barred or not barred (MIB/SIB1)

According to some embodiments, when there is a cell that has passed the above-described cell suitability determination, the UE may perform reselection on the corresponding cell.

Figure 2D:
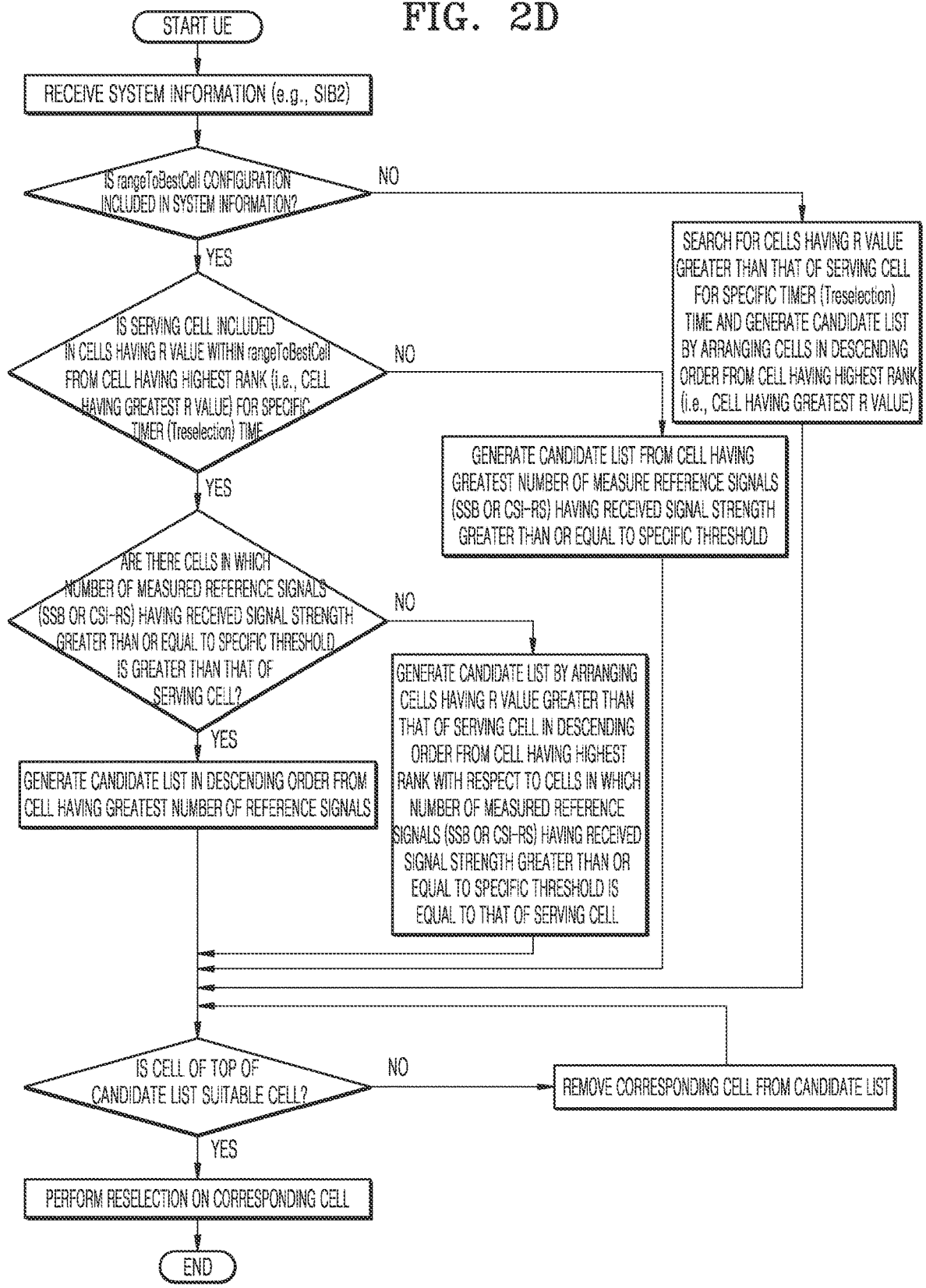
FIG. 2D is a flowchart illustrating a procedure, performed by a UE, of performing cell reselection according to rangeToBestCell configuration, according to some embodiments of the present disclosure.

FIG. 2D is a flowchart illustrating a procedure, performed by a UE, of performing cell reselection according to rangeToBestCell configuration, according to some embodiments of the present disclosure.

According to some embodiments, the UE may receive system information broadcast from a serving cell or a camped cell, for example, SIB 1, SIB2, SIB3, SIB4, . . . , SIBN.

According to some embodiments, pieces of system information received by the UE may include SIBs including parameters that the UE may use to perform cell reselection such as intra-frequency, inter-frequency, or inter-RAT. Also, pieces of system information received by the UE may include SIBs including a rangeToBestCell parameter that determines the cell reselection operation of the UE. Also, pieces of system information received by the UE may include SIBs including a specific threshold that may determine whether the quality of beam represented by the corresponding RS is good by performing comparison with a measurement value for SSB or CSI-RS when the UE performs the cell reselection operation, or thresholds for SSB and CSI-RS.

Also, pieces of system information received by the UE may include SIBs including information about neighboring cells that may be measured by the UE.

According to some embodiments, the UE may measure neighboring cells based on the received system information, and may calculate a cell rank selection value (hereinafter referred to as an R value) for comparing the performances of cells based on the measurement values as follows.

R value calculation formula of serving cell:

$$R_s = Q_{meas,s} + Q_{hyst} - Q\text{offset}_{temp}$$

R value calculation formula of cell other than neighboring serving cell:

$$R_n = Q_{meas,n} - Q\text{offset} - Q\text{offset}_{temp}$$

Here, $Q_{meas}$ is the RSRP measurement value of each cell.

Qoffset is determined as follows:

In the intra-frequency, when the value of $Q\text{offset}_{s,n}$ is valid, the corresponding value is used; otherwise, 0 is substituted.

In the inter-frequency, when the value of $Q\text{offset}_{s,n}$ is valid, the value of "$Q\text{offset}_{s,n} + Q\text{offset}_{frequency}$" is substituted; otherwise, the value of $Q\text{offset}_{frequency}$ is substituted.

$Q\text{offset}_{temp}$ is a temporarily applied offset value.

According to some embodiments, the UE in which rangeToBestCell is not configured may search for cells having an R value greater than that of a serving cell for a specific timer (Treselection) time, and may generate the list of candidate cells by arranging these cells in descending order from the cell having the highest rank (the cell having the greatest R value).

According to some embodiments, the UE in which rangeToBestCell is configured may search for cells having R values within the rangeToBestCell range from the cell having the highest rank (i.e., the cell having the greatest R value) for the specific timer (Treselection) time, and may determine whether the serving cell also corresponds to this.

According to some embodiments, when the R value of the serving cell is not within the rangeToBestCell range from the cell having the highest rank (i.e., the cell having the greatest R value), the UE may count the number of measured reference signals (SSB or CSI-RS) having a received signal strength greater than or equal to a specific threshold value set from the system information with respect to neighboring cells included in the rangeToBestCell range, and may generate the list of candidate cells by arranging these cells in descending order from the cell having the greatest number of corresponding reference signals.

According to some embodiments, when the R value of the serving cell is within the rangeToBestCell range from the cell having the highest rank (i.e., the cell having the greatest R value), the UE may count the number of measured reference signals (SSB or CSI-RS) having a received signal strength greater than or equal to a specific threshold value set from the system information with respect to the serving cell and neighboring cells included in the rangeToBestCell range, and may determine whether there are cells having a greater number of reference signals than that of the serving cell.

According to some embodiments, when there are cells whose number of reference signals satisfying the above-described condition is greater than that of the serving cell, the UE may generate the list of candidate cells by selecting only these cells and arranging these cells in descending order from the cell having the greatest number of corresponding reference signals.

According to some embodiments, when there are no cells whose number of reference signals satisfying the above-described condition is greater than that of the serving cell and there are cells whose number of reference signals is equal to that of the serving cell, the UE may generate the list of candidate cells by selecting only these cells, selecting only cells having an R value greater than an R value of the serving cell, and arranging these cells in descending order from the cell having the highest rank (the cell having the greatest R value).

According to some embodiments, when there are no cells whose number of reference signals satisfying the above-described condition is greater than or equal to that of the serving cell, the UE may not perform cell reselection.

According to some embodiments, in another condition, when there are cells whose number of reference signals satisfying the above-described condition is greater than or equal to that of the serving cell, the UE may first generate the list of candidate cells by arranging the cells, whose number of reference signals is greater than that of the serving cell, in descending order from the cell having the greatest number of reference signals, and then, may select only cells having an R value greater than an R value of the serving cell with respect to the cells whose number of reference signals satisfying the above-described condition is equal to that of the serving cell, arrange the cells in descending order, and add the cells to the list of candidate cells.

According to some embodiments, the UE may use one of the following various methods to induce the R value for the specific timer (Treselection) time.

The average value of the measurement values of RSRP (RSRQ, RSSI, or SINR) of the reference signal (SSB or CSI-RS) measured for the specific timer (Treselection) time is taken and the R value is calculated using the average value.

The R value is calculated using the measurement values of RSRP (RSRQ, RSSI, or SINR) of the reference signal (SSB or CSI-RS) measured before the specific timer (Treselection) time.

The R value is calculated using the measurement values of RSRP (RSRQ, RSSI, or SINR) of the reference signal (SSB or CSI-RS) measured immediately before or immediately after the end of the specific timer (Treselection) time.

A representative R value is derived by taking the average value of the R values calculated as the measurement value of RSRP (RSRQ, RSSI, or SINR) of the reference signal (SSB or CSI-RS) measured for the specific timer (Treselection) time.

According to some embodiments, the UE may receive the system information of the corresponding cell (e.g., MIB and SIBs) so as to determine whether the cell selected at the top of the list of candidate cells using the generated list of candidate cells is suitable for performing reselection. When there is a problem in performing access to the cell (for example, when the cell is a cell that is barred or does not provide a service required by the UE), the UE that has received the system information may remove the corresponding cell from the generated list of candidate cells and perform suitability determination again on another cell. In order to perform cell suitability determination, the UE may determine whether the cell satisfies the following conditions.

1. Whether cell is selected or belongs to equivalent PLMN (SIB1)
2. Whether tracking area is not prohibited (SIB1)
3. Whether cell reselection condition is satisfied (SIB1)
4. Whether cell is determined to be barred or not barred (MIB/SIB1)

According to some embodiments, when there is a cell that has passed the above-described cell suitability determination, the UE may perform reselection on the corresponding cell.

Figure 2E:
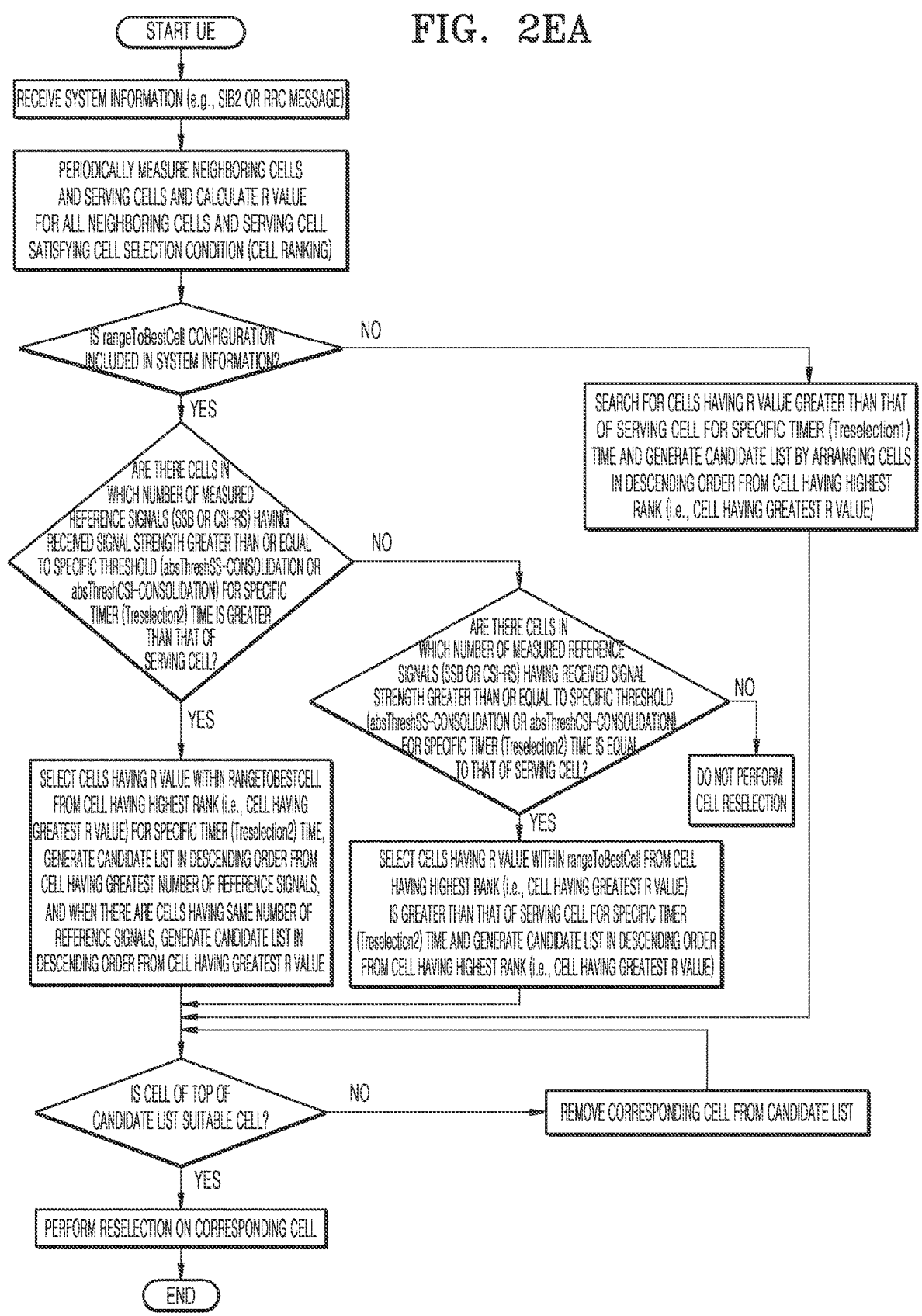
FIG. 2EA is a flowchart illustrating a procedure, performed by a UE, of performing cell reselection according to rangeToBestCell configuration, according to some embodiments of the present disclosure.
Figure 2E:
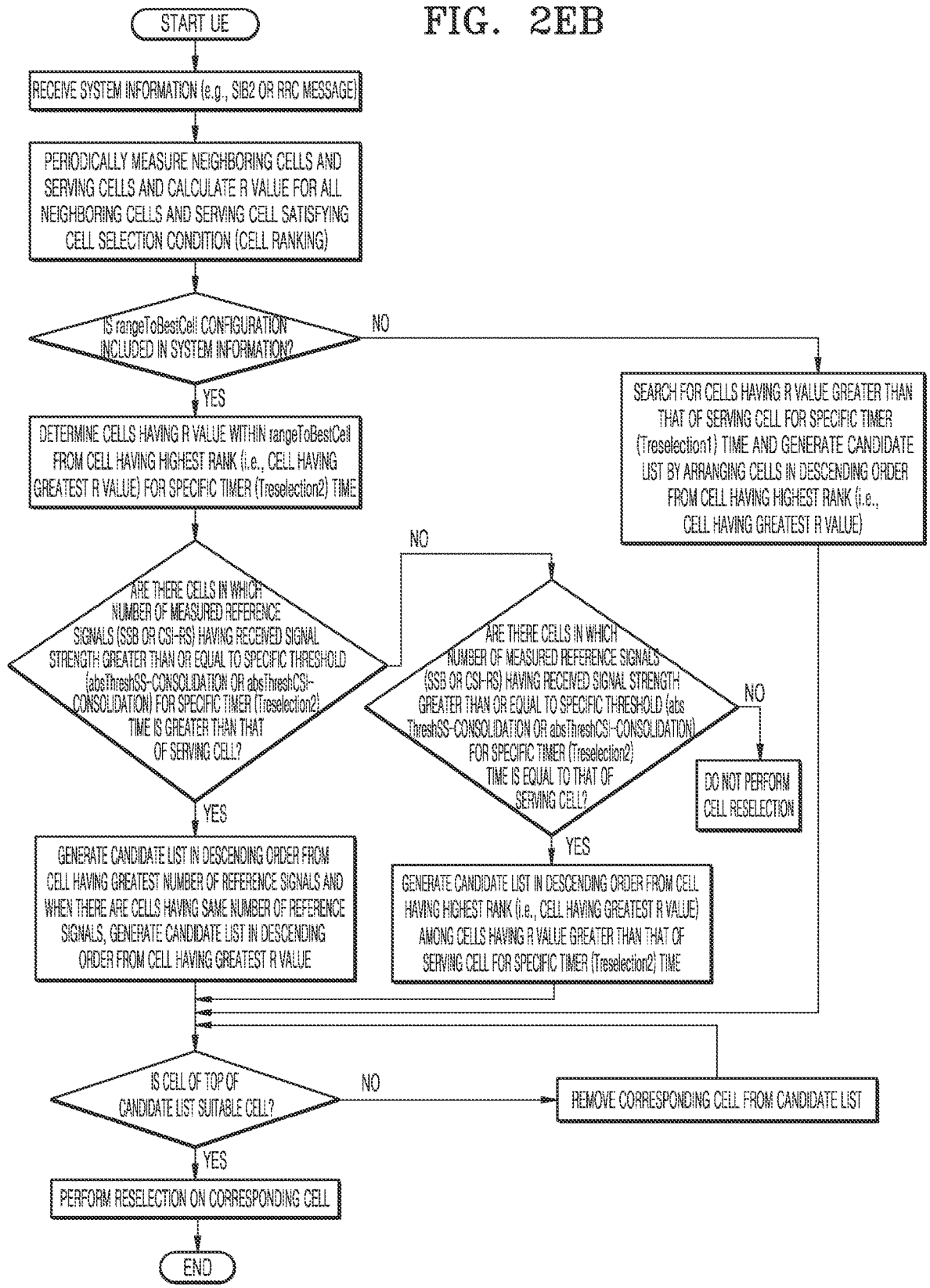
Figure 2E:
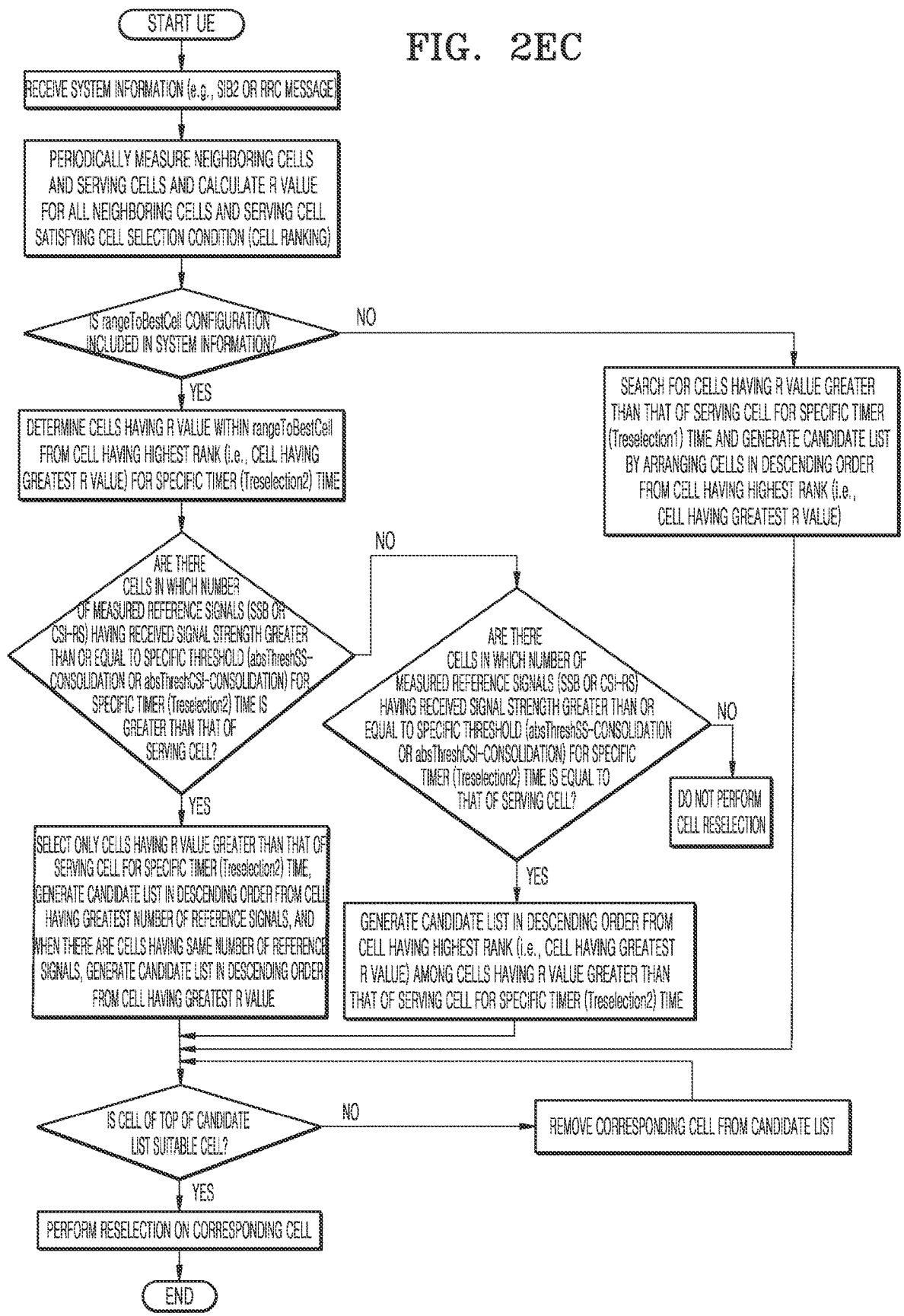

FIG. 2EA is a flowchart illustrating a procedure, performed by a UE, of performing cell reselection according to rangeToBestCell configuration, according to some embodiments of the present disclosure.

According to some embodiments, the UE may receive system information broadcast from a serving cell or a camped cell, for example, SIB 1, SIB2, SIB3, SIB4, . . . , SIBN.

According to some embodiments, pieces of system information received by the UE may include SIBs including parameters that the UE may use to perform cell reselection such as intra-frequency, inter-frequency, or inter-RAT. Also, pieces of system information received by the UE may include SIBs including a rangeToBestCell parameter that determines the cell reselection operation of the UE. Also, pieces of system information received by the UE may include SIBs including a specific threshold (absThreshSS-Consolidation or absThreshCSI-Consolidation) that may determine whether the quality of beam represented by the corresponding RS is good by performing comparison with a measurement value for SSB or CSI-RS when the UE performs the cell reselection operation, or thresholds for SSB and CSI-RS. Also, pieces of system information received by the UE may include SIBs including specific timers (Treselection1 or Treselection2) used by the UE to perform reselection on a serving cell and neighboring cells. Also, pieces of system information received by the UE may include SIBs including information about neighboring cells that may be measured by the UE.

According to some embodiments, the above-described parameters may be any RRC message that may be received when the UE accesses the serving cell, for example, RRC Connection Reconfiguration, RRC Reconfiguration, RRC Resume, or RRC Release message.

According to some embodiments, the UE may measure neighboring cells based on the continuously received system information, and may identify cells that satisfy the following cell selection condition. According to an embodiment, the cell selection condition may be calculated as follows:

Cell selection condition S is based on the satisfaction of the following conditions:

Srxlev>0 AND Squal>0

In this case,

Srxlev=$Q_{rxlevmeas}-(Q_{rxlevmin}+Q_{rxlevminoffset})-P_{compensation}-Q\text{offset}_{temp}$ Squal=$Q_{qualmeas}-(Q_{qualmin}+Q_{qualminoffset})-Q\text{offset}_{temp}$ Here, Srxlev is a cell selection reception level value (dB).

Squal is a cell selection quality value (dB).

$Q\text{offset}_{temp}$ is a temporarily applied offset value for each cell.

$Q_{rxlevmeas}$ is a measured cell reception level value (RSRP).

$Q_{qualmeas}$ is a measured cell quality level value (RSRQ).

$Q_{rxlevmin}$ is a minimum reception level value (dBm) required by cell.

$Q_{qualmin}$ is a minimum quality level value (dB) required by cell.

$Q_{rxlevminoffset}$ is an offset value of $Q_{rxlevmin}$ reflected in Srxlev.

$Q_{qualminoffset}$ is an offset value of $Q_{qualmin}$ reflected in Squal.

When UE is configured with additionalPmax, Pcompensation is calculated as max($P$EMAX1−$P$PowerClass,0)−(min($P$EMAX2, $P$PowerClass)−min($P$EMAX1,$P$PowerClass)) (dB);

otherwise, $P_{compensation}$ is calculated as max($P$EMAX1−$P$PowerClass,0)(dB).

Here, $P_{EMAX1}$ and $P_{EMAX2}$ are the maximum transmit power levels (dBm) of the UE and may be obtained from p-Max in NS-PmaxList.

$P_{PowerClass}$ is the maximum RF output power (dBm) of the UE.

According to some embodiments, the UE may calculate the R value based on the measurement value of each cell for the serving cell and all neighboring cells satisfying the above-described cell selection condition S. According to some embodiments, the UE may calculate the cell rank selection value (R value) for comparing the performances of the cells based on the measurement value of each cell as follows.

R value calculation formula of serving cell:

$R_s=Q_{meas,s}+Q_{hyst}-Q\text{offset}_{temp}$

R value calculation formula of cell other than neighboring serving cell:

$R_n=Q_{meas,n}-Q\text{offset}-Q\text{offset}_{temp}$

Here, $Q_{meas}$ is the received signal received power (RSRP) measurement value of each cell.

Qoffset is determined as follows:

In the intra-frequency, when the value of $Q\text{offset}_{s,n}$ is valid, the corresponding value is used; otherwise, 0 is substituted.

In the inter-frequency, when the value of $Q\text{offset}_{s,n}$ is valid, the value of "$Q\text{offset}_{s,n}+Q\text{offset}_{frequency}$" is substituted; otherwise, the value of $Q\text{offset}_{frequency}$ is substituted.

$Q\text{offset}_{temp}$ is a temporarily applied offset value.

According to some embodiments, the UE may determine whether rangeToBestCell is configured.

According to some embodiments, the UE in which rangeToBestCell is not configured may search for cells having an R value greater than that of a serving cell for a specific timer (Treselection) time, and may generate the list of candidate cells by arranging these cells in descending order from the cell having the highest rank (the cell having the greatest R value).

According to some embodiments, the UE in which rangeToBestCell is configured may determine whether there are cells whose number of measured reference signals (SSB or CSI-RS) having a received signal strength greater than or equal to a specific threshold (absThreshSS-Consolidation or absThreshCSI-Consolidation) for the specific timer (Treselection2) time is greater than that of the serving cell.

According to some embodiments, when there are cells whose number of reference signals satisfying the above-described condition is greater than that of the serving cell, the UE may select the cells having the R value within rangeToBestCell from the cell having the highest rank (i.e., the cell having the greatest R value) for the specific timer (Treselection2) time among these cells, and may generate the list of candidate cells in descending order from the cell having the greatest number of corresponding reference signals. When the serving cell is the cell having the highest rank and there are no other cells having the R value within rangeToBestCell, the UE may stop cell reselection and may not perform cell reselection. When there are cells having the same number of reference signals among these cells, the cells may be included in the list of candidate cells in descending order from the cell having the greatest R value.

According to some embodiments, when there are cells whose number of reference signals satisfying the above-described condition is equal to that of the serving cell, the UE may select the cells having the R value within rangeToBestCell from the cell having the highest rank (i.e., the cell having the greatest R value) for the specific timer (Treselection2) time among these cells, may select the cells having an R value greater than that of the serving cell for the specific timer (Treselection2) time among the cells, and may include the cells in the list of candidate cells in descending order from the cell having the greatest R value. When the serving cell is the cell having the highest rank and there are no other cells having the R value within rangeToBestCell, the UE may stop cell reselection and may not perform cell reselection.

According to an embodiment, the condition for determining whether there are cells whose number of reference signals satisfying the above-described condition is equal to that of the serving cell may be determined before or after the condition for determining whether there are cells whose number of reference signals satisfying the above-described condition is greater than that of the serving cell, or may be determined only when there are no cells whose number of reference signals is greater than that of the serving cell.

According to some embodiments, when there are even no cells whose number of reference signals satisfying the above-described condition is equal to that of the serving cell, the UE may stop the cell reselection operation and may not perform cell reselection.

According to some embodiments, the UE may use one of the following various methods to induce the R value for the specific timer (Treselection) time.

The average value of the measurement values of RSRP (RSRQ, RSSI, or SINR) of the reference signal (SSB or CSI-RS) measured for the specific timer (Treselection) time is taken and the R value is calculated using the average value.

The R value is calculated using the measurement values of RSRP (RSRQ, RSSI, or SINR) of the reference signal (SSB or CSI-RS) measured before the specific timer (Treselection) time.

The R value is calculated using the measurement values of RSRP (RSRQ, RSSI, or SINR) of the reference signal (SSB or CSI-RS) measured immediately before or immediately after the end of the specific timer (Treselection) time.

A representative R value is derived by taking the average value of the R values calculated as the measurement value of RSRP (RSRQ, RSSI, or SINR) of the reference signal (SSB or CSI-RS) measured for the specific timer (Treselection) time.

According to some embodiments, the UE may receive the system information of the corresponding cell (e.g., MIB and SIBs) so as to determine whether the cell selected at the top of the list of candidate cells using the generated list of candidate cells is suitable for performing reselection. When there is a problem in performing access to the cell (for example, when the cell is a cell that is barred or does not provide a service required by the UE), the UE that has received the system information may remove the corresponding cell from the generated list of candidate cells and perform suitability determination again on another cell. In order to perform cell suitability determination, the UE may determine whether the cell satisfies the following conditions.

1. Whether cell is selected or belongs to equivalent PLMN (SIB1)
2. Whether tracking area is not prohibited (SIB1)
3. Whether cell reselection condition is satisfied (SIB1)
4. Whether cell is determined to be barred or not barred (MIB/SIB1)

According to some embodiments, when there is a cell that has passed the above-described cell suitability determination, the UE may perform reselection on the corresponding cell.

Among the operations of the UE described in the aforementioned embodiments, the operation of performing the measurements on the serving cell and the neighboring cells and calculating the R values for all cells that satisfy the cell selection condition may be periodically performed by the UE even while the UE performs other operations.

The operations of the UE described in the aforementioned embodiments may be performed sequentially, but may be performed by changing the order.

In the aforementioned embodiments, the specific timers, e.g., Treselection1 and Treselection2, may be one timer having the same value, e.g., Treselection, and each timer may have a value of 0 or infinity as the same value. When each timer has a value of 0 or infinity, the UE may derive an R value as a result of one instant measurement and perform an operation.

The cell reselection procedure of the UE for this purpose may be as follows:

In all situations, the UE performs cell reselection when the following conditions are satisfied.

When rangeToBestCell is not configured (in the current serving cell):

A new cell has to have a ranking higher than that of the serving cell for a certain time Treselection$_{RAT}$;

The UE has to have been camped on the current serving cell for at least one second.

When rangeToBestCell is configured (in the current serving cell):

A new cell has to have more beams having a value greater than absThreshSS-Consolidation than the serving cell for a certain time Treselection$_{RAT}$;

A new cell has to have an R value included in rangeToBestCell from an R value of a cell having the highest rank for a certain time Treselection$_{RAT}$.

The UE has to have been camped on the current serving cell for at least one second.

FIG. 2EB is a flowchart illustrating a procedure, performed by a UE, of performing cell reselection according to rangeToBestCell configuration, according to some embodiments of the present disclosure.

According to some embodiments, the UE may receive system information broadcast from a serving cell or a camped cell, for example, SIB 1, SIB2, SIB3, SIB4, . . . , SIBN.

According to some embodiments, pieces of system information received by the UE may include SIBs including parameters that the UE may use to perform cell reselection such as intra-frequency, inter-frequency, or inter-RAT. Also, pieces of system information received by the UE may include SIBs including a rangeToBestCell parameter that determines the cell reselection operation of the UE. Also, pieces of system information received by the UE may include SIBs including a specific threshold (absThreshSS-Consolidation or absThreshCSI-Consolidation) that may determine whether the quality of beam represented by the corresponding RS is good by performing comparison with a measurement value for SSB or CSI-RS when the UE performs the cell reselection operation, or thresholds for SSB and CSI-RS. Also, pieces of system information received by the UE may include SIBs including specific timers (Treselection1 or Treselection2) used by the UE to perform reselection on a serving cell and neighboring cells. Also, pieces of system information received by the UE may include SIBs including information about neighboring cells that may be measured by the UE.

According to some embodiments, the above-described parameters may be any RRC message that may be received when the UE accesses the serving cell, for example, RRC Connection Reconfiguration, RRC Reconfiguration, RRC Resume, or RRC Release message.

According to some embodiments, the UE may measure neighboring cells based on the continuously received system information, and may identify cells that satisfy the following cell selection condition. According to an embodiment, the cell selection condition may be calculated as follows:

Cell selection condition S is based on the satisfaction of the following conditions:

$$Srxlev>0 \text{ AND } Squal>0$$

In this case, $$Srxlev=Q_{rxlevmeas}-(Q_{rxlevmin}+Q_{rxlevminoffset})-P_{compensation}-Qoffset_{temp}$$

$$Squal=Q_{qualmeas}-(Q_{qualmin}+Q_{qualminoffset})-Qoffset_{temp}$$

Here,

Srxlev is a cell selection reception level value (dB).

Squal is a cell selection quality value (dB).

Qoffset$_{temp}$ is a temporarily applied offset value for each cell.

Q$_{rxlevmeas}$ is a measured cell reception level value (RSRP).

Q$_{qualmeas}$ is a measured cell quality level value (RSRQ).

$Q_{rxlevmin}$ is a minimum reception level value (dBm) required by cell.

$Q_{qualmin}$ is a minimum quality level value (dB) required by cell.

$Q_{rxlevminoffset}$ is an offset value of $Q_{rxlevmin}$ reflected in Srxlev.

$Q_{qualminoffset}$ is an offset value of $Q_{qualmin}$ reflected in Squal.

When UE is configured with additionalPmax, Pcompensation is calculated as max($P$EMAX1−$P$PowerClass,0)−(min($P$EMAX2, $P$PowerClass)−min($P$EMAX1,$P$PowerClass)) (dB);

otherwise, Pcompensation is calculated as max($P$EMAX1−$P$PowerClass,0)(dB).

Here, $P_{EMAX1}$ and $P_{EMAX2}$ are the maximum transmit power levels (dBm) of the UE and may be obtained from p-Max in NS-PmaxList.

$P_{PowerClass}$ is the maximum RF output power (dBm) of the UE.

According to some embodiments, the UE may calculate the R value based on the measurement value of each cell for the serving cell and all neighboring cells satisfying the above-described cell selection condition S. According to some embodiments, the UE may calculate the cell rank selection value (R value) for comparing the performances of the cells based on the measurement value of each cell as follows.

R value calculation formula of serving cell:

$R_s = Q_{meas,s} + Q_{hyst} - Q\text{offset}_{temp}$

R value calculation formula of cell other than neighboring serving cell:

$R_n = Q_{meas,n} - Q\text{offset} - Q\text{offset}_{temp}$

Here, $Q_{meas}$ is the RSRP measurement value of each cell.

Qoffset is determined as follows:

In the intra-frequency, when the value of $Q\text{offset}_{s,n}$ is valid, the corresponding value is used; otherwise, 0 is substituted.

In the inter-frequency, when the value of $Q\text{offset}_{s,n}$ is valid, the value of "$Q\text{offset}_{s,n} + Q\text{offset}_{frequency}$" is substituted; otherwise, the value of $Q\text{offset}_{frequency}$ is substituted.

$Q\text{offset}_{temp}$ is a temporarily applied offset value.

According to some embodiments, the UE may determine whether rangeToBestCell is configured.

According to some embodiments, the UE in which rangeToBestCell is not configured may search for cells having an R value greater than that of a serving cell for a specific timer (Treselection1) time, and may generate the list of candidate cells by arranging these cells in descending order from the cell having the highest rank (the cell having the greatest R value).

According to some embodiments, the UE in which rangeToBestCell is configured may determine cells having R values within the rangeToBestCell range from the cell having the highest rank (i.e., the cell having the greatest R value) for the specific timer (Treselection2) time. When the serving cell is the cell having the highest rank and there are no other cells having the R value within rangeToBestCell, the UE may stop cell reselection and may not perform cell reselection.

According to some embodiments, the UE may determine whether there are cells, among the determined cells, whose number of measured reference signals (SSB or CSI-RS) having a received signal strength greater than or equal to a specific threshold (absThreshSS-Consolidation or absThreshCSI-Consolidation) for the specific timer (Treselection2) time is greater than that of the serving cell.

According to some embodiments, when there are cells whose number of reference signals satisfying the above-described condition is greater than that of the serving cell, the UE may generate the list of candidate cells in descending order from the cell having the greatest number of corresponding reference signals among these cells. When there are cells having the same number of reference signals among these cells, the cells may be included in the candidate list in descending order from the cell having the greatest R value.

According to some embodiments, when there are cells whose number of reference signals satisfying the above-described condition is equal to that of the serving cell, the UE may select the cells having an R value greater than that of the serving cell for the specific timer (Treselection2) time among these cells, and may include the cells in the candidate list in descending order from the cell having the greatest R value.

According to an embodiment, the condition for determining whether there are cells whose number of reference signals satisfying the above-described condition is equal to that of the serving cell may be determined before or after the condition for determining whether there are cells whose number of reference signals satisfying the above-described condition is greater than that of the serving cell, or may be determined only when there are no cells whose number of reference signals is greater than that of the serving cell.

According to some embodiments, when there are even no cells whose number of reference signals satisfying the above-described condition is equal to that of the serving cell, the UE may stop the cell reselection operation and may not perform cell reselection.

According to some embodiments, the UE may use one of the following various methods to induce the R value for the specific timer (Treselection) time.

The average value of the measurement values of RSRP (RSRQ, RSSI, or SINR) of the reference signal (SSB or CSI-RS) measured for the specific timer (Treselection) time is taken and the R value is calculated using the average value.

The R value is calculated using the measurement values of RSRP (RSRQ, RSSI, or SINR) of the reference signal (SSB or CSI-RS) measured before the specific timer (Treselection) time.

The R value is calculated using the measurement values of RSRP (RSRQ, RSSI, or SINR) of the reference signal (SSB or CSI-RS) measured immediately before or immediately after the end of the specific timer (Treselection) time.

A representative R value is derived by taking the average value of the R values calculated as the measurement value of RSRP (RSRQ, RSSI, or SINR) of the reference signal (SSB or CSI-RS) measured for the specific timer (Treselection) time.

According to some embodiments, the UE may receive the system information of the corresponding cell (e.g., MIB and SIBs) so as to determine whether the cell selected at the top of the list of candidate cells using the generated list of candidate cells is suitable for performing reselection. When there is a problem in performing access to the cell (for example, when the cell is a cell that is barred or does not provide a service required by the UE), the UE that has received the system information may remove the corresponding cell from the generated list of candidate cells and perform suitability determination again on another cell. In order to perform cell suitability determination, the UE may determine whether the cell satisfies the following conditions.

1. Whether cell is selected or belongs to equivalent PLMN (SIB1)
2. Whether tracking area is not prohibited (SIB1)
3. Whether cell reselection condition is satisfied (SIB1)
4. Whether cell is determined to be barred or not barred (MIB/SIB1)

According to some embodiments, when there is a cell that has passed the above-described cell suitability determination, the UE may perform reselection on the corresponding cell.

Among the UE operations described in the aforementioned embodiments, the operation of performing the measurements on the serving cell and the neighboring cells and calculating the R values for all cells that satisfy the cell selection condition may be periodically performed by the UE even while the UE performs other operations.

The operations of the UE described in the aforementioned embodiments may be performed sequentially, but may be performed by changing the order.

In the aforementioned embodiments, the specific timers, e.g., Treselection1 and Treselection2, may be one timer having the same value, e.g., Treselection, and each timer may have a value of 0 or infinity as the same value. When each timer has a value of 0 or infinity, the UE may derive an R value as a result of one instant measurement and perform an operation.

FIG. 2EC is a flowchart illustrating a procedure, performed by a UE, of performing cell reselection according to rangeToBestCell configuration, according to some embodiments of the present disclosure.

According to some embodiments, the UE may receive system information broadcast from a serving cell or a camped cell, for example, SIB 1, SIB2, SIB3, SIB4, . . . , SIBN.

According to some embodiments, pieces of system information received by the UE may include SIBs including parameters that the UE may use to perform cell reselection such as intra-frequency, inter-frequency, or inter-RAT. Also, pieces of system information received by the UE may include SIBs including a rangeToBestCell parameter that determines the cell reselection operation of the UE. Also, pieces of system information received by the UE may include SIBs including a specific threshold (absThreshSS-Consolidation or absThreshCSI-Consolidation) that may determine whether the quality of beam represented by the corresponding RS is good by performing comparison with a measurement value for SSB or CSI-RS when the UE performs the cell reselection operation, or thresholds for SSB and CSI-RS. Also, pieces of system information received by the UE may include SIBs including specific timers (Treselection1 or Treselection2) used by the UE to perform reselection on a serving cell and neighboring cells. Also, pieces of system information received by the UE may include SIBs including information about neighboring cells that may be measured by the UE.

According to some embodiments, the above-described parameters may be any RRC message that may be received when the UE accesses the serving cell, for example, RRC Connection Reconfiguration, RRC Reconfiguration, RRC Resume, or RRC Release message.

According to some embodiments, the UE may measure neighboring cells based on the continuously received system information, and may identify cells that satisfy the following cell selection condition. According to an embodiment, the cell selection condition may be calculated as follows:

Cell selection condition S is based on the satisfaction of the following conditions:

$Srxlev>0$ AND $Squal>0$

In this case, $Srxlev = Q_{rxlevmeas} - (Q_{rxlevmin} + Q_{rxlevminoffset}) - P_{compensation} - Q\text{offset}_{temp}$ $Squal = Q_{qualmeas} - (Q_{qualmin} + Q_{qualminoffset}) - Q\text{offset}_{temp}$ Here, Srxlev is a cell selection reception level value (dB).

Squal is a cell selection quality value (dB).

$Q\text{offset}_{temp}$ is a temporarily applied offset value for each cell.

$Q_{rxlevmeas}$ is a measured cell reception level value (RSRP).

$Q_{qualmeas}$ is a measured cell quality level value (RSRQ).

$Q_{rxlevmin}$ is a minimum reception level value (dBm) required by cell.

$Q_{qualmin}$ is a minimum quality level value (dB) required by cell.

$Q_{rxlevminoffset}$ is an offset value of $Q_{rxlevmin}$ reflected in Srxlev.

$Q_{qualminoffset}$ is an offset value of $Q_{qualmin}$ reflected in Squal.

When UE is configured with additionalPmax, Pcompensation is calculated as $\max(P_{EMAX1} - P_{PowerClass}, 0) - (\min(P_{EMAX2}, P_{PowerClass}) - \min(P_{EMAX1}, P_{PowerClass}))$ (dB);

otherwise, Pcompensation is calculated as $\max(P_{EMAX1} - P_{PowerClass}, 0)$ (dB).

Here, $P_{EMAX1}$ and $P_{EMAX2}$ are the maximum transmit power levels (dBm) of the UE and may be obtained from p-Max in NS-PmaxList.

$P_{PowerClass}$ is the maximum RF output power (dBm) of the UE.

According to some embodiments, the UE may calculate the R value based on the measurement value of each cell for the serving cell and all neighboring cells satisfying the above-described cell selection condition S. According to some embodiments, the UE may calculate the cell rank selection value (R value) for comparing the performances of the cells based on the measurement value of each cell as follows.

R value calculation formula of serving cell:

$R_s = Q_{meas,s} + Q_{hyst} - Q\text{offset}_{temp}$

R value calculation formula of cell other than neighboring serving cell:

$R_n = Q_{meas,n} - Q\text{offset} - Q\text{offset}_{temp}$

Here, $Q_{meas}$ is the RSRP measurement value of each cell.

Qoffset is determined as follows:

In the intra-frequency, when the value of $Q\text{offset}_{s,n}$ is valid, the corresponding value is used; otherwise, 0 is substituted.

In the inter-frequency, when the value of $Q\text{offset}_{s,n}$ is valid, the value of "$Q\text{offset}_{s,n} + Q\text{offset}_{frequency}$" is substituted; otherwise, the value of $Q\text{offset}_{frequency}$ is substituted.

$Q\text{offset}_{temp}$ is a temporarily applied offset value.

According to some embodiments, the UE may determine whether rangeToBestCell is configured.

According to some embodiments, the UE in which rangeToBestCell is not configured may search for cells having an R value greater than that of a serving cell for a specific timer (Treselection1) time, and may generate the list of candidate cells by arranging these cells in descending order from the cell having the highest rank (the cell having the greatest R value).

According to some embodiments, the UE in which rangeToBestCell is configured may determine cells having R values within the rangeToBestCell range from the cell having the highest rank (i.e., the cell having the greatest R value) for the specific timer (Treselection2) time. When the serving cell is the cell having the highest rank and there are no other cells having the R value within rangeToBestCell, the UE may stop cell reselection and may not perform cell reselection.

According to some embodiments, the UE may determine whether there are cells, among the determined cells, whose number of measured reference signals (SSB or CSI-RS) having a received signal strength greater than or equal to a specific threshold (absThreshSS-Consolidation or absThreshCSI-Consolidation) for the specific timer (Treselection2) time is greater than that of the serving cell.

According to some embodiments, when there are cells whose number of reference signals satisfying the above-described condition is greater than that of the serving cell, the UE may select the cells having an R value greater than that of the serving cell for the specific timer (Treselection2) time among these cells, and may generate the list of candidate cells in descending order from the cell having the greatest number of corresponding reference signals among the cells. When there are cells having the same number of reference signals among these cells, the cells may be included in the candidate list in descending order from the cell having the greatest R value.

According to some embodiments, when there are cells whose number of reference signals satisfying the above-described condition is equal to that of the serving cell, the UE may select the cells having an R value greater than that of the serving cell for the specific timer (Treselection2) time among these cells, and may include the cells in the candidate list in descending order from the cell having the greatest R value.

According to an embodiment, the condition for determining whether there are cells whose number of reference signals satisfying the above-described condition is equal to that of the serving cell may be determined before or after the condition for determining whether there are cells whose number of reference signals satisfying the above-described condition is greater than that of the serving cell, or may be determined only when there are no cells whose number of reference signals is greater than that of the serving cell.

According to some embodiments, when there are even no cells whose number of reference signals satisfying the above-described condition is equal to that of the serving cell, the UE may stop the cell reselection operation and may not perform cell reselection.

According to some embodiments, the UE may use one of the following various methods to induce the R value for the specific timer (Treselection) time.

The average value of the measurement values of RSRP (RSRQ, RSSI, or SINR) of the reference signal (SSB or CSI-RS) measured for the specific timer (Treselection) time is taken and the R value is calculated using the average value.

The R value is calculated using the measurement values of RSRP (RSRQ, RSSI, or SINR) of the reference signal (SSB or CSI-RS) measured before the specific timer (Treselection) time.

The R value is calculated using the measurement values of RSRP (RSRQ, RSSI, or SINR) of the reference signal (SSB or CSI-RS) measured immediately before or immediately after the end of the specific timer (Treselection) time.

A representative R value is derived by taking the average value of the R values calculated as the measurement value of RSRP (RSRQ, RSSI, or SINR) of the reference signal (SSB or CSI-RS) measured for the specific timer (Treselection) time.

According to some embodiments, the UE may receive the system information of the corresponding cell (e.g., MIB and SIBs) so as to determine whether the cell selected at the top of the list of candidate cells using the generated list of candidate cells is suitable for performing reselection. When there is a problem in performing access to the cell (for example, when the cell is a cell that is barred or does not provide a service required by the UE), the UE that has received the system information may remove the corresponding cell from the generated list of candidate cells and perform suitability determination again on another cell. In order to perform cell suitability determination, the UE may determine whether the cell satisfies the following conditions.
1. Whether cell is selected or belongs to equivalent PLMN (SIB1)
2. Whether tracking area is not prohibited (SIB1)
3. Whether cell reselection condition is satisfied (SIB1)
4. Whether cell is determined to be barred or not barred (MIB/SIB1)

According to some embodiments, when there is a cell that has passed the above-described cell suitability determination, the UE may perform reselection on the corresponding cell.

Among the UE operations described in the aforementioned embodiments, the operation of performing the measurements on the serving cell and the neighboring cells and calculating the R values for all cells that satisfy the cell selection condition may be periodically performed by the UE even while the UE performs other operations.

The operations of the UE described in the aforementioned embodiments may be performed sequentially, but may be performed by changing the order.

In the aforementioned embodiments, the specific timers, e.g., Treselection1 and Treselection2, may be one timer having the same value, e.g., Treselection, and each timer may have a value of 0 or infinity as the same value. When each timer has a value of 0 or infinity, the UE may derive an R value as a result of one instant measurement and perform an operation.

Figure 2F:
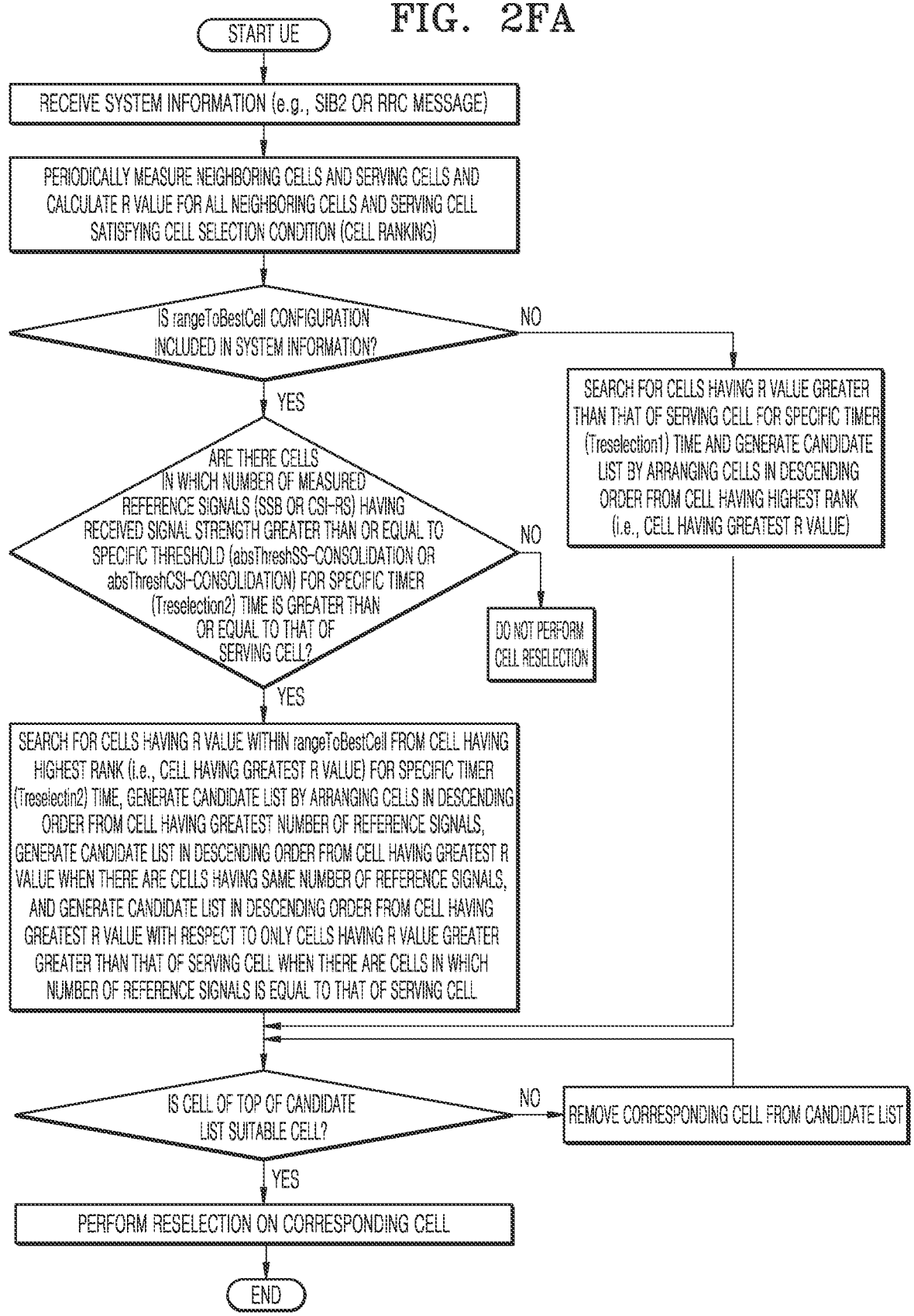
FIG. 2FA is a flowchart illustrating a procedure, performed by a UE, of performing cell reselection according to rangeToBestCell configuration, according to some embodiments of the present disclosure.
Figure 2F:
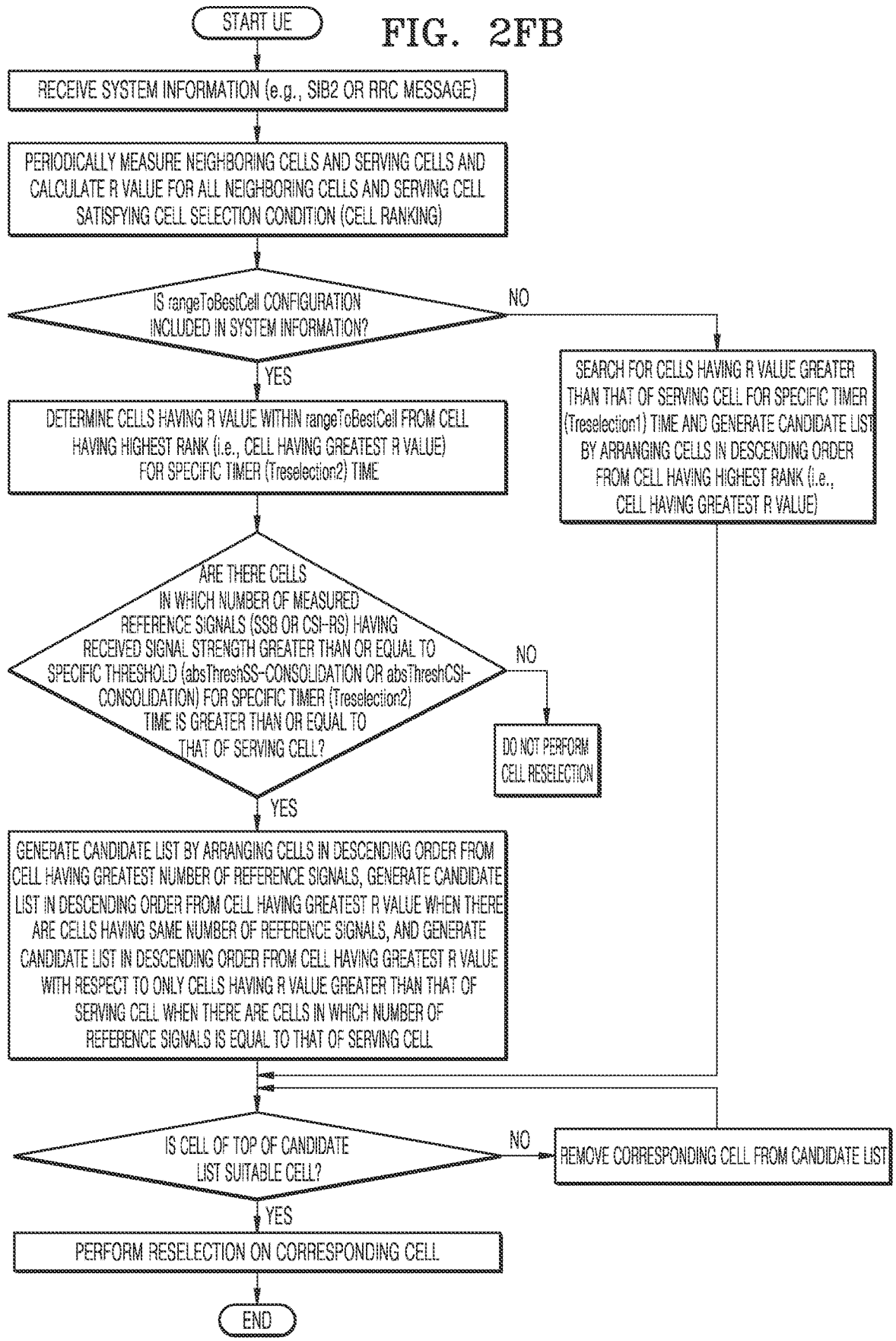
Figure 2F:
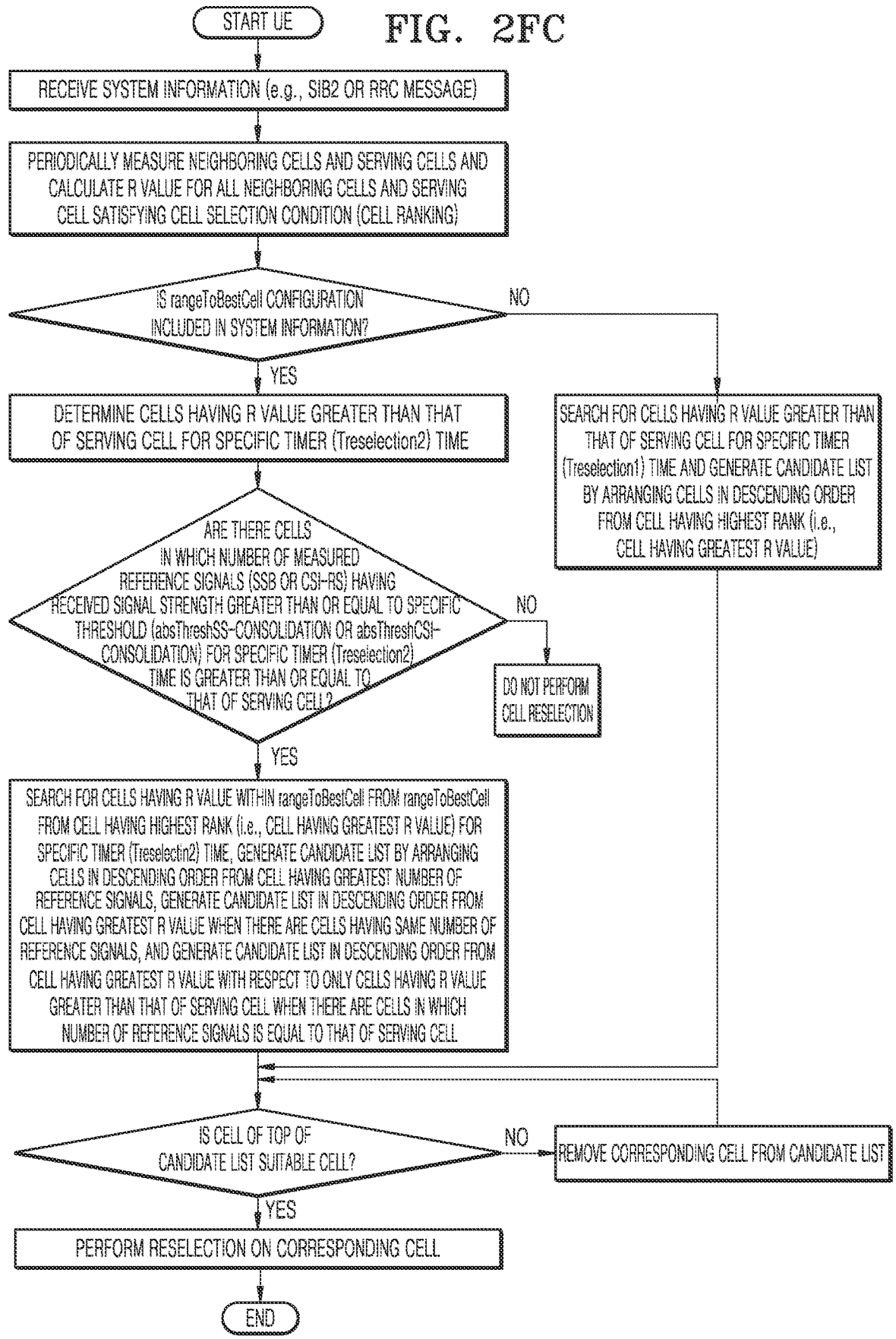
Figure 2F:
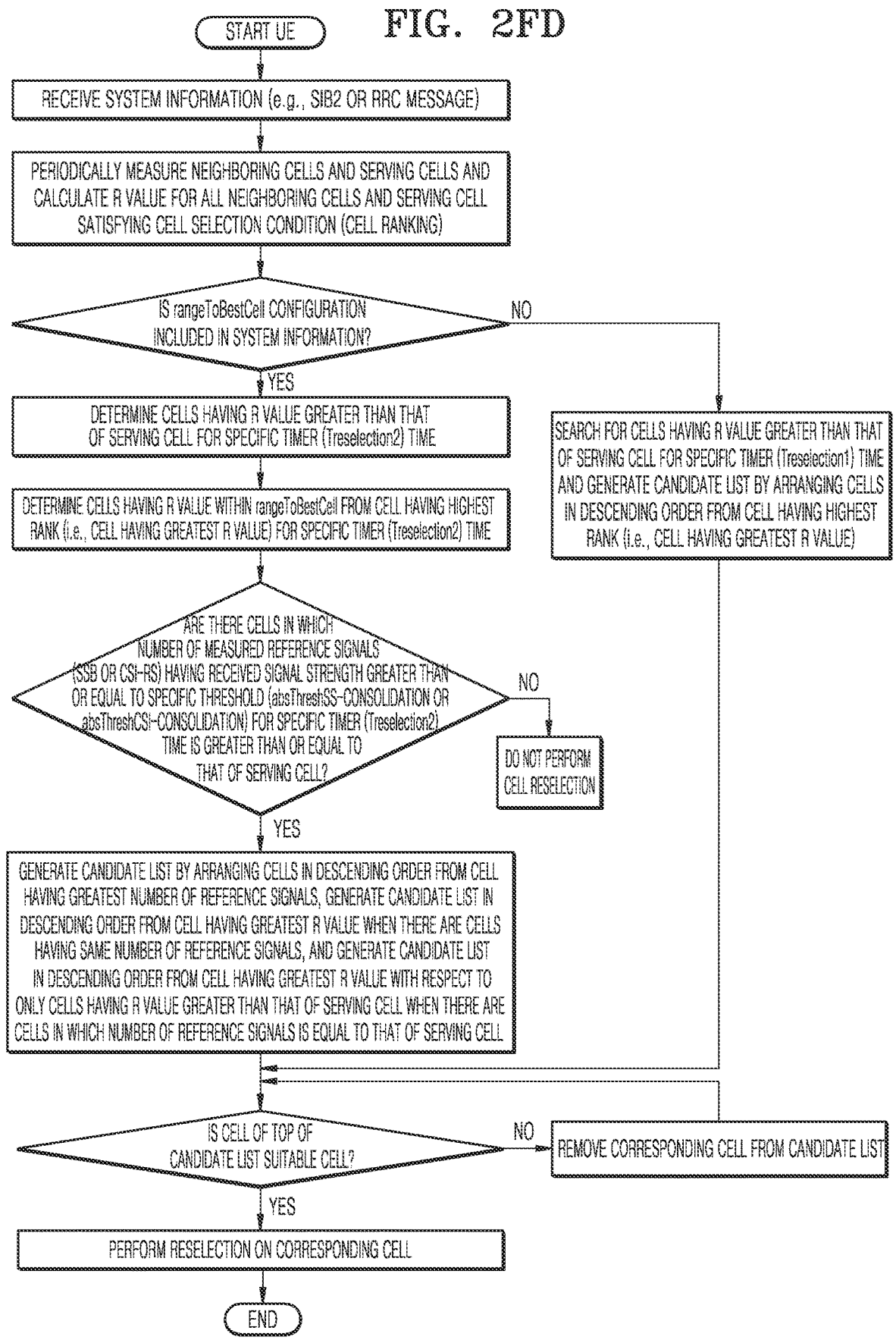
Figure 2F:
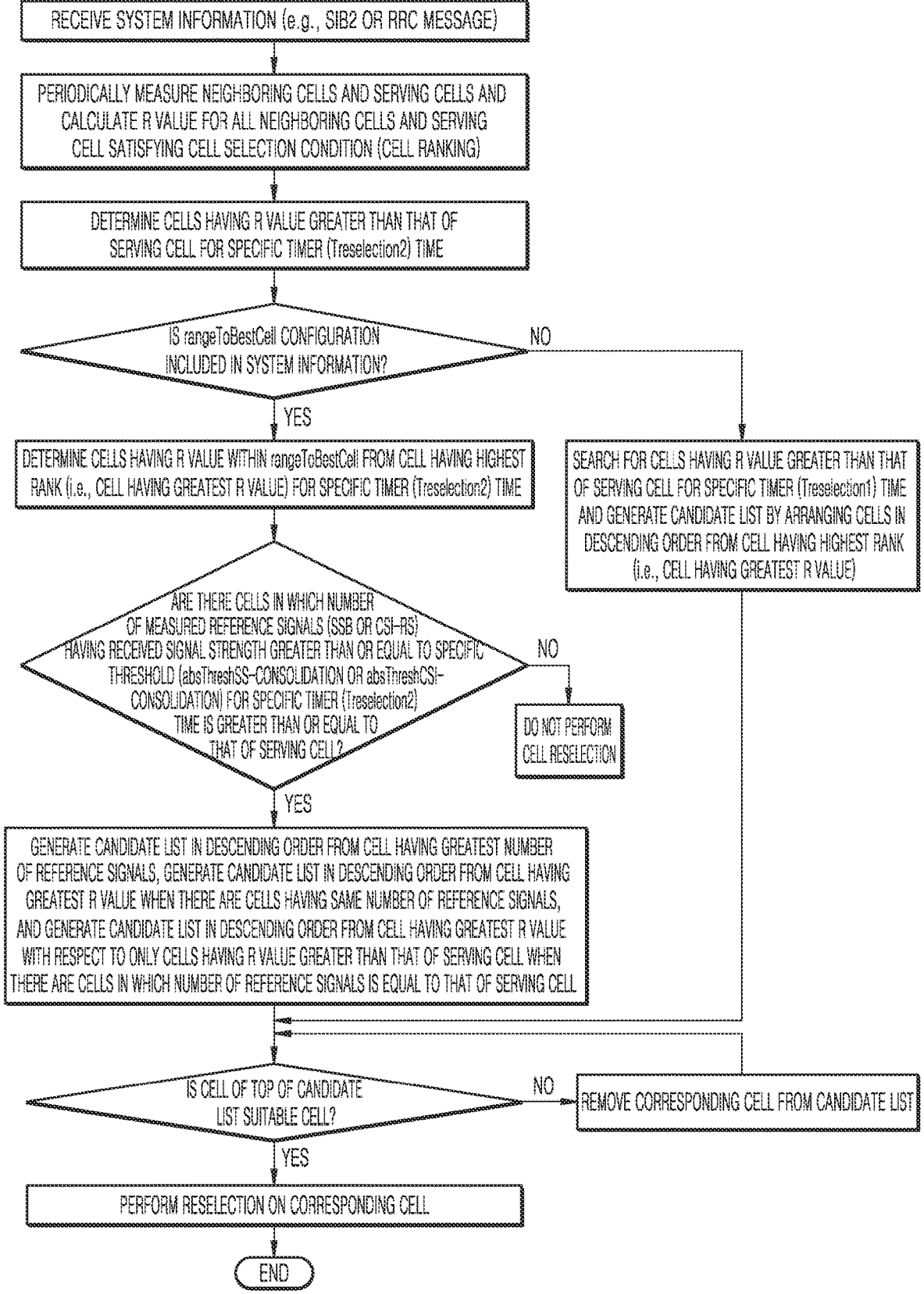

FIG. 2FA is a flowchart illustrating a procedure, performed by a UE, of performing cell reselection according to rangeToBestCell configuration, according to some embodiments of the present disclosure.

According to some embodiments, the UE may receive system information broadcast from a serving cell or a camped cell, for example, SIB 1, SIB2, SIB3, SIB4, . . . , SIBN.

According to some embodiments, pieces of system information received by the UE may include SIBs including parameters that the UE may use to perform cell reselection such as intra-frequency, inter-frequency, or inter-RAT. Also, pieces of system information received by the UE may include SIBs including a rangeToBestCell parameter that determines the cell reselection operation of the UE. Also, pieces of system information received by the UE may include SIBs including a specific threshold (absThreshSS-Consolidation or absThreshCSI-Consolidation) that may determine whether the quality of beam represented by the corresponding RS is good by performing comparison with a measurement value for SSB or CSI-RS when the UE performs the cell reselection operation, or thresholds for SSB and CSI-RS. Also, pieces of system information received by the UE may include SIBs including specific timers (Treselection1 or Treselection2) used by the UE to perform reselection on a serving cell and neighboring cells. Also, pieces of system information received by the UE may include SIBs including information about neighboring cells that may be measured by the UE.

According to some embodiments, the above-described parameters may be any RRC message that may be received when the UE accesses the serving cell, for example, RRC Connection Reconfiguration, RRC Reconfiguration, RRC Resume, or RRC Release message.

According to some embodiments, the UE may measure neighboring cells based on the continuously received system information, and may identify cells that satisfy the following cell selection condition. According to an embodiment, the cell selection condition may be calculated as follows:

Cell selection condition S is based on the satisfaction of the following conditions:

$$Srxlev>0 \text{ AND } Squal>0$$

In this case, $$Srxlev=Q_{rxlevmeas}-(Q_{rxlevmin}+Q_{rxlevminoffset})-P_{compensation}-Q\text{offset}_{temp}$$

$$Squal=Q_{qualmeas}-(Q_{qualmin}+Q_{qualminoffset})-Q\text{offset}_{temp}$$

Here,
Srxlev is a cell selection reception level value (dB).
Squal is a cell selection quality value (dB).
$Q\text{offset}_{temp}$ is a temporarily applied offset value for each cell.
$Q_{rxlevmeas}$ is a measured cell reception level value (RSRP).
$Q_{qualmeas}$ is a measured cell quality level value (RSRQ).
$Q_{rxlevmin}$ is a minimum reception level value (dBm) required by cell.
$Q_{qualmin}$ is a minimum quality level value (dB) required by cell.
$Q_{rxlevminoffset}$ is an offset value of $Q_{rxlevmin}$ reflected in Srxlev.
$Q_{qualminoffset}$ is an offset value of $Q_{qualmin}$ reflected in Squal.
When UE is configured with additionalPmax, Pcompensation is calculated as $$\max(PEMAX1-PPowerClass,0)-(\min(PEMAX2, PPowerClass)-\min(PEMAX1,PPowerClass)) \text{ (dB)};$$

otherwise, Pcompensation is calculated as $$\max(PEMAX1-PPowerClass,0)\text{(dB)}.$$

Here,
$P_{EMAX1}$ and $P_{EMAX2}$ are the maximum transmit power levels (dBm) of the UE and may be obtained from p-Max in NS-PmaxList.
$P_{PowerClass}$ is the maximum RF output power (dBm) of the UE.

According to some embodiments, the UE may calculate the R value based on the measurement value of each cell for the serving cell and all neighboring cells satisfying the above-described cell selection condition S. According to some embodiments, the UE may calculate the cell rank selection value (R value) for comparing the performances of the cells based on the measurement value of each cell as follows:

R value calculation formula of serving cell:

$$R_s=Q_{meas,s}+Q_{hyst}-Q\text{offset}_{temp}$$

R value calculation formula of cell other than neighboring serving cell:

$$R_n=Q_{meas,n}-Q\text{offset}-Q\text{offset}_{temp}$$

Here,
$Q_{meas}$ is the RSRP measurement value of each cell.
Qoffset is determined as follows:
In the intra-frequency, when the value of $Q\text{offset}_{s,n}$ is valid, the corresponding value is used; otherwise, 0 is substituted.
In the inter-frequency, when the value of $Q\text{offset}_{s,n}$ is valid, the value of "$Q\text{offset}_{s,n}+Q\text{offset}_{frequency}$" is substituted; otherwise, the value of $Q\text{offset}_{frequency}$ is substituted.
$Q\text{offset}_{temp}$ is a temporarily applied offset value.

According to some embodiments, the UE may determine whether rangeToBestCell is configured.

According to some embodiments, the UE in which rangeToBestCell is not configured may search for cells having an R value greater than that of a serving cell for a specific timer (Treselection1) time, and may generate the list of candidate cells by arranging these cells in descending order from the cell having the highest rank (the cell having the greatest R value).

According to some embodiments, the UE in which rangeToBestCell is configured may determine whether there are cells whose number of measured reference signals (SSB or CSI-RS) having a received signal strength greater than or equal to a specific threshold (absThreshSS-Consolidation or absThreshCSI-Consolidation) for the specific timer (Treselection2) time is greater than or equal to that of the serving cell.

According to some embodiments, when there are even no cells whose number of reference signals satisfying the above-described condition is greater than or equal to that of the serving cell, the UE may stop the cell reselection operation and may not perform cell reselection operation.

According to some embodiments, when there are cells whose number of reference signals satisfying the above-described condition is greater than or equal to that of the serving cell, the UE may determine the cells having the R value within rangeToBestCell from the cell having the highest rank (i.e., the cell having the greatest R value) for the specific timer (Treselection2) time among these cells, and may generate the list of candidate cells in descending order from the cell having the greatest number of corresponding reference signals. When the serving cell is the cell having the highest rank and there are no other cells having the R value within rangeToBestCell, the UE may stop cell reselection and may not perform cell reselection. When there are cells having the same number of reference signals among these cells, the cells may be included in the list of candidate cells in descending order from the cell having the greatest R value. When there are cells whose number of reference signals satisfying the above-described condition is equal to that of the serving cell, the UE may include the cells in the list of candidate cells in descending order from the cell having the greatest R value. When there are cells whose number of reference signals satisfying the above-described condition is equal to that of the serving cell, the UE may select only cells having an R value greater than that of the serving cell and include the selected cells in the list of candidate cells.

According to an embodiment, the condition for determining whether there are cells whose number of reference signals satisfying the above-described condition is equal to that of the serving cell may be determined before or after the condition for determining whether there are cells whose number of reference signals satisfying the above-described condition is greater than that of the serving cell, or may be determined only when there are no cells whose number of reference signals is greater than that of the serving cell.

According to some embodiments, the UE may use one of the following various methods to induce the R value for the specific timer (Treselection) time.

- The average value of the measurement values of RSRP (RSRQ, RSSI, or SINR) of the reference signal (SSB or CSI-RS) measured for the specific timer (Treselection) time is taken and the R value is calculated using the average value.
- The R value is calculated using the measurement values of RSRP (RSRQ, RSSI, or SINR) of the reference signal (SSB or CSI-RS) measured before the specific timer (Treselection) time.
- The R value is calculated using the measurement values of RSRP (RSRQ, RSSI, or SINR) of the reference signal (SSB or CSI-RS) measured immediately before or immediately after the end of the specific timer (Treselection) time.
- A representative R value is derived by taking the average value of the R values calculated as the measurement value of RSRP (RSRQ, RSSI, or SINR) of the reference signal (SSB or CSI-RS) measured for the specific timer (Treselection) time.

According to some embodiments, the UE may receive the system information of the corresponding cell (e.g., MIB and SIBs) so as to determine whether the cell selected at the top of the list of candidate cells using the generated list of candidate cells is suitable for performing reselection. When there is a problem in performing access to the cell (for example, when the cell is a cell that is barred or does not provide a service required by the UE), the UE that has received the system information may remove the corresponding cell from the generated list of candidate cells and perform suitability determination again on another cell. In order to perform cell suitability determination, the UE may determine whether the cell satisfies the following conditions.

1. Whether cell is selected or belongs to equivalent PLMN (SIB1)
2. Whether tracking area is not prohibited (SIB1)
3. Whether cell reselection condition is satisfied (SIB1)
4. Whether cell is determined to be barred or not barred (MIB/SIB1)

According to some embodiments, when there is a cell that has passed the above-described cell suitability determination, the UE may perform reselection on the corresponding cell.

Among the UE operations described in the aforementioned embodiments, the operation of performing the measurements on the serving cell and the neighboring cells and calculating the R values for all cells that satisfy the cell selection condition may be periodically performed by the UE even while the UE performs other operations.

The operations of the UE described in the aforementioned embodiments may be performed sequentially, but may be performed by changing the order.

In the aforementioned embodiments, the specific timers, e.g., Treselection1 and Treselection2, may be one timer having the same value, e.g., Treselection, and each timer may have a value of 0 or infinity as the same value. When each timer has a value of 0 or infinity, the UE may derive an R value as a result of one instant measurement and perform an operation.

FIG. 2FB is a flowchart illustrating a procedure, performed by a UE, of performing cell reselection according to rangeToBestCell configuration, according to some embodiments of the present disclosure.

According to some embodiments, the UE may receive system information broadcast from a serving cell or a camped cell, for example, SIB 1, SIB2, SIB3, SIB4, . . . , SIBN.

According to some embodiments, pieces of system information received by the UE may include SIBs including parameters that the UE may use to perform cell reselection such as intra-frequency, inter-frequency, or inter-RAT. Also, pieces of system information received by the UE may include SIBs including a rangeToBestCell parameter that determines the cell reselection operation of the UE. Also, pieces of system information received by the UE may include SIBs including a specific threshold (absThreshSS-Consolidation or absThreshCSI-Consolidation) that may determine whether the quality of beam represented by the corresponding RS is good by performing comparison with a measurement value for SSB or CSI-RS when the UE performs the cell reselection operation, or thresholds for SSB and CSI-RS. Also, pieces of system information received by the UE may include SIBs including specific timers (Treselection1 or Treselection2) used by the UE to perform reselection on a serving cell and neighboring cells. Also, pieces of system information received by the UE may include SIBs including information about neighboring cells that may be measured by the UE.

According to some embodiments, the above-described parameters may be any RRC message that may be received when the UE accesses the serving cell, for example, RRC Connection Reconfiguration, RRC Reconfiguration, RRC Resume, or RRC Release message.

According to some embodiments, the UE may measure neighboring cells based on the continuously received system information, and may identify cells that satisfy the following cell selection condition. According to an embodiment, the cell selection condition may be calculated as follows:

Cell selection condition S is based on the satisfaction of the following conditions:

$Srxlev>0$ AND $Squal>0$

In this case, $Srxlev = Q_{rxlevmeas} - (Q_{rxlevmin} + Q_{rxlevminoffset}) - P_{compensation} - Qoffset_{temp}$ $Squal = Q_{qualmeas} - (Q_{qualmin} + Q_{qualminoffset}) - Qoffset_{temp}$ Here, Srxlev is a cell selection reception level value (dB).
Squal is a cell selection quality value (dB).
$Qoffset_{temp}$ is a temporarily applied offset value for each cell.
$Q_{rxlevmeas}$ is a measured cell reception level value (RSRP).
$Q_{qualmeas}$ is a measured cell quality level value (RSRQ).
$Q_{rxlevmin}$ is a minimum reception level value (dBm) required by cell.
$Q_{qualmin}$ is a minimum quality level value (dB) required by cell.

$Q_{rxlevminoffset}$ is an offset value of $Q_{rxlevmin}$ reflected in Srxlev.

$Q_{qualminoffset}$ is an offset value of $Q_{qualmin}$ reflected in Squal.

When UE is configured with additionalPmax, $P_{compensation}$ is calculated as max(PEMAX1−PPowerClass,0)−(min(PEMAX2, PPowerClass)−min(PEMAX1,PPowerClass)) (dB);

otherwise, Pcompensation is calculated as max(PEMAX1−PPowerClass,0)(dB).

Here, $P_{EMAX1}$ and $P_{EMAX2}$ are the maximum transmit power levels (dBm) of the UE and may be obtained from p-Max in NS-PmaxList.

$P_{PowerClass}$ is the maximum RF output power (dBm) of the UE.

According to some embodiments, the UE may calculate the R value based on the measurement value of each cell for the serving cell and all neighboring cells satisfying the above-described cell selection condition S. According to some embodiments, the UE may calculate the cell rank selection value (R value) for comparing the performances of the cells based on the measurement value of each cell as follows.

R value calculation formula of serving cell:

$R_s = Q_{meas,s} + Q_{hyst} - Q\text{offset}_{temp}$

R value calculation formula of cell other than neighboring serving cell:

$R_n = Q_{meas,n} - Q\text{offset} - Q\text{offset}_{temp}$

Here, $Q_{meas}$ is the RSRP measurement value of each cell.

Qoffset is determined as follows:

In the intra-frequency, when the value of $Q\text{offset}_{s,n}$ is valid, the corresponding value is used; otherwise, 0 is substituted.

In the inter-frequency, when the value of $Q\text{offset}_{s,n}$ is valid, the value of "$Q\text{offset}_{s,n} + Q\text{offset}_{frequency}$" is substituted; otherwise, the value of $Q\text{offset}_{frequency}$ is substituted.

$Q\text{offset}_{temp}$ is a temporarily applied offset value.

According to some embodiments, the UE may determine whether rangeToBestCell is configured.

According to some embodiments, the UE in which rangeToBestCell is not configured may search for cells having an R value greater than that of a serving cell for a specific timer (Treselection1) time, and may generate the list of candidate cells by arranging these cells in descending order from the cell having the highest rank (the cell having the greatest R value).

According to some embodiments, the UE in which rangeToBestCell is configured may determine cells having R values within the rangeToBestCell range from the cell having the highest rank (i.e., the cell having the greatest R value) for the specific timer (Treselection2) time. When the serving cell is the cell having the highest rank and there are no other cells having the R value within rangeToBestCell, the UE may stop cell reselection and may not perform cell reselection.

According to some embodiments, the UE in which rangeToBestCell is configured may determine whether there are cells whose number of measured reference signals (SSB or CSI-RS) having a received signal strength greater than or equal to a specific threshold (absThreshSS-Consolidation or absThreshCSI-Consolidation) for the specific timer (Treselection2) time is greater than or equal to that of the serving cell with respect to the determined cells.

According to some embodiments, when there are even no cells whose number of reference signals satisfying the above-described condition is greater than or equal to that of the serving cell, the UE may stop the cell reselection operation and may not perform cell reselection operation.

According to some embodiments, when there are cells whose number of reference signals satisfying the above-described condition is greater than or equal to that of the serving cell, the UE may generate the list of candidate cells in descending order from the cell having the greatest number of corresponding reference signals. When there are cells having the same number of reference signals among these cells, the cells may be included in the list of candidate cells in descending order from the cell having the greatest R value. When there are cells whose number of reference signals satisfying the above-described condition is equal to that of the serving cell, the UE may include the cells in the list of candidate cells in descending order from the cell having the greatest R value. When there are cells whose number of reference signals is equal to that of the serving cell, the UE may select only cells having an R value greater than that of the serving cell and include the selected cells in the list of candidate cells.

According to an embodiment, the condition for determining whether there are cells whose number of reference signals satisfying the above-described condition is equal to that of the serving cell may be determined before or after the condition for determining whether there are cells whose number of reference signals satisfying the above-described condition is greater than that of the serving cell, or may be determined only when there are no cells whose number of reference signals is greater than that of the serving cell.

According to some embodiments, the UE may use one of the following various methods to induce the R value for the specific timer (Treselection) time.

The average value of the measurement values of RSRP (RSRQ, RSSI, or SINR) of the reference signal (SSB or CSI-RS) measured for the specific timer (Treselection) time is taken and the R value is calculated using the average value.

The R value is calculated using the measurement values of RSRP (RSRQ, RSSI, or SINR) of the reference signal (SSB or CSI-RS) measured before the specific timer (Treselection) time.

The R value is calculated using the measurement values of RSRP (RSRQ, RSSI, or SINR) of the reference signal (SSB or CSI-RS) measured immediately before or immediately after the end of the specific timer (Treselection) time.

A representative R value is derived by taking the average value of the R values calculated as the measurement value of RSRP (RSRQ, RSSI, or SINR) of the reference signal (SSB or CSI-RS) measured for the specific timer (Treselection) time.

According to some embodiments, the UE may receive the system information of the corresponding cell (e.g., MIB and SIBs) so as to determine whether the cell selected at the top of the list of candidate cells using the generated list of candidate cells is suitable for performing reselection. When there is a problem in performing access to the cell (for example, when the cell is a cell that is barred or does not provide a service required by the UE), the UE that has received the system information may remove the corresponding cell from the generated list of candidate cells and perform suitability determination again on another cell. In order to perform cell suitability determination, the UE may determine whether the cell satisfies the following conditions.
1. Whether cell is selected or belongs to equivalent PLMN (SIB1)
2. Whether tracking area is not prohibited (SIB1)
3. Whether cell reselection condition is satisfied (SIB1)
4. Whether cell is determined to be barred or not barred (MIB/SIB1)

According to some embodiments, when there is a cell that has passed the above-described cell suitability determination, the UE may perform reselection on the corresponding cell.

Among the UE operations described in the aforementioned embodiments, the operation of performing the measurements on the serving cell and the neighboring cells and calculating the R values for all cells that satisfy the cell selection condition may be periodically performed by the UE even while the UE performs other operations.

The operations of the UE described in the aforementioned embodiments may be performed sequentially, but may be performed by changing the order.

In the aforementioned embodiments, the specific timers, e.g., Treselection1 and Treselection2, may be one timer having the same value, e.g., Treselection, and each timer may have a value of 0 or infinity as the same value. When each timer has a value of 0 or infinity, the UE may derive an R value as a result of one instant measurement and perform an operation.

FIG. 2FC is a flowchart illustrating a procedure, performed by a UE, of performing cell reselection according to rangeToBestCell configuration, according to some embodiments of the present disclosure.

According to some embodiments, the UE may receive system information broadcast from a serving cell or a camped cell, for example, SIB 1, SIB2, SIB3, SIB4, . . . , SIBN.

According to some embodiments, pieces of system information received by the UE may include SIBs including parameters that the UE may use to perform cell reselection such as intra-frequency, inter-frequency, or inter-RAT. Also, pieces of system information received by the UE may include SIBs including a rangeToBestCell parameter that determines the cell reselection operation of the UE. Also, pieces of system information received by the UE may include SIBs including a specific threshold (absThreshSS-Consolidation or absThreshCSI-Consolidation) that may determine whether the quality of beam represented by the corresponding RS is good by performing comparison with a measurement value for SSB or CSI-RS when the UE performs the cell reselection operation, or thresholds for SSB and CSI-RS. Also, pieces of system information received by the UE may include SIBs including specific timers (Treselection1 or Treselection2) used by the UE to perform reselection on a serving cell and neighboring cells. Also, pieces of system information received by the UE may include SIBs including information about neighboring cells that may be measured by the UE.

According to some embodiments, the above-described parameters may be any RRC message that may be received when the UE accesses the serving cell, for example, RRC Connection Reconfiguration, RRC Reconfiguration, RRC Resume, or RRC Release message.

According to some embodiments, the UE may measure neighboring cells based on the continuously received system information, and may identify cells that satisfy the following cell selection condition. According to an embodiment, the cell selection condition may be calculated as follows:

Cell selection condition S is based on the satisfaction of the following conditions:

$$Srxlev > 0 \text{ AND } Squal > 0$$

In this case, $$Srxlev = Q_{rxlevmeas} - (Q_{rxlevmin} + Q_{rxlevminoffset}) - P_{compensation} - Qoffset_{temp}$$

$$Squal = Q_{qualmeas} - (Q_{qualmin} + Q_{qualminoffset}) - Qoffset_{temp}$$

Here,

Srxlev is a cell selection reception level value (dB).

Squal is a cell selection quality value (dB).

$Qoffset_{temp}$ is a temporarily applied offset value for each cell.

$Q_{rxlevmeas}$ is a measured cell reception level value (RSRP).

$Q_{qualmeas}$ is a measured cell quality level value (RSRQ).

$Q_{rxlevmin}$ is a minimum reception level value (dBm) required by cell.

$Q_{qualmin}$ is a minimum quality level value (dB) required by cell.

$Q_{rxlevminoffset}$ is an offset value of $Q_{rxlevmin}$ reflected in Srxlev.

$Q_{qualminoffset}$ is an offset value of $Q_{qualmin}$ reflected in Squal.

When UE is configured with additionalPmax, Pcompensation is calculated as $$\max(PEMAX1 - PPowerClass, 0) - (\min(PEMAX2, PPowerClass) - \min(PEMAX1, PPowerClass))$$
$$(dB);$$

otherwise, Pcompensation is calculated as $$\max(PEMAX1 - PPowerClass, 0)(dB).$$

Here, $P_{EMAX1}$ and $P_{EMAX2}$ are the maximum transmit power levels (dBm) of the UE and may be obtained from p-Max in NS-PmaxList.

$P_{PowerClass}$ is the maximum RF output power (dBm) of the UE.

According to some embodiments, the UE may calculate the R value based on the measurement value of each cell for the serving cell and all neighboring cells satisfying the above-described cell selection condition S. According to some embodiments, the UE may calculate the cell rank selection value (R value) for comparing the performances of the cells based on the measurement value of each cell as follows.

R value calculation formula of serving cell:

$$R_s = Q_{meas,s} + Q_{hyst} - Qoffset_{temp}$$

R value calculation formula of cell other than neighboring serving cell:

$$R_n = Q_{meas,n} - Qoffset - Qoffset_{temp}$$

Here, $Q_{meas}$ is the RSRP measurement value of each cell.

Qoffset is determined as follows:

In the intra-frequency, when the value of $Qoffset_{s,n}$ is valid, the corresponding value is used; otherwise, 0 is substituted.

In the inter-frequency, when the value of $Qoffset_{s,n}$ is valid, the value of "$Qoffset_{s,n} + Qoffset_{frequency}$" is substituted; otherwise, the value of $Qoffset_{frequency}$ is substituted.

$Qoffset_{temp}$ is a temporarily applied offset value.

According to some embodiments, the UE may determine whether rangeToBestCell is configured.

According to some embodiments, the UE in which rangeToBestCell is not configured may search for cells having an R value greater than that of a serving cell for a specific timer (Treselection1) time, and may generate the list of candidate cells by arranging these cells in descending order from the cell having the highest rank (the cell having the greatest R value).

According to some embodiments, the UE in which rangeToBestCell is configured may determine cells having an R value greater than that of the serving cell for the specific timer (Treselection2) time.

According to some embodiments, the UE in which rangeToBestCell is configured may determine whether there are cells whose number of measured reference signals (SSB or CSI-RS) having a received signal strength greater than or equal to a specific threshold (absThreshSS-Consolidation or absThreshCSI-Consolidation) for the specific timer (Treselection2) time is greater than or equal to that of the serving cell with respect to the determined cells.

According to some embodiments, when there are even no cells whose number of reference signals satisfying the above-described condition is greater than or equal to that of the serving cell, the UE may stop the cell reselection operation and may not perform cell reselection operation.

According to some embodiments, the UE whose the number of reference signals satisfying the above-described condition is greater than or equal to that of the serving cell may select cells having R values within rangeToBestCell from the cell having the highest rank (i.e., the cell having the greatest R value) for the specific timer (Treselection2) time. When the serving cell is the cell having the highest rank and there are no other cells having the R value within rangeToBestCell, the UE may stop cell reselection and may not perform cell reselection.

When there are cells whose number of reference signals satisfying the above-described condition is greater than or equal to that of the serving cell among the selected cells, the UE may generate the list of candidate cells in descending order from the cell having the greatest number of corresponding reference signals. When there are cells having the same number of reference signals among the selected cells, the cells may be included in the list of candidate cells in descending order from the cell having the greatest R value. When there are cells whose number of reference signals satisfying the above-described condition is equal to that of the serving cell, the UE may include the cells in the list of candidate cells in descending order from the cell having the greatest R value. When there are cells whose number of reference signals is equal to that of the serving cell, the UE may select only cells having an R value greater than that of the serving cell and include the selected cells in the list of candidate cells.

According to an embodiment, the condition for determining whether there are cells whose number of reference signals satisfying the above-described condition is equal to that of the serving cell may be determined before or after the condition for determining whether there are cells whose number of reference signals satisfying the above-described condition is greater than that of the serving cell, or may be determined only when there are no cells whose number of reference signals is greater than that of the serving cell.

According to some embodiments, the UE may use one of the following various methods to induce the R value for the specific timer (Treselection) time.

The average value of the measurement values of RSRP (RSRQ, RSSI, or SINR) of the reference signal (SSB or CSI-RS) measured for the specific timer (Treselection) time is taken and the R value is calculated using the average value.

The R value is calculated using the measurement values of RSRP (RSRQ, RSSI, or SINR) of the reference signal (SSB or CSI-RS) measured before the specific timer (Treselection) time.

The R value is calculated using the measurement values of RSRP (RSRQ, RSSI, or SINR) of the reference signal (SSB or CSI-RS) measured immediately before or immediately after the end of the specific timer (Treselection) time.

A representative R value is derived by taking the average value of the R values calculated as the measurement value of RSRP (RSRQ, RSSI, or SINR) of the reference signal (SSB or CSI-RS) measured for the specific timer (Treselection) time.

According to some embodiments, the UE may receive the system information of the corresponding cell (e.g., MIB and SIBs) so as to determine whether the cell selected at the top of the list of candidate cells using the generated list of candidate cells is suitable for performing reselection. When there is a problem in performing access to the cell (for example, when the cell is a cell that is barred or does not provide a service required by the UE), the UE that has received the system information may remove the corresponding cell from the generated list of candidate cells and perform suitability determination again on another cell. In order to perform cell suitability determination, the UE may determine whether the cell satisfies the following conditions.

1. Whether cell is selected or belongs to equivalent PLMN (SIB1)
2. Whether tracking area is not prohibited (SIB1)
3. Whether cell reselection condition is satisfied (SIB1)
4. Whether cell is determined to be barred or not barred (MIB/SIB1)

According to some embodiments, when there is a cell that has passed the above-described cell suitability determination, the UE may perform reselection on the corresponding cell.

Among the UE operations described in the aforementioned embodiments, the operation of performing the measurements on the serving cell and the neighboring cells and calculating the R values for all cells that satisfy the cell selection condition may be periodically performed by the UE even while the UE performs other operations.

The operations of the UE described in the aforementioned embodiments may be performed sequentially, but may be performed by changing the order.

In the aforementioned embodiments, the specific timers, e.g., Treselection1 and Treselection2, may be one timer having the same value, e.g., Treselection, and each timer may have a value of 0 or infinity as the same value. When each timer has a value of 0 or infinity, the UE may derive an R value as a result of one instant measurement and perform an operation.

FIG. 2FD is a flowchart illustrating a procedure, performed by a UE, of performing cell reselection according to rangeToBestCell configuration, according to some embodiments of the present disclosure.

According to some embodiments, the UE may receive system information broadcast from a serving cell or a camped cell, for example, SIB 1, SIB2, SIB3, SIB4, . . . , SIBN.

According to some embodiments, pieces of system information received by the UE may include SIBs including parameters that the UE may use to perform cell reselection such as intra-frequency, inter-frequency, or inter-RAT. Also, pieces of system information received by the UE may include SIBs including a rangeToBestCell parameter that determines the cell reselection operation of the UE. Also, pieces of system information received by the UE may include SIBs including a specific threshold (absThreshSS-Consolidation or absThreshCSI-Consolidation) that may determine whether the quality of beam represented by the corresponding RS is good by performing comparison with a measurement value for SSB or CSI-RS when the UE performs the cell reselection operation, or thresholds for SSB and CSI-RS. Also, pieces of system information received by the UE may include SIBs including specific timers (Treselection1 or Treselection2) used by the UE to perform reselection on a serving cell and neighboring cells. Also, pieces of system information received by the UE may include SIBs including information about neighboring cells that may be measured by the UE.

According to some embodiments, the above-described parameters may be any RRC message that may be received when the UE accesses the serving cell, for example, RRC Connection Reconfiguration, RRC Reconfiguration, RRC Resume, or RRC Release message.

According to some embodiments, the UE may measure neighboring cells based on the continuously received system information, and may identify cells that satisfy the following cell selection condition. According to an embodiment, the cell selection condition may be calculated as follows:

Cell selection condition S is based on the satisfaction of the following conditions:

$$Srxlev>0 \text{ AND } Squal>0$$

In this case, $$Srxlev=Q_{rxlevmeas}-(Q_{rxlevmin}+Q_{rxlevminoffset})-P_{compensation}-Q\text{offset}_{temp}$$

$$Squal=Q_{qualmeas}-(Q_{qualmin}+Q_{qualminoffset})-Q\text{offset}_{temp}$$

Here,
Srxlev is a cell selection reception level value (dB).
Squal is a cell selection quality value (dB).
$Q\text{offset}_{temp}$ is a temporarily applied offset value for each cell.
$Q_{rxlevmeas}$ is a measured cell reception level value (RSRP).
$Q_{qualmeas}$ is a measured cell quality level value (RSRQ).
$Q_{rxlevmin}$ is a minimum reception level value (dBm) required by cell.
$Q_{qualmin}$ is a minimum quality level value (dB) required by cell.
$Q_{rxlevminoffset}$ is an offset value of $Q_{rxlevmin}$ reflected in Srxlev.
$Q_{qualminoffset}$ is an offset value of $Q_{qualmin}$ reflected in Squal.
When UE is configured with additionalPmax, Pcompensation is calculated as $$\max(PEMAX1-PPowerClass,0)-(\min(PEMAX2, PPowerClass)-\min(PEMAX1,PPowerClass))\ (dB);$$

otherwise, Pcompensation is calculated as $$\max(PEMAX1-PPowerClass,0)(dB).$$

Here,
$P_{EMAX1}$ and $P_{EMAX2}$ are the maximum transmit power levels (dBm) of the UE and may be obtained from p-Max in NS-PmaxList.
$P_{PowerClass}$ is the maximum RF output power (dBm) of the UE.

According to some embodiments, the UE may calculate the R value based on the measurement value of each cell for the serving cell and all neighboring cells satisfying the above-described cell selection condition S. According to some embodiments, the UE may calculate the cell rank selection value (R value) for comparing the performances of the cells based on the measurement value of each cell as follows:

R value calculation formula of serving cell:

$$R_s=Q_{meas,s}\pm Q_{hyst}-Q\text{offset}_{temp}$$

R value calculation formula of cell other than neighboring serving cell:

$$R_n=Q_{meas,n}-Q\text{offset}-Q\text{offset}_{temp}$$

Here,
$Q_{meas}$ is the RSRP measurement value of each cell.
Qoffset is determined as follows:
In the intra-frequency, when the value of $Q\text{offset}_{s,n}$ is valid, the corresponding value is used; otherwise, 0 is substituted.
In the inter-frequency, when the value of $Q\text{offset}_{s,n}$ is valid, the value of "$Q\text{offset}_{s,n}+Q\text{offset}_{frequency}$" is substituted; otherwise, the value of $Q\text{offset}_{frequency}$ is substituted.
$Q\text{offset}_{temp}$ is a temporarily applied offset value.

According to some embodiments, the UE may determine whether rangeToBestCell is configured.

According to some embodiments, the UE in which rangeToBestCell is not configured may search for cells having an R value greater than that of a serving cell for a specific timer (Treselection1) time, and may generate the list of candidate cells by arranging these cells in descending order from the cell having the highest rank (the cell having the greatest R value).

According to some embodiments, the UE in which rangeToBestCell is configured may determine cells having an R value greater than that of the serving cell for the specific timer (Treselection2) time.

According to some embodiments, the UE may select cells having R values within rangeToBestCell from the cell having the highest rank (i.e., the cell having the greatest R value) for the specific timer (Treselection2) time. When the serving cell is the cell having the highest rank and there are no other cells having the R value within rangeToBestCell, the UE may stop cell reselection and may not perform cell reselection.

The order of the above-described operations may be changed. For example, the UE may determine cells having an R value greater than that of the serving cell and then determine cells having an R value within rangeToBestCell among the corresponding cells, and the UE may change the order to determine cells having an R value within rangeToBestCell and then determine cells having an R value greater than that of the serving cell among the corresponding cells.

According to some embodiments, the UE in which rangeToBestCell is configured may determine whether there are cells whose number of measured reference signals (SSB or CSI-RS) having a received signal strength greater than or equal to a specific threshold (absThreshSS-Consolidation or absThreshCSI-Consolidation) for the specific timer (Treselection2) time is greater than or equal to that of the serving cell with respect to the determined cells.

According to some embodiments, when there are even no cells whose number of reference signals satisfying the above-described condition is greater than or equal to that of the serving cell, the UE may stop the cell reselection operation and may not perform cell reselection operation.

According to an embodiment, when there are cells whose number of reference signals satisfying the above-described condition is greater than or equal to that of the serving cell, the UE may generate the list of candidate cells in descending order from the cell having the greatest number of corresponding reference signals. When there are cells having the same number of reference signals among the selected cells, the UE may include the cells in the list of candidate cells in descending order from the cell having the greatest R value. When there are cells whose number of reference signals satisfying the above-described condition is equal to that of the serving cell, the UE may include the cells in the list of candidate cells in descending order from the cell having the greatest R value. When there are cells whose number of reference signals is equal to that of the serving cell, the UE may select only cells having an R value greater than that of the serving cell and include the selected cells in the list of candidate cells.

According to an embodiment, the condition for determining whether there are cells whose number of reference signals satisfying the above-described condition is equal to that of the serving cell may be determined before or after the condition for determining whether there are cells whose number of reference signals satisfying the above-described condition is greater than that of the serving cell, or may be determined only when there are no cells whose number of reference signals is greater than that of the serving cell.

According to some embodiments, the UE may use one of the following various methods to induce the R value for the specific timer (Treselection) time.

- The average value of the measurement values of RSRP (RSRQ, RSSI, or SINR) of the reference signal (SSB or CSI-RS) measured for the specific timer (Treselection) time is taken and the R value is calculated using the average value.
- The R value is calculated using the measurement values of RSRP (RSRQ, RSSI, or SINR) of the reference signal (SSB or CSI-RS) measured before the specific timer (Treselection) time.
- The R value is calculated using the measurement values of RSRP (RSRQ, RSSI, or SINR) of the reference signal (SSB or CSI-RS) measured immediately before or immediately after the end of the specific timer (Treselection) time.
- A representative R value is derived by taking the average value of the R values calculated as the measurement value of RSRP (RSRQ, RSSI, or SINR) of the reference signal (SSB or CSI-RS) measured for the specific timer (Treselection) time.

According to some embodiments, the UE may receive the system information of the corresponding cell (e.g., MIB and SIBs) so as to determine whether the cell selected at the top of the list of candidate cells using the generated list of candidate cells is suitable for performing reselection. When there is a problem in performing access to the cell (for example, when the cell is a cell that is barred or does not provide a service required by the UE), the UE that has received the system information may remove the corresponding cell from the generated list of candidate cells and perform suitability determination again on another cell. In order to perform cell suitability determination, the UE may determine whether the cell satisfies the following conditions.

1. Whether cell is selected or belongs to equivalent PLMN (SIB1)
2. Whether tracking area is not prohibited (SIB1)
3. Whether cell reselection condition is satisfied (SIB1)
4. Whether cell is determined to be barred or not barred (MIB/SIB1)

According to some embodiments, when there is a cell that has passed the above-described cell suitability determination, the UE may perform reselection on the corresponding cell.

Among the UE operations described in the aforementioned embodiments, the operation of performing the measurements on the serving cell and the neighboring cells and calculating the R values for all cells that satisfy the cell selection condition may be periodically performed by the UE even while the UE performs other operations.

The operations of the UE described in the aforementioned embodiments may be performed sequentially, but may be performed by changing the order.

In the aforementioned embodiments, the specific timers, e.g., Treselection1 and Treselection2, may be one timer having the same value, e.g., Treselection, and each timer may have a value of 0 or infinity as the same value. When each timer has a value of 0 or infinity, the UE may derive an R value as a result of one instant measurement and perform an operation.

FIG. 2FE is a flowchart illustrating a procedure, performed by a UE, of performing cell reselection according to rangeToBestCell configuration, according to some embodiments of the present disclosure.

According to some embodiments, the UE may receive system information broadcast from a serving cell or a camped cell, for example, SIB 1, SIB2, SIB3, SIB4, ... , SIBN.

According to some embodiments, pieces of system information received by the UE may include SIBs including parameters that the UE may use to perform cell reselection such as intra-frequency, inter-frequency, or inter-RAT. Also, pieces of system information received by the UE may include SIBs including a rangeToBestCell parameter that determines the cell reselection operation of the UE. Also, pieces of system information received by the UE may include SIBs including a specific threshold (absThreshSS-Consolidation or absThreshCSI-Consolidation) that may determine whether the quality of beam represented by the corresponding RS is good by performing comparison with a measurement value for SSB or CSI-RS when the UE performs the cell reselection operation, or thresholds for SSB and CSI-RS. Also, pieces of system information received by the UE may include SIBs including specific timers (Treselection1 or Treselection2) used by the UE to perform reselection on a serving cell and neighboring cells. Also, pieces of system information received by the UE may include SIBs including information about neighboring cells that may be measured by the UE.

According to some embodiments, the above-described parameters may be any RRC message that may be received when the UE accesses the serving cell, for example, RRC Connection Reconfiguration, RRC Reconfiguration, RRC Resume, or RRC Release message.

According to some embodiments, the UE may measure neighboring cells based on the continuously received system information, and may identify cells that satisfy the following cell selection condition. According to an embodiment, the cell selection condition may be calculated as follows:

Cell selection condition S is based on the satisfaction of the following conditions:

$Srxlev>0$ AND $Squal>0$

In this case, $$Srxlev = Q_{rxlevmeas} - (Q_{rxlevmin} + Q_{rxlevminoffset}) - P_{compensation} - Qoffset_{temp}$$

$$Squal = Q_{qualmeas} - (Q_{qualmin} + Q_{qualminoffset}) - Qoffset_{temp}$$

Here,

Srxlev is a cell selection reception level value (dB).

Squal is a cell selection quality value (dB).

$Qoffset_{temp}$ is a temporarily applied offset value for each cell.

$Q_{rxlevmeas}$ is a measured cell reception level value (RSRP).

$Q_{qualmeas}$ is a measured cell quality level value (RSRQ).

$Q_{rxlevmin}$ is a minimum reception level value (dBm) required by cell.

$Q_{qualmin}$ is a minimum quality level value (dB) required by cell.

$Q_{rxlevminoffset}$ is an offset value of $Q_{rxlevmin}$ reflected in Srxlev.

$Q_{qualminoffset}$ is an offset value of $Q_{qualmin}$ reflected in Squal.

When UE is configured with additionalPmax, Pcompensation is calculated as $$\max(PEMAX1 - PPowerClass, 0) - (\min(PEMAX2, PPowerClass) - \min(PEMAX1, PPowerClass)) \text{ (dB)};$$

otherwise, Pcompensation is calculated as $$\max(PEMAX1 - PPowerClass, 0)(dB).$$

Here, $P_{EMAX1}$ and $P_{EMAX2}$ are the maximum transmit power levels (dBm) of the UE and may be obtained from p-Max in NS-PmaxList.

$P_{PowerClass}$ is the maximum RF output power (dBm) of the UE.

According to some embodiments, the UE may calculate the R value based on the measurement value of each cell for the serving cell and all neighboring cells satisfying the above-described cell selection condition S. According to some embodiments, the UE may calculate the cell rank selection value (R value) for comparing the performances of the cells based on the measurement value of each cell as follows.

R value calculation formula of serving cell:

$$R_s = Q_{meas,s} + Q_{hyst} - Qoffset_{temp}$$

R value calculation formula of cell other than neighboring serving cell:

$$R_n = Q_{meas,n} - Qoffset - Qoffset_{temp}$$

Here, $Q_{meas}$ is the RSRP measurement value of each cell.

Qoffset is determined as follows:

In the intra-frequency, when the value of $Qoffset_{s,n}$ is valid, the corresponding value is used; otherwise, 0 is substituted.

In the inter-frequency, when the value of $Qoffset_{s,n}$ is valid, the value of "$Qoffset_{s,n} + Qoffset_{frequency}$" is substituted; otherwise, the value of $Qoffset_{frequency}$ is substituted.

$Qoffset_{temp}$ is a temporarily applied offset value.

According to some embodiments, the UE may determine whether rangeToBestCell is configured.

According to some embodiments, the UE in which rangeToBestCell is not configured may search for cells having an R value greater than that of a serving cell for a specific timer (Treselection1) time, and may generate the list of candidate cells by arranging these cells in descending order from the cell having the highest rank (the cell having the greatest R value).

According to some embodiments, the UE in which rangeToBestCell is configured may determine cells having an R value greater than that of the serving cell for the specific timer (Treselection2) time.

According to some embodiments, the UE may select cells having R values within rangeToBestCell from the cell having the highest rank (i.e., the cell having the greatest R value) for the specific timer (Treselection2) time. When the serving cell is the cell having the highest rank and there are no other cells having the R value within rangeToBestCell, the UE may stop cell reselection and may not perform cell reselection.

The order of the above-described operations may be changed. For example, the UE may determine cells having an R value greater than that of the serving cell and then determine cells having an R value within rangeToBestCell among the corresponding cells, and the UE may change the order to determine cells having an R value within rangeToBestCell and then determine cells having an R value greater than that of the serving cell among the corresponding cells.

According to some embodiments, the UE in which rangeToBestCell is configured may determine whether there are cells whose number of measured reference signals (SSB or CSI-RS) having a received signal strength greater than or equal to a specific threshold (absThreshSS-Consolidation or absThreshCSI-Consolidation) for the specific timer (Treselection2) time is greater than or equal to that of the serving cell with respect to the determined cells.

According to some embodiments, when there are even no cells whose number of reference signals satisfying the above-described condition is greater than or equal to that of the serving cell, the UE may stop the cell reselection operation and may not perform cell reselection operation.

According to an embodiment, when there are cells whose number of reference signals satisfying the above-described condition is greater than or equal to that of the serving cell, the UE may preferentially determine cells having an R value greater than that of the serving cell. When there are not these cells, the UE may stop the cell reselection operation and may not perform cell reselection operation.

The UE may generate the list of candidate cells in descending order from the cell having the greatest number of corresponding reference signals with respect to the selected cells. When there are cells having the same number of reference signals among these cells, the UE may include the cells in the list of candidate cells in descending order from the cell having the greatest R value. When there are cells whose number of reference signals satisfying the above-described condition is equal to that of the serving cell, the UE may include the cells in the list of candidate cells in descending order from the cell having the greatest R value. When there are cells whose number of reference signals is equal to that of the serving cell, the UE may select only cells having an R value greater than that of the serving cell and include the selected cells in the list of candidate cells.

According to an embodiment, the condition for determining whether there are cells whose number of reference signals satisfying the above-described condition is equal to that of the serving cell may be determined before or after the condition for determining whether there are cells whose number of reference signals satisfying the above-described condition is greater than that of the serving cell, or may be determined only when there are no cells whose number of reference signals is greater than that of the serving cell.

According to some embodiments, the UE may use one of the following various methods to induce the R value for the specific timer (Treselection) time.

The average value of the measurement values of RSRP (RSRQ, RSSI, or SINR) of the reference signal (SSB or CSI-RS) measured for the specific timer (Treselection) time is taken and the R value is calculated using the average value.

The R value is calculated using the measurement values of RSRP (RSRQ, RSSI, or SINR) of the reference signal (SSB or CSI-RS) measured before the specific timer (Treselection) time.

The R value is calculated using the measurement values of RSRP (RSRQ, RSSI, or SINR) of the reference signal (SSB or CSI-RS) measured immediately before or immediately after the end of the specific timer (Treselection) time.

A representative R value is derived by taking the average value of the R values calculated as the measurement value of RSRP (RSRQ, RSSI, or SINR) of the reference signal (SSB or CSI-RS) measured for the specific timer (Treselection) time.

According to some embodiments, the UE may receive the system information of the corresponding cell (e.g., MIB and SIBs) so as to determine whether the cell selected at the top of the list of candidate cells using the generated list of candidate cells is suitable for performing reselection. When there is a problem in performing access to the cell (for example, when the cell is a cell that is barred or does not provide a service required by the UE), the UE that has received the system information may remove the corresponding cell from the generated list of candidate cells and perform suitability determination again on another cell. In order to perform cell suitability determination, the UE may determine whether the cell satisfies the following conditions.

1. Whether cell is selected or belongs to equivalent PLMN (SIB1)
2. Whether tracking area is not prohibited (SIB1)
3. Whether cell reselection condition is satisfied (SIB1)
4. Whether cell is determined to be barred or not barred (MIB/SIB1)

According to some embodiments, when there is a cell that has passed the above-described cell suitability determination, the UE may perform reselection on the corresponding cell.

Among the UE operations described in the aforementioned embodiments, the operation of performing the measurements on the serving cell and the neighboring cells and calculating the R values for all cells that satisfy the cell selection condition may be periodically performed by the UE even while the UE performs other operations.

The operations of the UE described in the aforementioned embodiments may be performed sequentially, but may be performed by changing the order.

In the aforementioned embodiments, the specific timers, e.g., Treselection1 and Treselection2, may be one timer having the same value, e.g., Treselection, and each timer may have a value of 0 or infinity as the same value. When each timer has a value of 0 or infinity, the UE may derive an R value as a result of one instant measurement and perform an operation.

FIG. 2FF is a flowchart illustrating a procedure, performed by a UE, of performing cell reselection according to rangeToBestCell configuration, according to some embodiments of the present disclosure.

According to some embodiments, the UE may receive system information broadcast from a serving cell or a camped cell, for example, SIB 1, SIB2, SIB3, SIB4, . . . , SIBN.

According to some embodiments, pieces of system information received by the UE may include SIBs including parameters that the UE may use to perform cell reselection such as intra-frequency, inter-frequency, or inter-RAT. Also, pieces of system information received by the UE may include SIBs including a rangeToBestCell parameter that determines the cell reselection operation of the UE. Also, pieces of system information received by the UE may include SIBs including a specific threshold (absThreshSS-Consolidation or absThreshCSI-Consolidation) that may determine whether the quality of beam represented by the corresponding RS is good by performing comparison with a measurement value for SSB or CSI-RS when the UE performs the cell reselection operation, or thresholds for SSB and CSI-RS. Also, pieces of system information received by the UE may include SIBs including specific timers (Treselection1 or Treselection2) used by the UE to perform reselection on a serving cell and neighboring cells. Also, pieces of system information received by the UE may include SIBs including information about neighboring cells that may be measured by the UE.

According to some embodiments, the above-described parameters may be any RRC message that may be received when the UE accesses the serving cell, for example, RRC Connection Reconfiguration, RRC Reconfiguration, RRC Resume, or RRC Release message.

According to some embodiments, the UE may measure neighboring cells based on the continuously received system information, and may identify cells that satisfy the following cell selection condition. According to an embodiment, the cell selection condition may be calculated as follows:

Cell selection condition S is based on the satisfaction of the following conditions:

$$Srxlev>0 \text{ AND } Squal>0$$

In this case, $$Srxlev = Q_{rxlevmeas} - (Q_{rxlevmin} + Q_{rxlevminoffset}) - P_{compensation} - Qoffset_{temp}$$

$$Squal = Q_{qualmeas} - (Q_{qualmin} + Q_{qualminoffset}) - Qoffset_{temp}$$

Here,

Srxlev is a cell selection reception level value (dB).

Squal is a cell selection quality value (dB).

$Qoffset_{temp}$ is a temporarily applied offset value for each cell.

$Q_{rxlevmeas}$ is a measured cell reception level value (RSRP).

$Q_{qualmeas}$ is a measured cell quality level value (RSRQ).

$Q_{rxlevmin}$ is a minimum reception level value (dBm) required by cell.

$Q_{qualmin}$ is a minimum quality level value (dB) required by cell.

$Q_{rxlevminoffset}$ is an offset value of $Q_{rxlevmin}$ reflected in Srxlev.

$Q_{qualminoffset}$ is an offset value of $Q_{qualmin}$ reflected in Squal.

When UE is configured with additionalPmax, Pcompensation is calculated as $$\max(PEMAX1 - PPowerClass, 0) - (\min(PEMAX2, PPowerClass) - \min(PEMAX1, PPowerClass)) \text{ (dB)};$$

otherwise, Pcompensation is calculated as $$\max(PEMAX1 - PPowerClass, 0) \text{ (dB)}.$$

Here, $P_{EMAX1}$ and $P_{EMAX2}$ are the maximum transmit power levels (dBm) of the UE and may be obtained from p-Max in NS-PmaxList.

$P_{PowerClass}$ is the maximum RF output power (dBm) of the UE.

According to some embodiments, the UE may calculate the R value based on the measurement value of each cell for the serving cell and all neighboring cells satisfying the above-described cell selection condition S. According to some embodiments, the UE may calculate the cell rank selection value (R value) for comparing the performances of the cells based on the measurement value of each cell as follows.

R value calculation formula of serving cell:

$$R_s = Q_{meas,s} + Q_{hyst} - Q\text{offset}_{temp}$$

R value calculation formula of cell other than neighboring serving cell:

$$R_n = Q_{meas,n} - Q\text{offset} - Q\text{offset}_{temp}$$

Here, $Q_{meas}$ is the RSRP measurement value of each cell.

Qoffset is determined as follows:

In the intra-frequency, when the value of $Q\text{offset}_{s,n}$ is valid, the corresponding value is used; otherwise, 0 is substituted.

In the inter-frequency, when the value of $Q\text{offset}_{s,n}$ is valid, the value of "$Q\text{offset}_{s,n} + Q\text{offset}_{frequency}$" is substituted; otherwise, the value of $Q\text{offset}_{frequency}$ is substituted.

$Q\text{offset}_{temp}$ is a temporarily applied offset value.

According to some embodiments, the UE may calculate R values of the cells for the specific timer (Treselection1) time and determine cells having an R value greater than that of the serving cell.

According to some embodiments, the UE may determine whether rangeToBestCell is configured.

According to some embodiments, the UE in which rangeToBestCell is not configured may generate the list of candidate cells by arranging the selected cells in descending order from the cell having the highest rank (the cell having the greatest R value).

According to some embodiments, the UE in which rangeToBestCell is configured may select cells having R values within the rangeToBestCell range from the cell having the highest rank (i.e., the cell having the greatest R value) for the specific timer (Treselection2) time. When the serving cell is the cell having the highest rank and there are no other cells having the R value within rangeToBestCell, the UE may stop cell reselection and may not perform cell reselection.

The order of the above-described operations may be changed. For example, the UE may determine cells having an R value greater than that of the serving cell, determine whether the rangeToBestCell configuration is included, and then determine cells in which the R value is included within rangeToBestCell among the cells. Alternatively, the UE may change the order to determine cells having an R value within rangeToBestCell and then determine whether the rangeToBestCell configuration is included, may determine cells having an R value greater than that of the serving cell among the cells, and may determine whether the rangeToBestCell configuration is included and then determine cells related to the R value.

According to some embodiments, the UE in which rangeToBestCell is configured may determine whether there are cells whose number of measured reference signals (SSB or CSI-RS) having a received signal strength greater than or equal to a specific threshold (absThreshSS-Consolidation or absThreshCSI-Consolidation) for the specific timer (Treselection2) time is greater than or equal to that of the serving cell with respect to the determined cells.

According to some embodiments, when there are even no cells whose number of reference signals satisfying the above-described condition is greater than or equal to that of the serving cell, the UE may stop the cell reselection operation and may not perform cell reselection operation.

According to an embodiment, when there are cells whose number of reference signals satisfying the above-described condition is greater than or equal to that of the serving cell, the UE may preferentially determine cells having an R value greater than that of the serving cell. When there are not these cells, the UE may stop the cell reselection operation and may not perform cell reselection operation.

The UE may generate the list of candidate cells in descending order from the cell having the greatest number of corresponding reference signals with respect to the selected cells. When there are cells having the same number of reference signals among these cells, the UE may include the cells in the list of candidate cells in descending order from the cell having the greatest R value. When there are cells whose number of reference signals satisfying the above-described condition is equal to that of the serving cell, the UE may include the cells in the list of candidate cells in descending order from the cell having the greatest R value. When there are cells whose number of reference signals is equal to that of the serving cell, the UE may select only cells having an R value greater than that of the serving cell and include the selected cells in the list of candidate cells.

According to an embodiment, the condition for determining whether there are cells whose number of reference signals satisfying the above-described condition is equal to that of the serving cell may be determined before or after the condition for determining whether there are cells whose number of reference signals satisfying the above-described condition is greater than that of the serving cell, or may be determined only when there are no cells whose number of reference signals is greater than that of the serving cell.

According to some embodiments, the UE may use one of the following various methods to induce the R value for the specific timer (Treselection) time.

- The average value of the measurement values of RSRP (RSRQ, RSSI, or SINR) of the reference signal (SSB or CSI-RS) measured for the specific timer (Treselection) time is taken and the R value is calculated using the average value.
- The R value is calculated using the measurement values of RSRP (RSRQ, RSSI, or SINR) of the reference signal (SSB or CSI-RS) measured before the specific timer (Treselection) time.
- The R value is calculated using the measurement values of RSRP (RSRQ, RSSI, or SINR) of the reference signal (SSB or CSI-RS) measured immediately before or immediately after the end of the specific timer (Treselection) time.
- A representative R value is derived by taking the average value of the R values calculated as the measurement value of RSRP (RSRQ, RSSI, or SINR) of the reference signal (SSB or CSI-RS) measured for the specific timer (Treselection) time.

According to some embodiments, the UE may receive the system information of the corresponding cell (e.g., MIB and SIBs) so as to determine whether the cell selected at the top of the list of candidate cells using the generated list of candidate cells is suitable for performing reselection. When there is a problem in performing access to the cell (for example, when the cell is a cell that is barred or does not provide a service required by the UE), the UE that has received the system information may remove the corresponding cell from the generated list of candidate cells and perform suitability determination again on another cell. In order to perform cell suitability determination, the UE may determine whether the cell satisfies the following conditions.
1. Whether cell is selected or belongs to equivalent PLMN (SIB1)
2. Whether tracking area is not prohibited (SIB1)
3. Whether cell reselection condition is satisfied (SIB1)
4. Whether cell is determined to be barred or not barred (MIB/SIB1)

According to some embodiments, when there is a cell that has passed the above-described cell suitability determination, the UE may perform reselection on the corresponding cell.

Among the UE operations described in the aforementioned embodiments, the operation of performing the measurements on the serving cell and the neighboring cells and calculating the R values for all cells that satisfy the cell selection condition may be periodically performed by the UE even while the UE performs other operations.

The operations of the UE described in the aforementioned embodiments may be performed sequentially, but may be performed by changing the order.

In the aforementioned embodiments, the specific timers, e.g., Treselection1 and Treselection2, may be one timer having the same value, e.g., Treselection, and each timer may have a value of 0 or infinity as the same value. When each timer has a value of 0 or infinity, the UE may derive an R value as a result of one instant measurement and perform an operation.

The cell reselection procedure of the UE for this purpose may be as follows:

In all situations, the UE performs cell reselection when the following conditions are satisfied.
A new cell has to have a ranking higher than that of the serving cell for a certain time $Treselection_{RAT}$;
The UE has to have been camped on the current serving cell for at least one second.
When rangeToBestCell is configured (in the current serving cell):
A new cell has to have more beams having a value greater than absThreshSS-Consolidation than the serving cell for a certain time $Treselection_{RAT}$;
A new cell has to have an R value included in rangeTo-BestCell from an R value of a cell having the highest rank for a certain time $Treselection_{RAT}$.

In the embodiments related to the cell reselection described in the present disclosure, the parameters or configuration information provided from the network to the UE may be a system information message, for example, SIB, may be an RRC message, for example, RRC Connection Reconfiguration, RRC Reconfiguration, RRC Resume, or RRC Release message, and may be a downlink control information (DCI) message.

All the operations related to the cell reselection described in the present disclosure may be operations assuming that the UE has been camped on the current serving cell for one second or more.

Figure 2G:
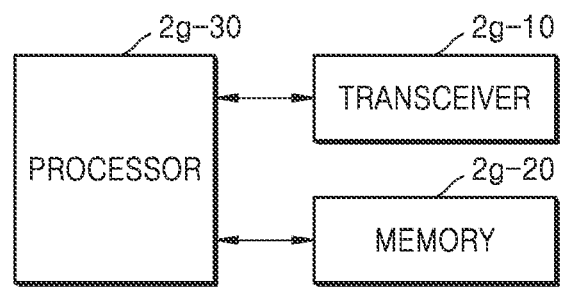
FIG. 2G is a block diagram illustrating an architecture of a UE, according to some embodiments of the present disclosure.

FIG. 2G is a block diagram illustrating an architecture of a UE, according to some embodiments of the present disclosure.

Referring to FIG. 2G, the UE may include a transceiver 2g-10, a memory 2g-20, and a processor 2g-30. The transceiver 2g-10, the memory 2g-20, and the processor 2g-30 of the UE may operate according to the above-described communication method of the UE. However, the elements of the UE are not limited to the above-described example. For example, the UE may include more elements or fewer elements than the aforementioned elements. Also, the transceiver 2g-10, the memory 2g-20, and the processor 2g-30 may be implemented in the form of a single chip.

The transceiver 2g-10 may transmit and receive signals with a base station. The signals may include control information and data. To this end, the transceiver 2g-10 may include an RF transmitter that performs up-conversion and amplification on a frequency of a signal to be transmitted, and an RF receiver that performs low-noise amplification on a received signal and performs down-conversion on a frequency of the received signal. However, this is only an embodiment of the transceiver 2g-10, and the elements of the transceiver 2g-10 are not limited to the RF transmitter and the RF receiver.

Also, the transceiver 2g-10 may receive a signal through a radio channel, output the received signal to the processor 2g-30, and transmit an output signal of the processor 2g-30 through a radio channel.

The memory 2g-20 may store programs and data required for operations of the UE. Also, the memory 2g-20 may store control information or data included in signals obtained by the UE. The memory 2g-20 may include a storage medium such as read-only memory (ROM), random access memory (RAM), hard disk, compact disc read-only memory (CD-ROM), and digital versatile disc (DVD), or any combination thereof.

The processor 2g-30 may control a series of processes so that the UE may operate according to the above-described embodiments.

Figure 2H:
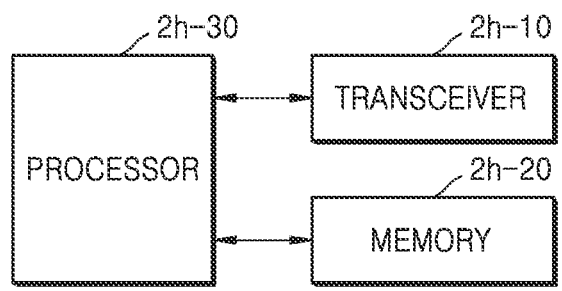
FIG. 2H is a block diagram illustrating an architecture of a base station, according to some embodiments of the present disclosure.

FIG. 2H is a block diagram illustrating an architecture of a base station, according to some embodiments of the present disclosure.

Referring to FIG. 2H, the base station may include a transceiver 2h-10, a memory 2h-20, and a processor 2h-30. The transceiver 2h-10, the memory 2h-20, and the processor 2h-30 may operate according to the above-described communication method of the base station. However, the elements of the base station are not limited to the above-described example. For example, the base station may include more elements or fewer elements than the aforementioned elements. Also, the transceiver 2h-10, the memory 2h-20, and the processor 2h-30 may be implemented in the form of a single chip.

The transceiver 2h-10 may transmit and receive signals with a UE. The signals may include control information and data. To this end, the transceiver 2h-10 may include an RF transmitter that performs up-conversion and amplification on a frequency of a signal to be transmitted, and an RF receiver that performs low-noise amplification on a received signal and performs down-conversion on a frequency of the received signal. However, this is only an embodiment of the transceiver 2h-10, and the elements of the transceiver 2h-10 are not limited to the RF transmitter and the RF receiver.

Also, the transceiver 2h-10 may receive a signal through a radio channel, output the received signal to the processor 2h-30, and transmit an output signal of the processor 2h-30 through a radio channel.

The memory 2h-20 may store programs and data required for operations of the base station. Also, the memory 2h-20 may store control information or data included in signals obtained by the base station. The memory 2h-20 may include a storage medium such as ROM, RAM, hard disk, CD-ROM, and DVD, or any combination thereof.

The processor 2h-30 may control a series of processes so that the base station may operate according to the above-described embodiments.

The embodiments of the present disclosure, which are described in this specification and drawings, are merely presented as specific examples so as to easily explain the technical contents of the present disclosure and help the understanding of the present disclosure and are not intended to limit the scope of the present disclosure. That is, it will be obvious to those of ordinary skill in the art that other modifications based on the technical idea of the present disclosure may be made. In addition, the respective embodiments may be operated in combination with each other as necessary. For example, some portions of the embodiments (e.g., embodiment 1, embodiment 2, and embodiment 3) of the present disclosure may be combined with each other so that the base station and the UE are operated. Also, although the above-described embodiments have been presented based on the NR system, other modifications based on the technical idea of the embodiments may also be applied to other systems such as FDD or TDD LTE systems.

Also, preferred embodiments of the present disclosure have been described and illustrated in the present specification and drawings. Although certain terms are used herein, this is merely used in a general sense to easily describe the technical idea of the present disclosure and to help understanding of the present disclosure, and is not intended to limit the scope of the present disclosure. It will be obvious to those of ordinary skill in the art that other modifications based on the technical idea of the present disclosure may be made

The invention claimed is:

1. A method, performed by a terminal dual-connected to a master base station and a secondary base station in a wireless communication system, of configuring an assistance information bit for local cache (AILC) bit, the method comprising:
receiving, from the master base station, a radio resource control (RRC) reconfiguration message including AILC bit configuration information (ailc-BitConfig);
configuring an AILC bit of a packet data convergence protocol (PDCP) data packet data unit (PDU) based on at least one of a terminating base station of a data radio bearer (DRB) through which the PDCP data PDU is transmitted, whether the PDCP data PDU includes a service data unit (SDU) to be transmitted to a local cache, whether the DRB is configured with evolved universal terrestrial radio access (E-UTRA) PDCP or New Radio (NR) PDCP, or a PDCP sequence number (SN) of the PDCP data PDU; and
transmitting, to the secondary base station, the PDCP data PDU in which the AILC bit is configured.

2. The method of claim 1,
wherein the master base station is a master next-generation NodeB (gNB) and the secondary base station is a secondary gNB, and
wherein the configuring of the AILC bit of the PDCP data PDU comprises setting the AILC bit of the PDCP data PDU to 1 when the PDCP data PDU includes a service data adaptation protocol (SDAP) SDU to be transmitted to the local cache.

3. The method of claim 1,
wherein the master base station is a master eNB and the secondary base station is a secondary gNB,
wherein the AILC bit configuration information is included and transmitted in secondary gNB configuration information of the RRC reconfiguration message, and
wherein the configuring of the AILC bit of the PDCP data PDU comprises setting the AILC bit of the PDCP data PDU to 1 when the PDCP data PDU includes a PDCP SDU to be transmitted to the local cache and the PDCP data PDU is configured with NR PDCP.

4. The method of claim 1,
wherein the master base station is a master gNB and the secondary base station is a secondary eNB, and
wherein the configuring of the AILC bit of the PDCP data PDU comprises setting the AILC bit of the PDCP data PDU to 1 when the PDCP data PDU includes an SDAP SDU to be transmitted to the local cache.

5. The method of claim 4,
wherein the AILC bit configuration information is included and transmitted in secondary eNB configuration information of the RRC reconfiguration message.

6. The method of claim 1, wherein the AILC bit configuration information is included and transmitted in an OtherConfig information element (IE) of the RRC reconfiguration message.

7. A terminal, dual-connected to a master base station and a secondary base station, for configuring an assistance information bit for local cache (AILC) bit in a wireless communication system, the terminal comprising:
a transceiver; and
a processor connected to the transceiver,
wherein the processor is configured to:
receive, from the master base station, a radio resource control (RRC) reconfiguration message including AILC bit configuration information (ailc-BitConfig),
configure an AILC of a packet data convergence protocol (PDCP) data packet data unit (PDU) based on at least one of a terminating base station of a data radio bearer (DRB) through which the PDCP data PDU is transmitted, whether the PDCP data PDU includes a service data unit (SDU) to be transmitted to a local cache, whether the DRB is configured with evolved universal terrestrial radio access (E-UTRA) PDCP or New Radio (NR) PDCP, or a PDCP sequence number (SN) of the PDCP data PDU, and
transmit, to the secondary base station, the PDCP data PDU in which the AILC bit is configured.

8. The terminal of claim 7,
wherein the master base station is a master next-generation NodeB (gNB) and the secondary base station is a secondary gNB, and
wherein the processor is further configured to set the AILC bit of the PDCP data PDU to 1 when the PDCP data PDU includes a service data adaptation protocol (SDAP) SDU to be transmitted to the local cache.

9. The terminal of claim 7,
wherein the master base station is a master eNB and the secondary base station is a secondary gNB,
wherein the AILC bit configuration information is included and transmitted in secondary gNB configuration information of the RRC reconfiguration message, and
wherein the processor is further configured to:
set the AILC bit of the PDCP data PDU to 1 when the PDCP data PDU includes a PDCP SDU to be transmitted to the local cache and the PDCP data PDU is configured with NR PDCP.

10. The terminal of claim 7,
wherein the master base station is a master gNB and the secondary base station is a secondary eNB, and
wherein the processor is further configured to set the AILC bit of the PDCP data PDU to 1 when the PDCP data PDU includes an SDAP SDU to be transmitted to the local cache.

11. The terminal of claim 10,
wherein the AILC bit configuration information is included and transmitted in secondary eNB configuration information of the RRC reconfiguration message.

* * * * *